(12) United States Patent
Reed et al.

(10) Patent No.: US 9,406,039 B2
(45) Date of Patent: Aug. 2, 2016

(54) SYSTEMS AND METHODS FOR COLLABORATIVE CONSTRUCTION PLANNING

(71) Applicant: Autodesk, Inc., San Rafael, CA (US)

(72) Inventors: Dean Reed, Santa Cruz, CA (US); Atul Khanzode, Sunnyvale, CA (US); Michael Davison, Redwood, CA (US); Todd Elkins, San Francisco, CA (US); Vishal Singhania, Fremont, CA (US)

(73) Assignee: Autodesk, Inc., San Rafael, CA (US)

( * ) Notice: Subject to any disclaimer, the term of this patent is extended or adjusted under 35 U.S.C. 154(b) by 246 days.

(21) Appl. No.: 14/207,312

(22) Filed: Mar. 12, 2014

(65) Prior Publication Data
US 2014/0278662 A1    Sep. 18, 2014

Related U.S. Application Data

(60) Provisional application No. 61/791,095, filed on Mar. 15, 2013.

(51) Int. Cl.
| | | |
|---|---|---|
| G06Q 10/00 | (2012.01) | |
| G06Q 10/06 | (2012.01) | |
| G06Q 50/08 | (2012.01) | |

(52) U.S. Cl.
CPC .... *G06Q 10/063118* (2013.01); *G06Q 10/0631* (2013.01); *G06Q 50/08* (2013.01)

(58) Field of Classification Search
None
See application file for complete search history.

(56) References Cited

U.S. PATENT DOCUMENTS

| | | | |
|---|---|---|---|
| 7,496,886 B2 | 2/2009 | Puttaswamy et al. | |
| 7,587,274 B2 | 9/2009 | Kaldewey et al. | |
| 7,752,020 B2 | 7/2010 | Seppanen et al. | |
| 7,933,395 B1 | 4/2011 | Bailly et al. | |
| 8,005,705 B2 | 8/2011 | Gura et al. | |
| 8,296,200 B2 | 10/2012 | Mangipudi et al. | |
| 8,306,841 B2 | 11/2012 | Clarke | |
| 8,370,192 B2 | 2/2013 | Deo et al. | |
| 2006/0053043 A1* | 3/2006 | Clarke | G06Q 10/063118 705/7.17 |
| 2006/0070020 A1* | 3/2006 | Puttaswamy | G06Q 10/10 717/101 |
| 2007/0219711 A1* | 9/2007 | Kaldewey | G01C 21/00 701/434 |
| 2008/0082956 A1* | 4/2008 | Gura | G06Q 10/0631 717/101 |

(Continued)

FOREIGN PATENT DOCUMENTS

WO    WO 2012/126105    9/2012

OTHER PUBLICATIONS

Authorized officer Philippe Bécamel, International Preliminary Report on Patentability in PCT/US2014/025015, mailed Sep. 24, 2015, 8 pages.

(Continued)

*Primary Examiner* — Sujay Koneru
(74) *Attorney, Agent, or Firm* — Fish & Richardson P.C.

(57) ABSTRACT

Systems and methods for collaborative construction planning are provided herein. An example method includes establishing a milestone or completion event for a construction project plan, assembling the construction project plan by defining activities for the milestone or completion event. Each of the activities is associated with a team member which accomplishes a given activity, and arranging the activities in reverse chronological order starting with the milestone or completion event, according to an order of dependency of execution of activities. The method also includes displaying the construction project plan in such a way that the activities are illustrated to show the order of dependency between activities.

18 Claims, 65 Drawing Sheets

(56) References Cited

U.S. PATENT DOCUMENTS

2008/0126025 A1* 5/2008 Seppanen .............. G06Q 10/06
703/2
2011/0035244 A1* 2/2011 Leary .................... G06Q 10/00
705/7.13

OTHER PUBLICATIONS

International Search Report and Written Opinion from International Patent Application No. PCT/US14/25015, filed Mar. 12, 2014. Received Jul. 29, 2014. 10 pages.

* cited by examiner

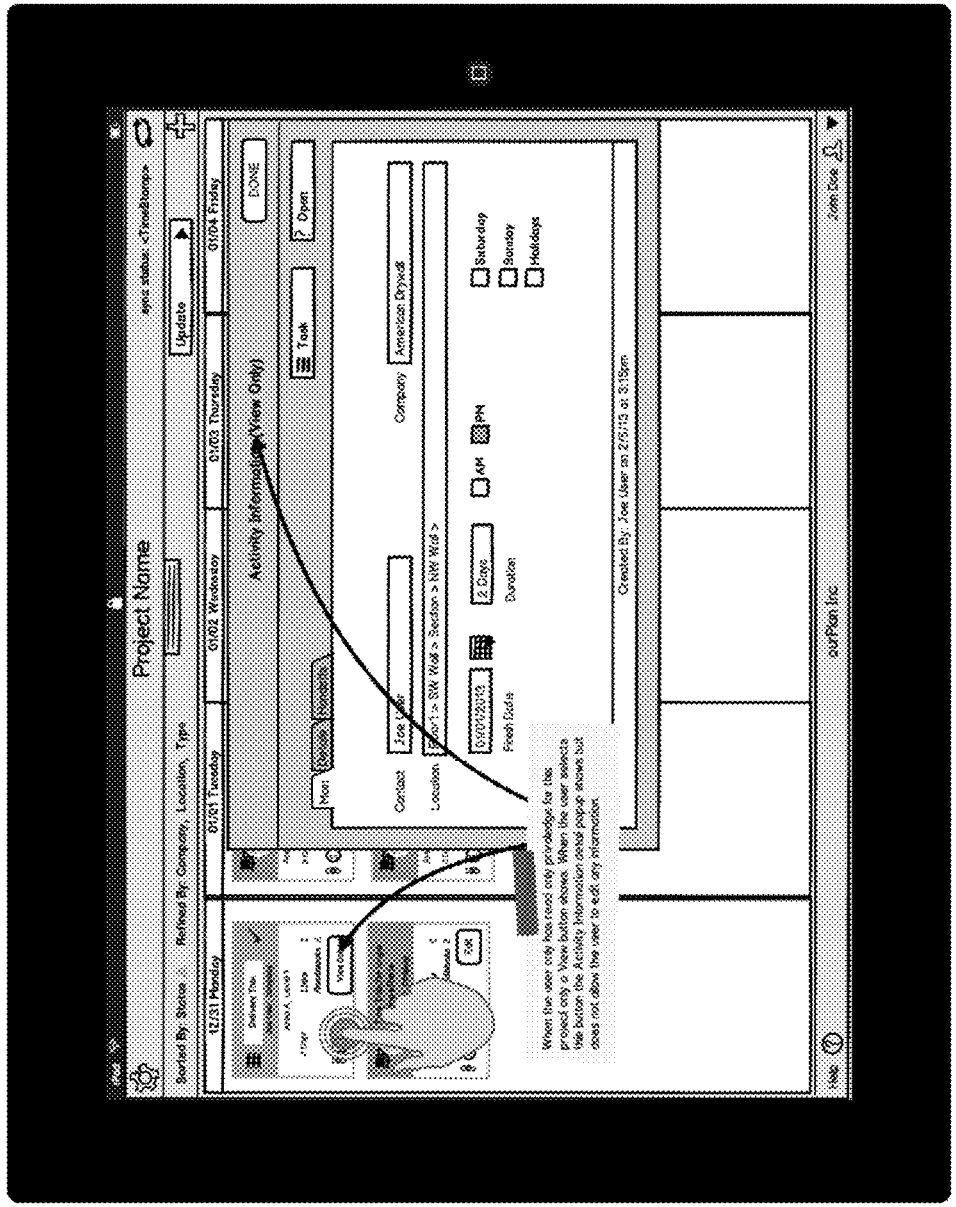

SYSTEMS AND METHODS FOR COLLABORATIVE CONSTRUCTION PLANNING

CROSS REFERENCE TO RELATED APPLICATIONS

This application claims the priority benefit of U.S. Provisional Application Ser. No. 61/791,095, filed on Mar. 15, 2013, titled "SYSTEMS AND METHODS FOR COLLABORATIVE CONSTRUCTION PLANNING", which is hereby incorporated by reference herein in its entirety including all references cited therein.

FIELD OF THE PRESENT TECHNOLOGY

Embodiments of the present technology include a system and method for collaboratively planning construction projects through an interactive program according to Lean construction principles.

BACKGROUND

Traditional construction management has been argued to be an inefficient process. The approach focuses on transforming inputs to outputs within each part of the project but fails to manage the overall transformation process. This results in waste in the form of projects falling behind schedule, increased costs, and potentially quality issues. Lean construction is an approach born from lean manufacturing to address the inefficiencies of traditional approaches. Lean construction provides a clear set of objectives for delivery, aims to maximize performance for the customer at a project level, designs the product and process concurrently, and controls production throughout the project life.

SUMMARY OF THE PRESENT TECHNOLOGY

In some embodiments, the present technology is directed to a method for providing a collaborative construction project plan using a collaborative planning system, the method comprising: (a) establishing a milestone or completion event for a construction project plan; (b) assembling the construction project plan by: (i) defining activities for the milestone or completion event, wherein each of the activities is associated with a team member which accomplishes a given activity; and (ii) arranging the activities in reverse chronological order starting with the milestone or completion event, according to an order of dependency of execution of activities; and (c) displaying the construction project plan in such a way that the activities are illustrated to show the order of dependency between activities.

In some embodiments, the present technology is directed to a construction project planning system, comprising: (a) a processor; and (b) a memory for storing logic, the logic being executed by the processor to perform operations comprising: (i) establishing a milestone or completion event for a construction project plan; (ii) assembling the construction project plan by: (1) defining activities for the milestone or completion event, wherein each of the activities is associated with an team member which accomplishes a given activity; and (2) arranging the activities in reverse chronological order starting with the milestone or completion event, according to an order of dependency of execution of activities; and (iii) displaying the construction project plan in such a way that the activities are illustrated to show the order of dependency between activities.

BRIEF DESCRIPTION OF THE DRAWINGS

Certain embodiments of the present technology are illustrated by the accompanying figures. It will be understood that the figures are not necessarily to scale and that details not necessary for an understanding of the technology or that render other details difficult to perceive is omitted. It will be understood that the technology is not necessarily limited to the particular embodiments illustrated herein.

FIGS. 7A-J show an exemplary graphical user interface of activity details of a mobile device application.

Figure 17A:
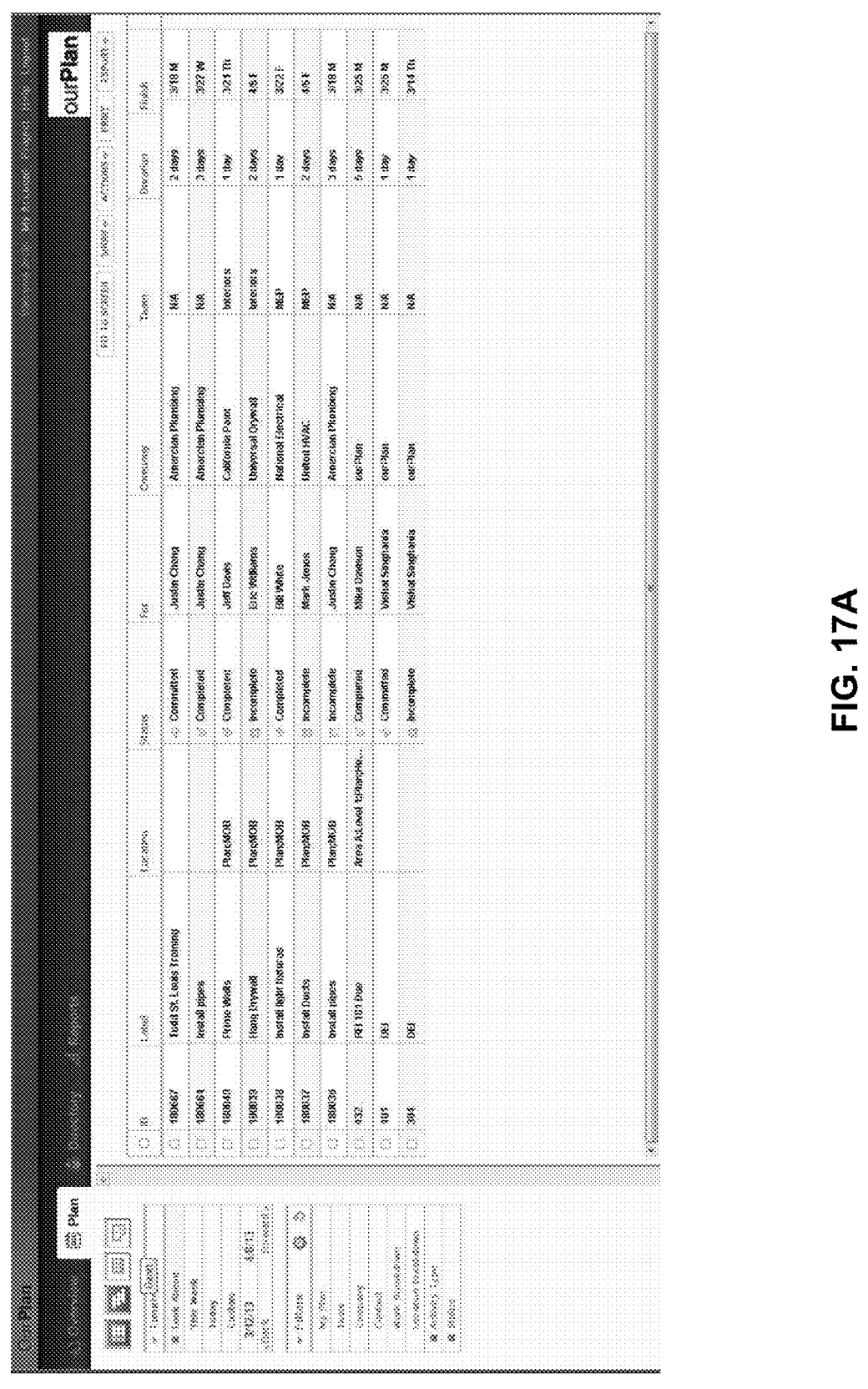

FIGS. 17A-D show an exemplary graphical user interface of a project view.

DESCRIPTION OF EXEMPLARY EMBODIMENTS

Figure 1:
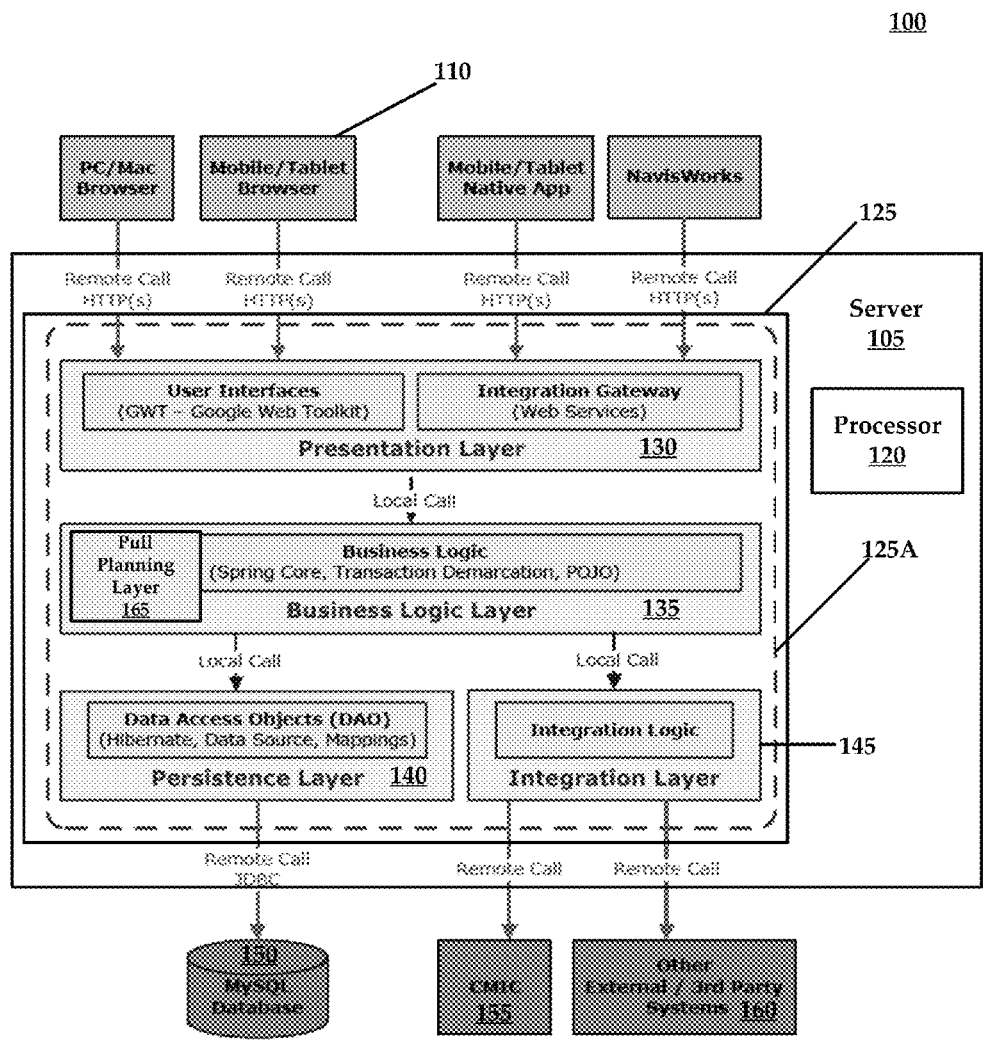
FIG. 1 shows an embodiment of architecture of collaborative construction planning system.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated.

The terminology used herein is for the purpose of describing particular embodiments only and is not intended to be limiting of the present technology. As used herein, the singular forms "a", "an" and "the" are intended to include the plural forms as well, unless the context clearly indicates otherwise.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that like or analogous elements and/or components, referred to herein, is identified throughout the drawings with like reference characters. It will be further understood that several of the figures are merely schematic representations of the present technology. As such, some of the components may have been distorted from their actual scale for pictorial clarity.

Generally speaking, the present technology provides methods and systems for a collaborative planning tool for construction projects that is used to assist construction teams in developing reliable work plans.

In one embodiment the present technology includes a multi-tier, web application that provides a collaborative planning tool for construction projects. The embodiment is deployed as a multi-tenant software-as-a-service (SaaS) application, presenting users with a rich web application interface to visually create and manage short-interval construction projects. The application interface or user interface is user configurable and interactive. The web application incorporates lean construction principles and automatically tracks team member commitments throughout a project.

Team members access their plan from any internet-connected browser and view the latest status of commitments made by everyone on the team. Project plans is displayed in List, Gantt, Calendar and Building views as shown in FIGS. 17A-D.

Additionally, performance results for "Plan Percent Complete" (PPC) and other key metrics can be viewed in six built-in interactive report formats (PPC average, PPC weekly, PPC summary, PPC snapshot, root causes, and roadblock) as shown in FIGS. 18A-F. Data is also exported for use by other reporting tools in various formats such as PDF, CSV, Excel, and so forth.

Additionally, the present technology allows for notification of team members when changes in the plan are determined. These notifications may take place via email or may be displayed to a user on an overview screen when signing into the web application. Each project in the web application is configured to include unique settings for aspects such as work schedule, contacts and companies assigned to the project, teams, Work Breakdown Structures and Location Breakdown Structures. Optionally, teams may upload two dimensional building images that can be associated with planned activities.

In addition, the web application includes a built-in integration with third-party applications. For example, the web application may include integration with Oracle Primavera (P6r7) that allows users to link activities to any activity or milestone in an associated Primavera project. The integration compares finish dates between the web application and Primavera and displays indicators that reflect the alignment of these dates. The web application includes plugins, such as an Autodesk Navisworks 2012 plugin, that uses web services to exchange data between the application and third-party applications via XML structures.

FIG. 1 illustrates an exemplary architecture 100 for a web application which uses layering to separate business logic. The architecture 100 may include a server 105 that facilitates the deployment of the SaaS planning application of the present technology. Users of the planning application may access the server 105 using a client 110 over a network 115.

The client 110 may include, for example, a mobile computing device such as a tablet or a Smartphone, or a laptop or desktop computer.

According to some embodiments, the system 105 may include a cloud based computing environment. In general, a cloud-based computing environment is a resource that typically combines the computational power of a large grouping of processors and/or that combines the storage capacity of a large grouping of computer memories or storage devices. For example, systems that provide a cloud resource may be utilized exclusively by their owners, such as Google™ or Yahoo!™; or such systems may be accessible to outside users who deploy applications within the computing infrastructure to obtain the benefit of large computational or storage resources.

The cloud may be formed, for example, by a network of web servers such as server 105 with each web server (or at least a plurality thereof) providing processor and/or storage resources. These servers may manage workloads provided by multiple users (e.g., cloud resource consumers or other users). Typically, each user places workload demands upon the cloud that vary in real-time, sometimes dramatically. The nature and extent of these variations typically depend on the type of business associated with the user.

The server 105 may communicatively couple with the client 110 via a public or private network, such as network 115. Suitable networks may include or interface with any one or more of, for instance, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port such as a V.90, V.34 or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), CDMA (Code Division Multiple Access) or TDMA (Time Division Multiple Access), cellular phone networks, GPS (Global Positioning System), CDPD (cellular digital packet data), RIM (Research in Motion, Limited) duplex paging network, Bluetooth radio, or an IEEE 802.11-based radio frequency network. The network 120 can further include or interface with any one or more of an RS-232 serial connection, an IEEE-1394 (Firewire) connection, a Fiber Channel connection, an IrDA (infrared) port, a SCSI (Small Computer Systems Interface) connection, a USB (Universal Serial Bus) connection or other wired or wireless, digital or analog interface or connection, mesh or Digi® networking.

In general, the server 105 may be generally described as a particular purpose computing environment that includes executable instructions that are configured to provide the interactive project planning features, which will be described in greater detail herein.

The server 105 generally comprises a processor 120 and a memory 125. According to some embodiments, the memory 125 comprises logic (e.g., instructions or applications) that can be executed by the processor 120 to perform various methods.

In one embodiment, the logic includes a project planning web application "application 125A", which includes multiple application layers, such as a presentation layer 130, a business logic layer 135, a persistence layer 140, and an integration layer 145. In some embodiments, the application 125A includes a pull planning layer 165 that can be layered within the business logic layer 135. The pull planning layer 165 can also be provided in a single layer that is distinct from the business logic layer. It is noteworthy that the application may include additional layers, modules, engines, or components, and still fall within the scope of the present technology. As used herein, any of the aforementioned logical components may also be embodied as an application-specific integrated circuit ("ASIC"), an electronic circuit, a processor (shared, dedicated, or group) that executes one or more software or firmware programs, a combinational logic circuit, and/or other suitable components that provide the described functionality.

It will be understood that the functionalities described herein, which are attributed to the server 105 and application 125A, may also be executed within the client 110. That is, the client 110 may be programmed to execute the functionalities described herein, by executing a mobile version of the application 125A. In other instances, the server 105 and client 110 may cooperate to provide the functionalities described herein, such that the client 110 is provided with a client-side application that interacts with the server 105 such that the server 105 and client 110 operate in a client/server relationship. Complex computational features may be executed by the server 105, while simple operations that require fewer computational resources may be executed by the client 110, such as data gathering and data display.

Figure 4A:
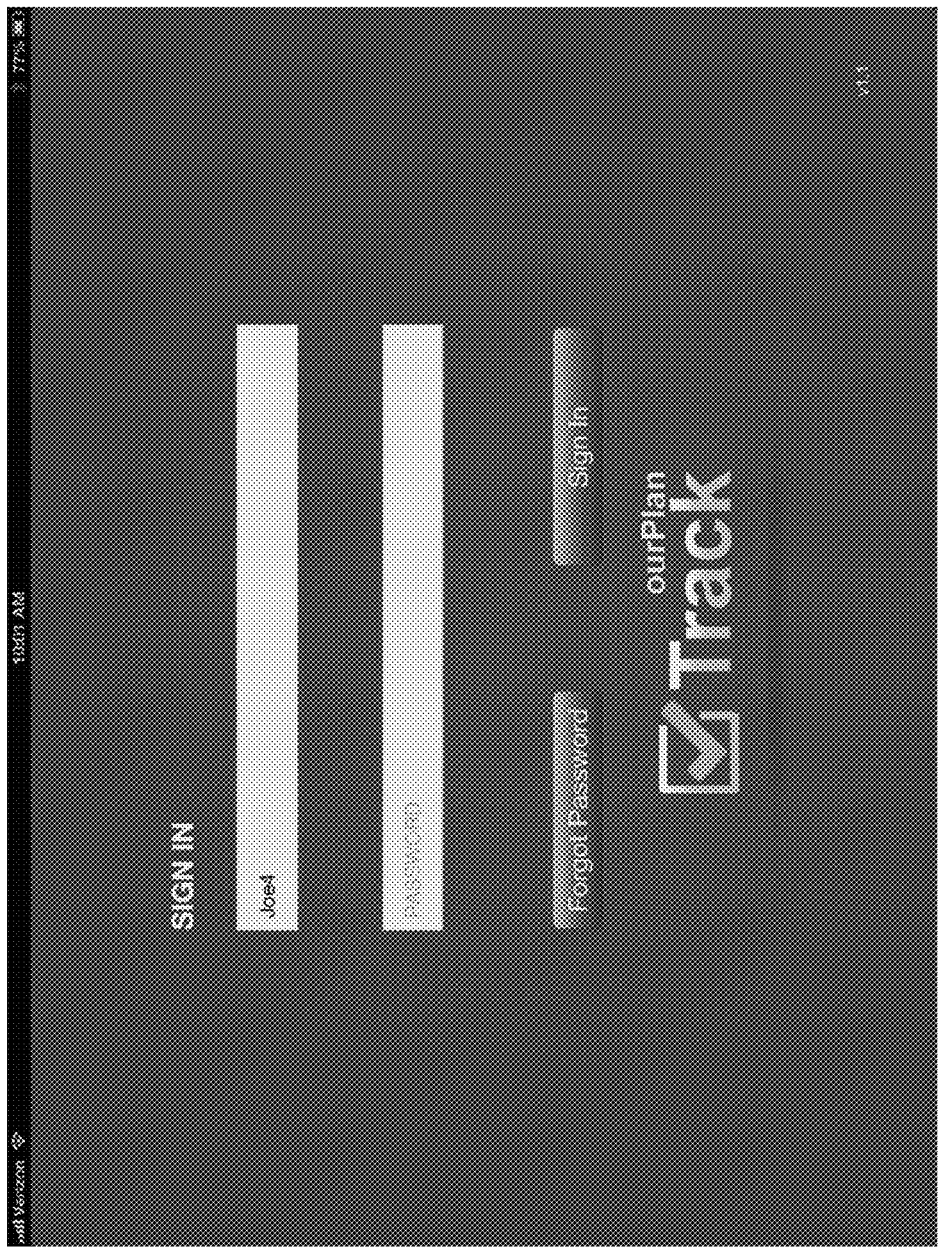
FIGS. 4A-B show an exemplary graphical user interface for a mobile device application.
Figure 4B:
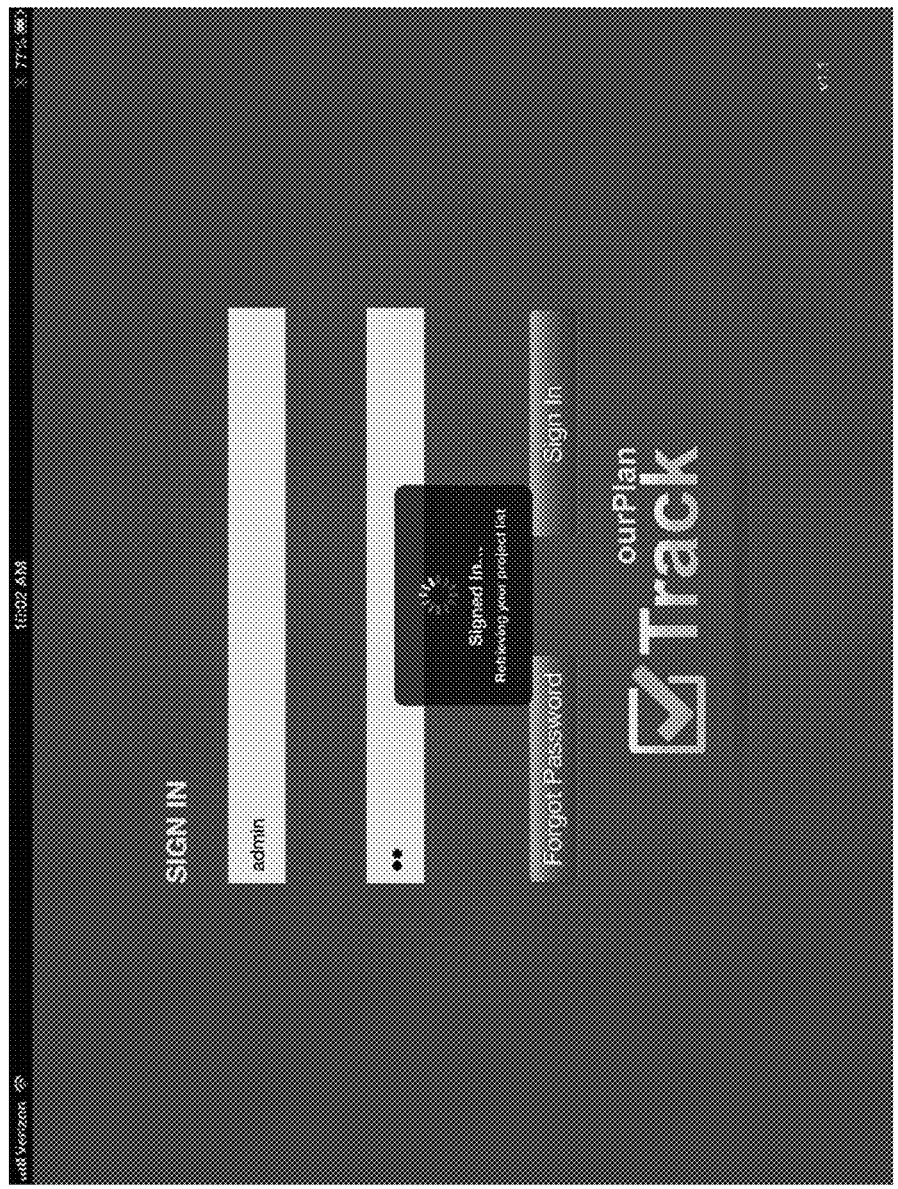
Figure 5A:
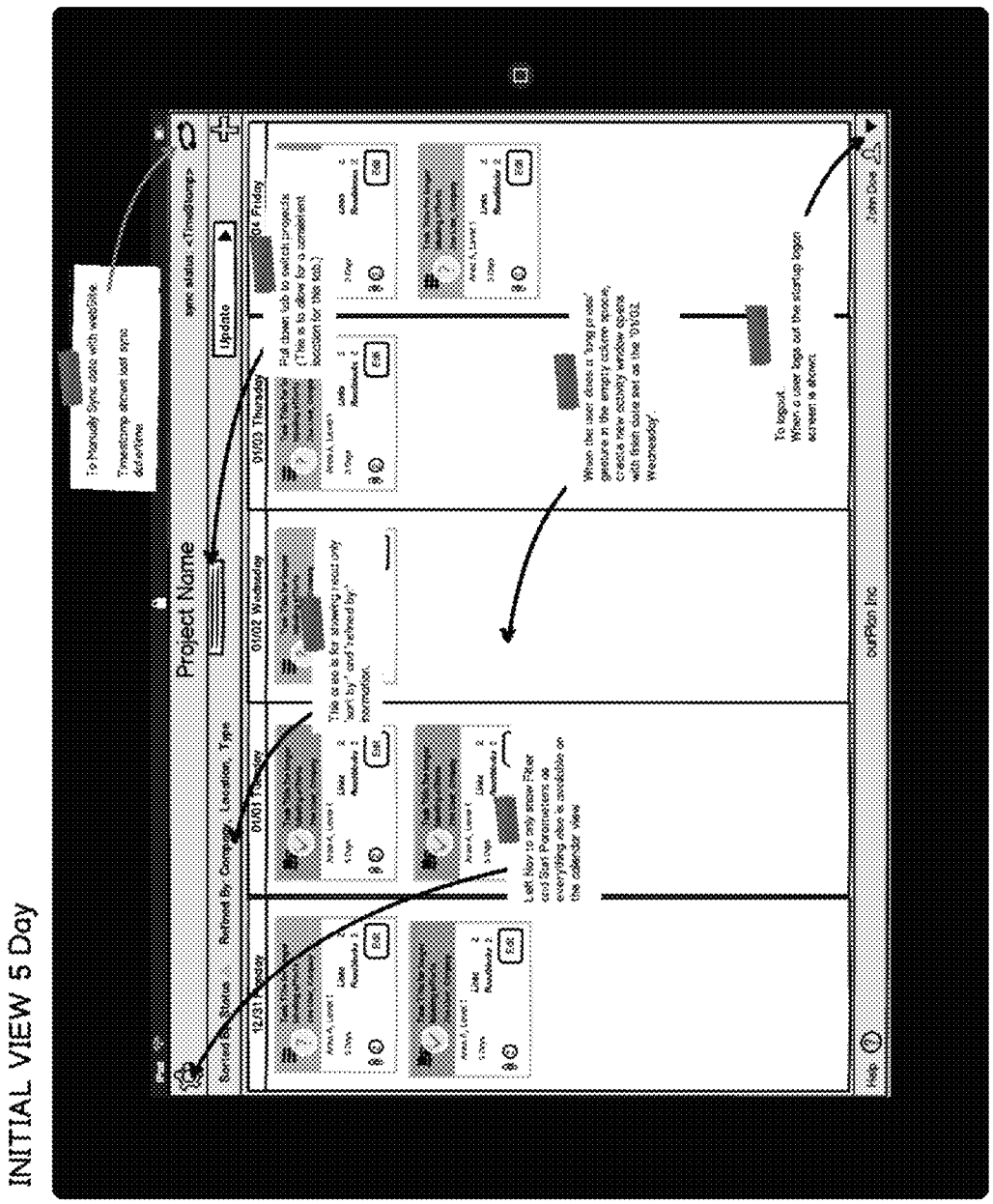
FIGS. 5A-G show an exemplary graphical user interface of initial views of a mobile device application.
Figure 5B:
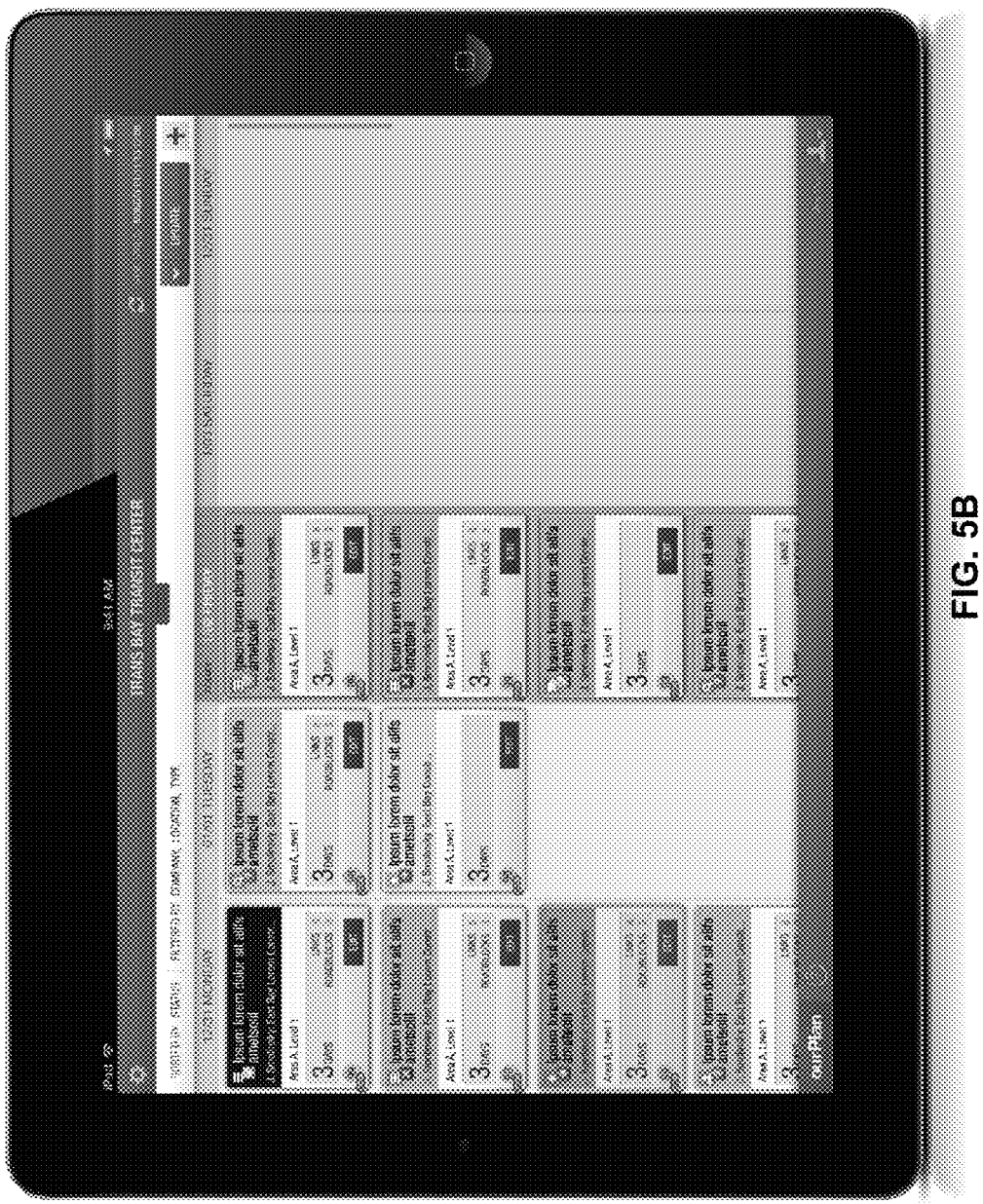
Figure 5C:
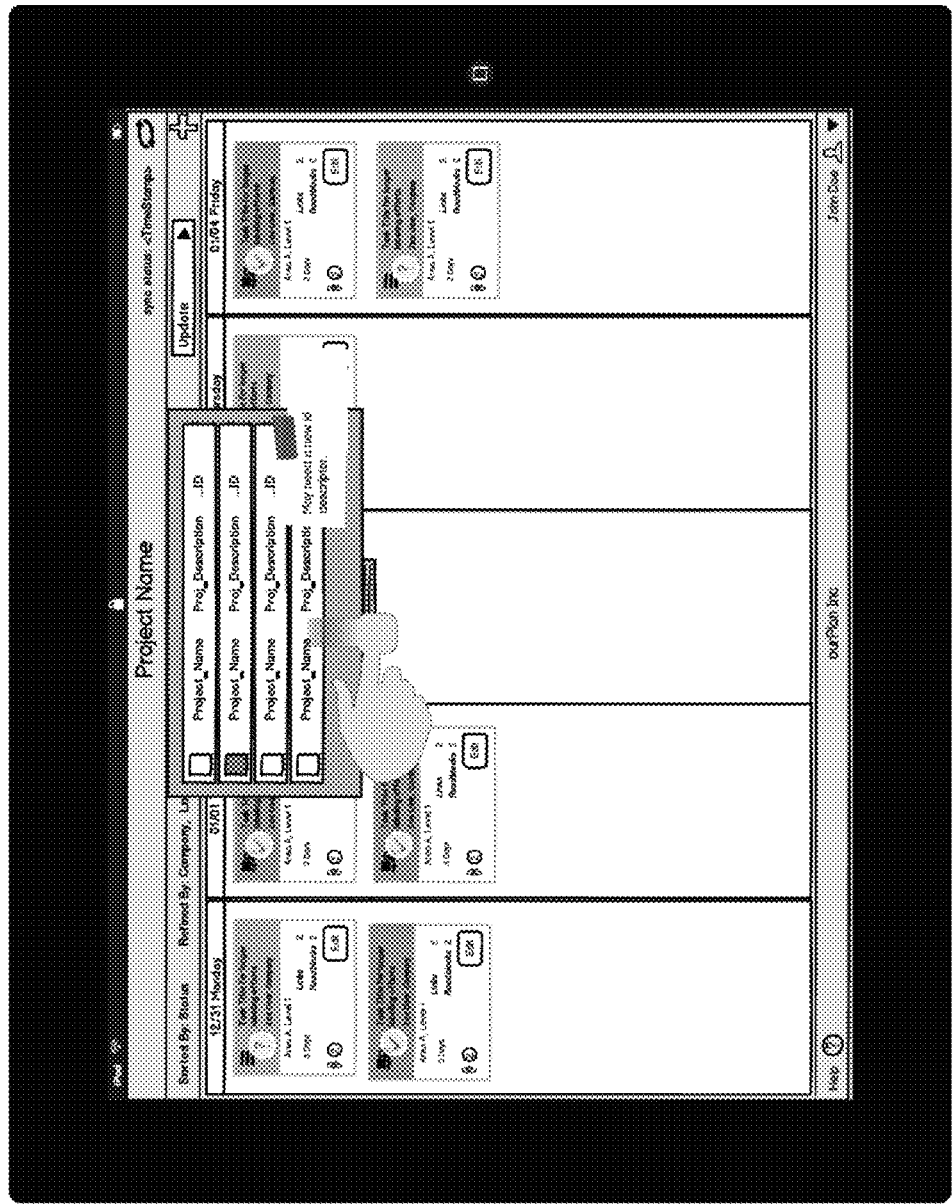
Figure 5D:
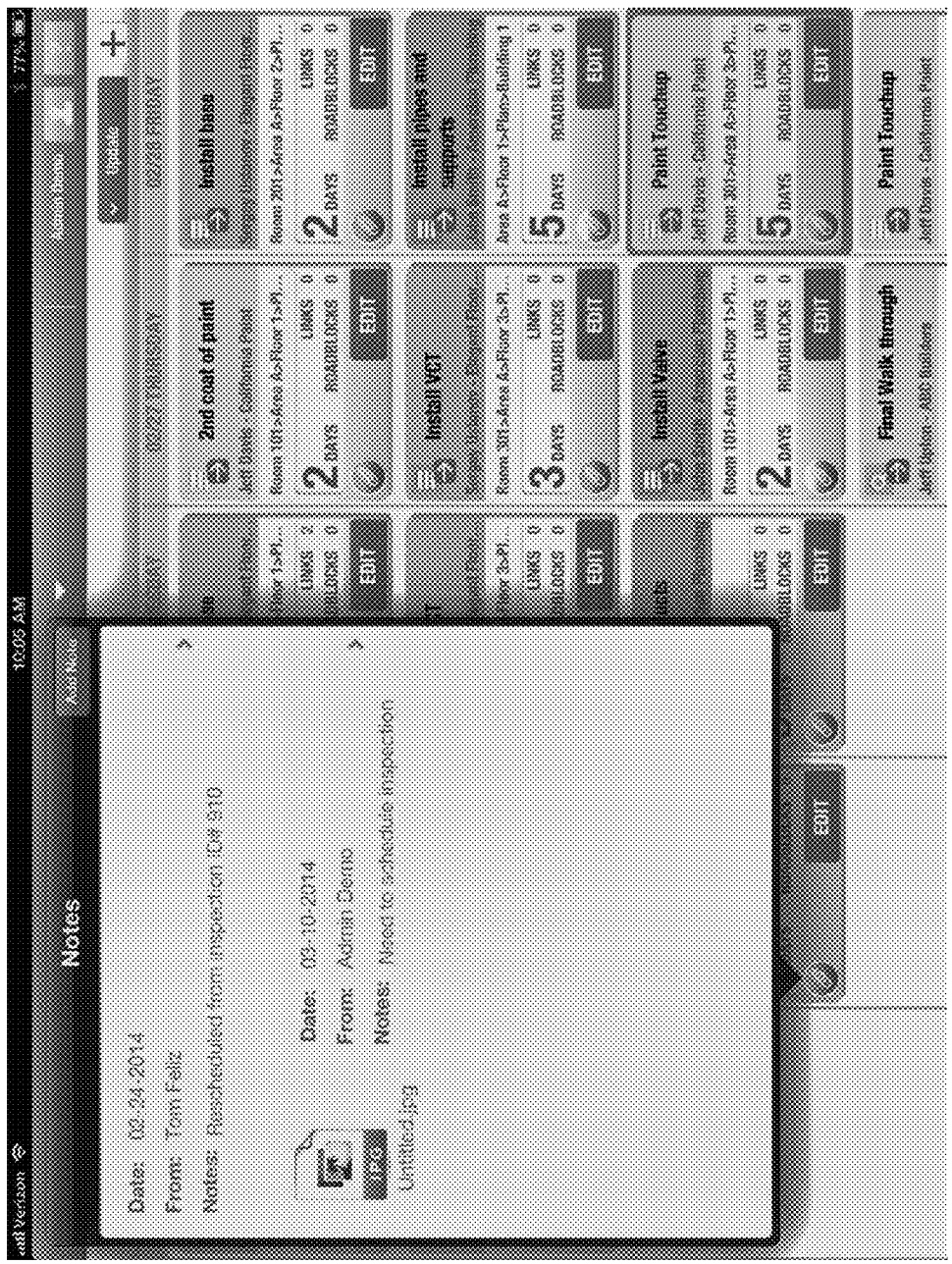
Figure 5E:
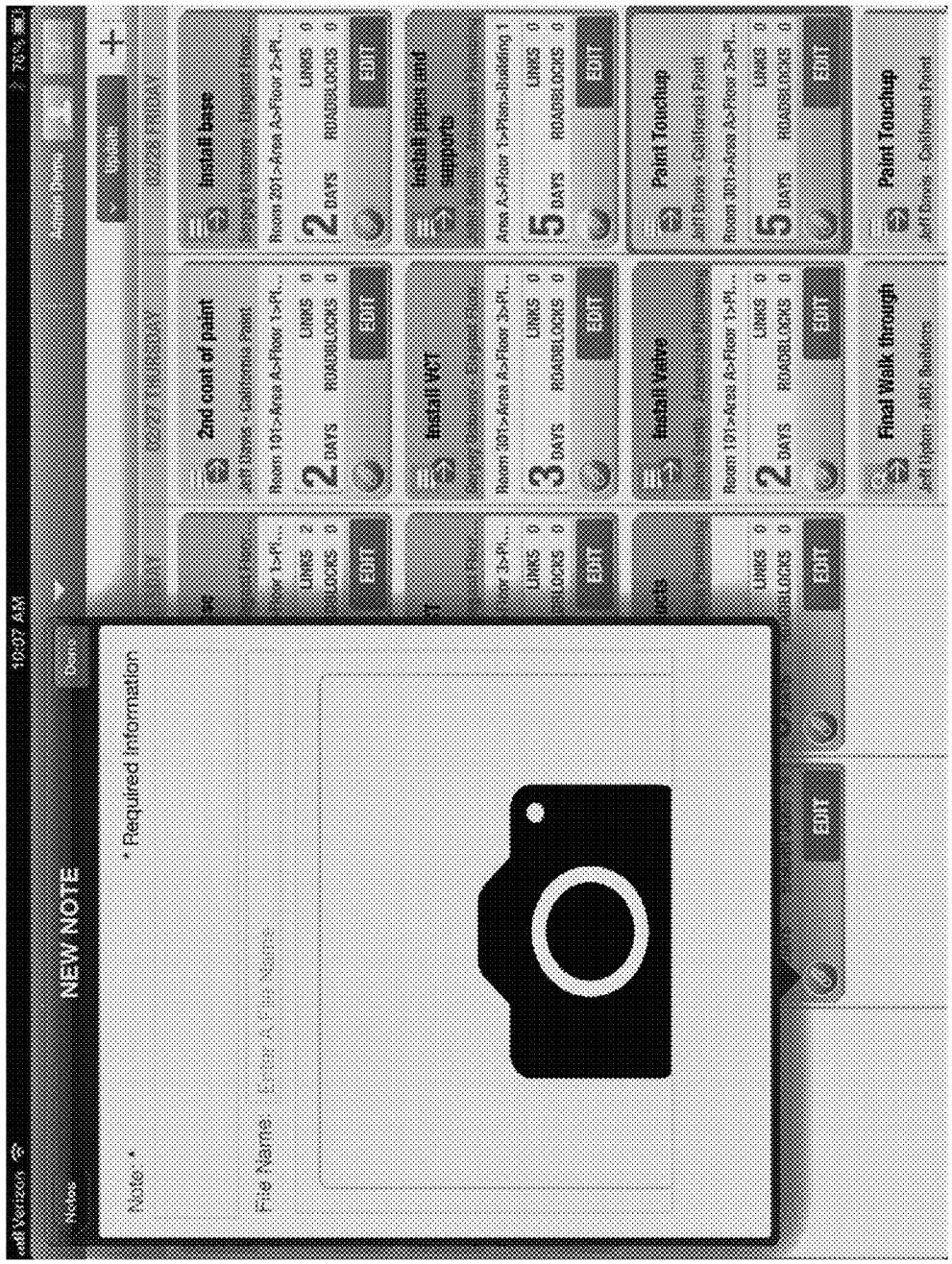
Figure 5F:
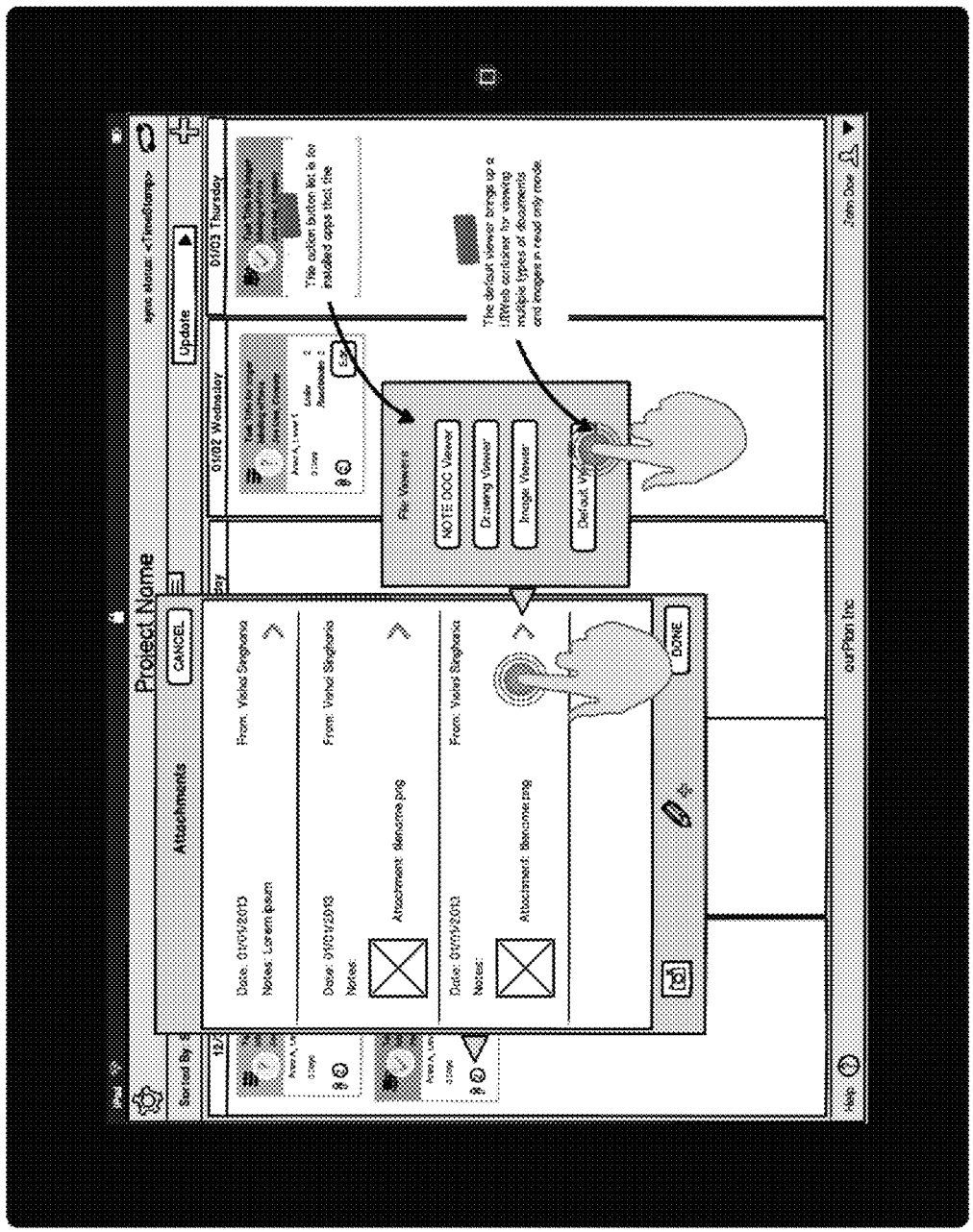
Figure 5G:
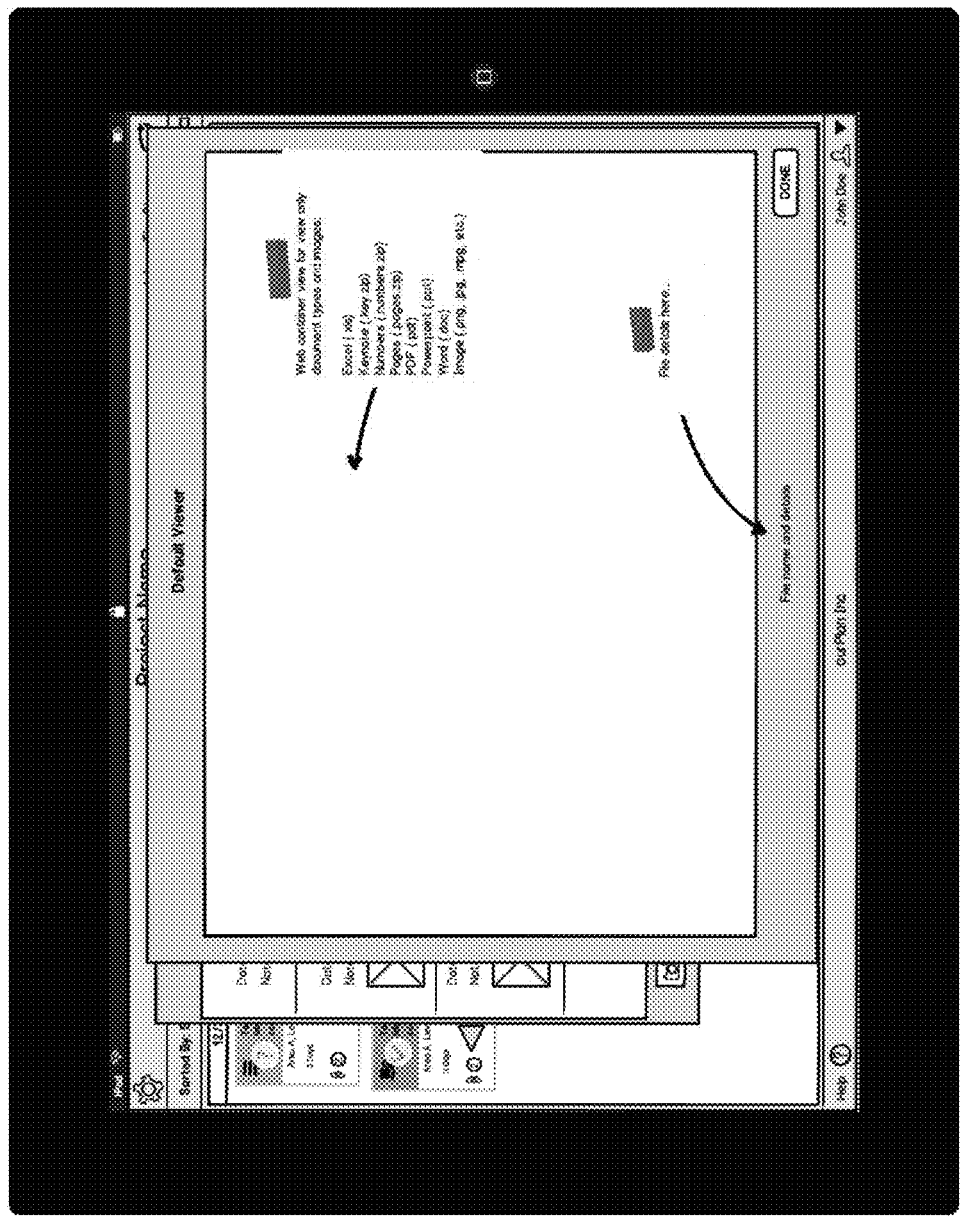
Figure 6A:
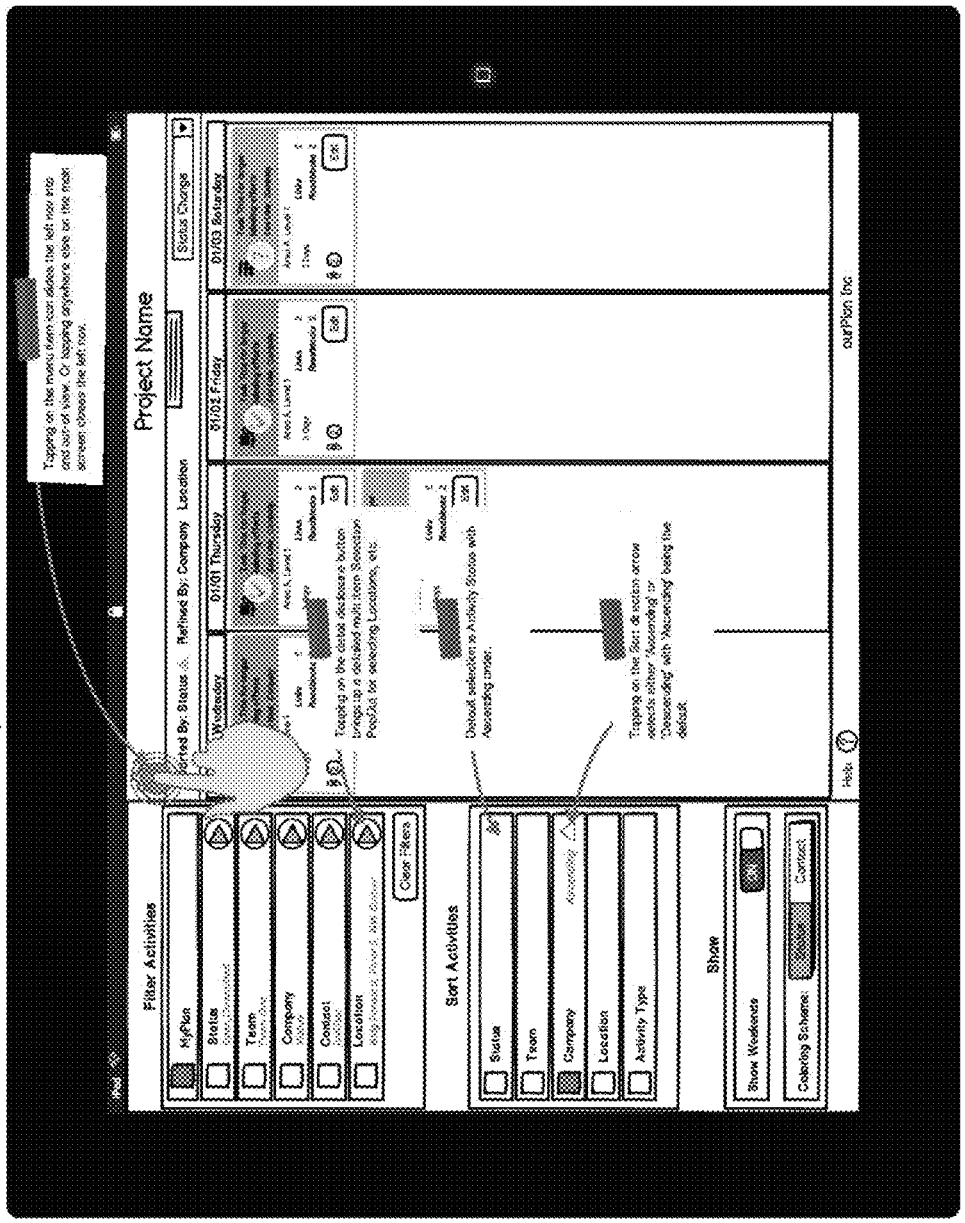
FIGS. 6A-E show an exemplary graphical user interface with navigation and filtering options of a mobile device application.
Figure 6B:
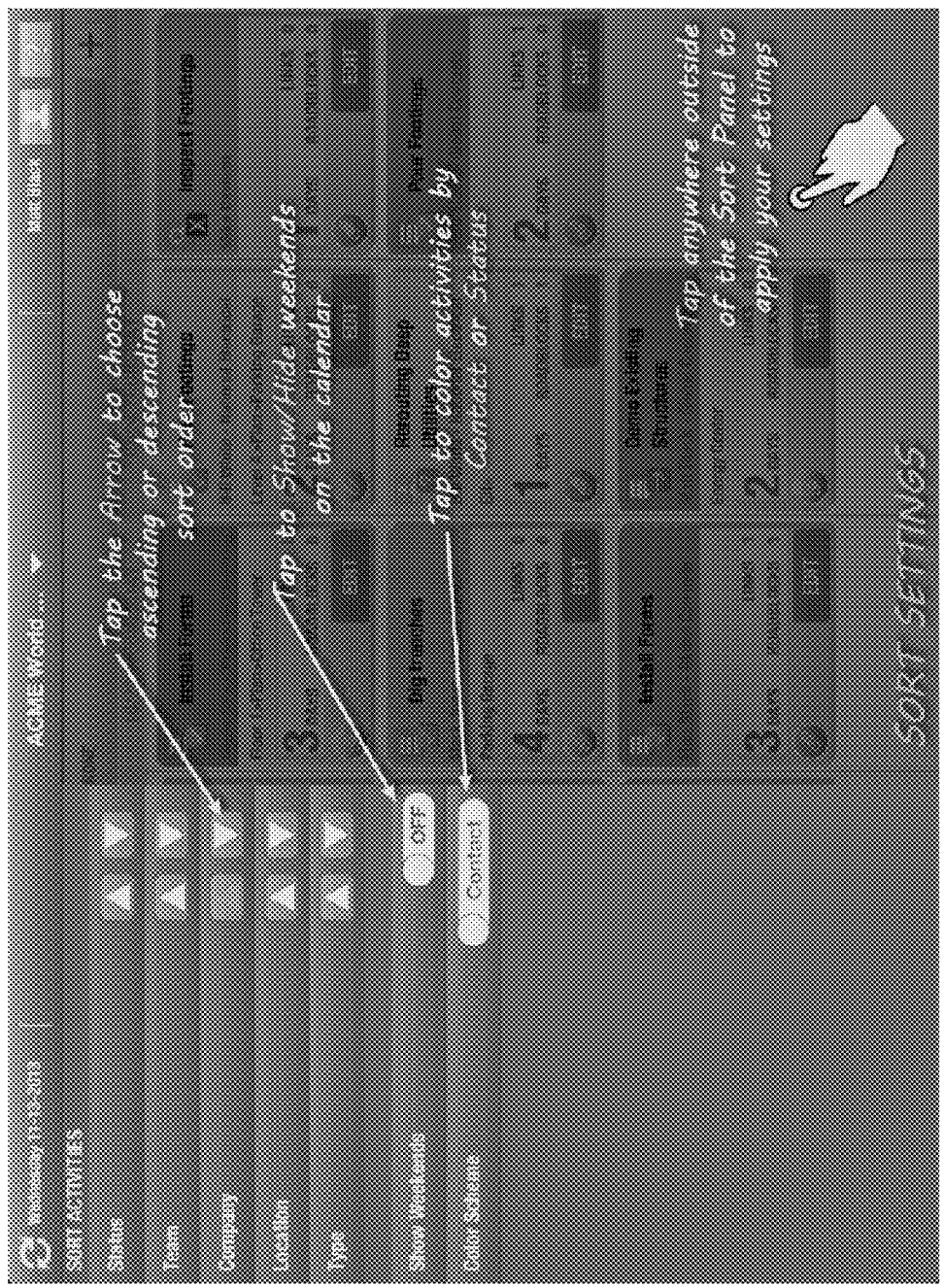
Figure 6C:
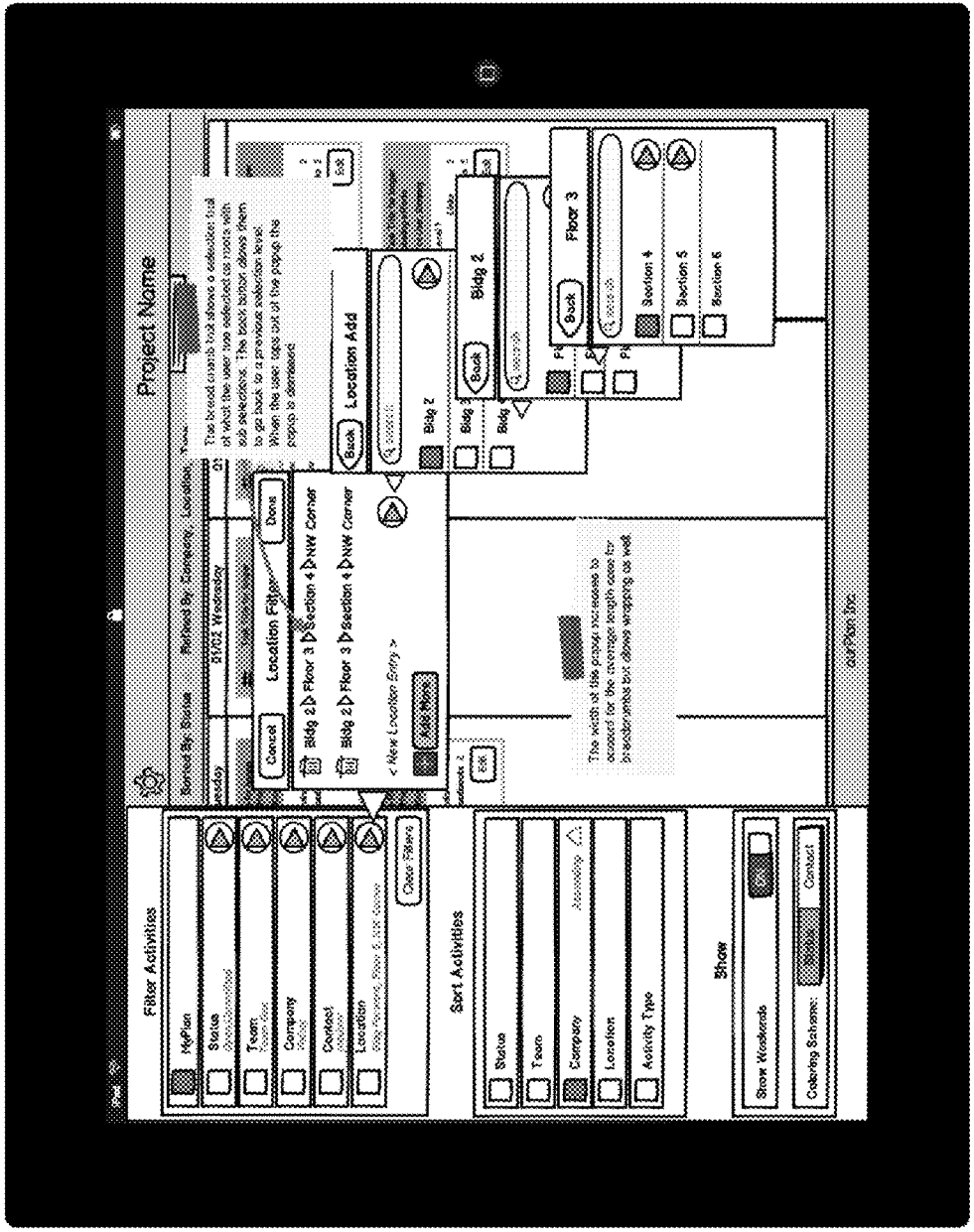
Figure 6D:
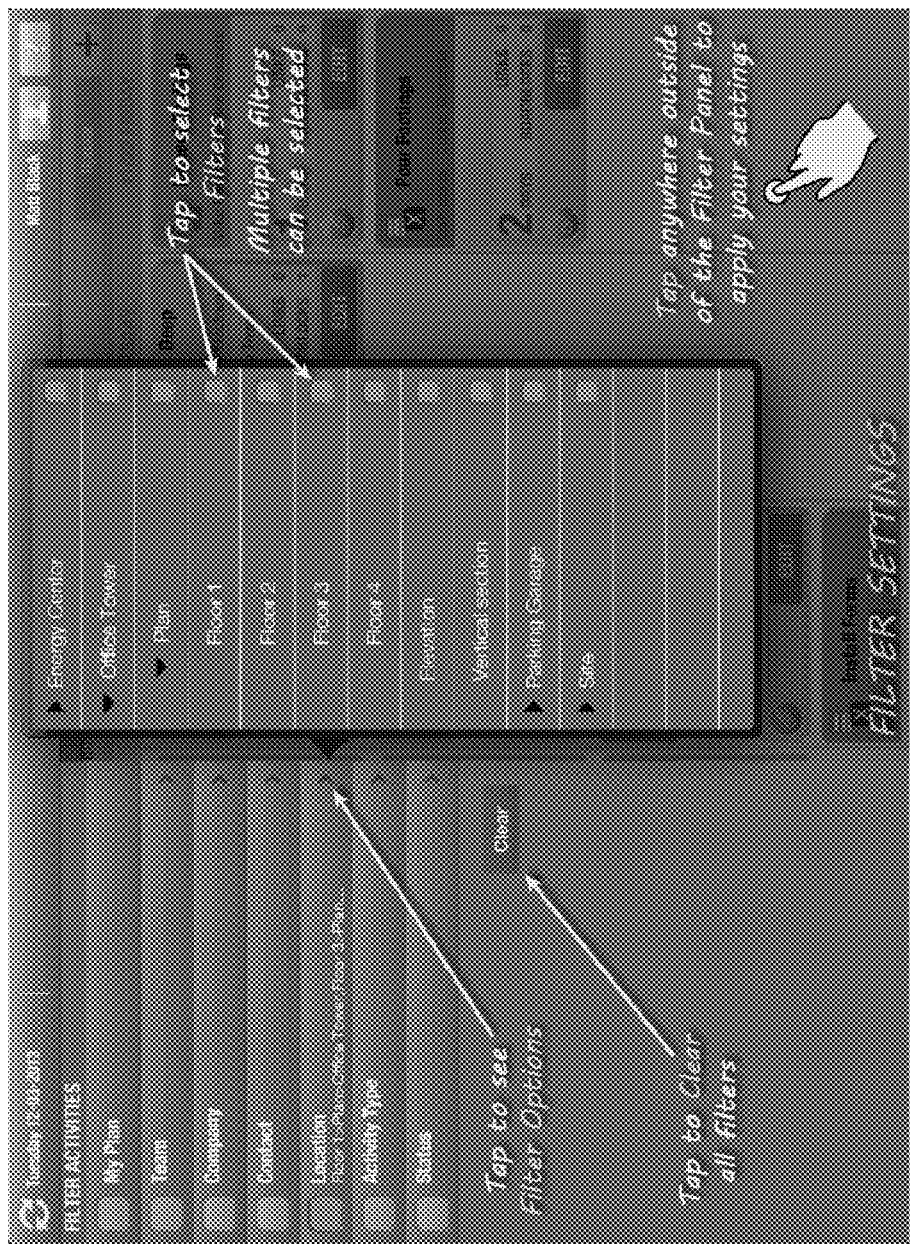
Figure 6E:
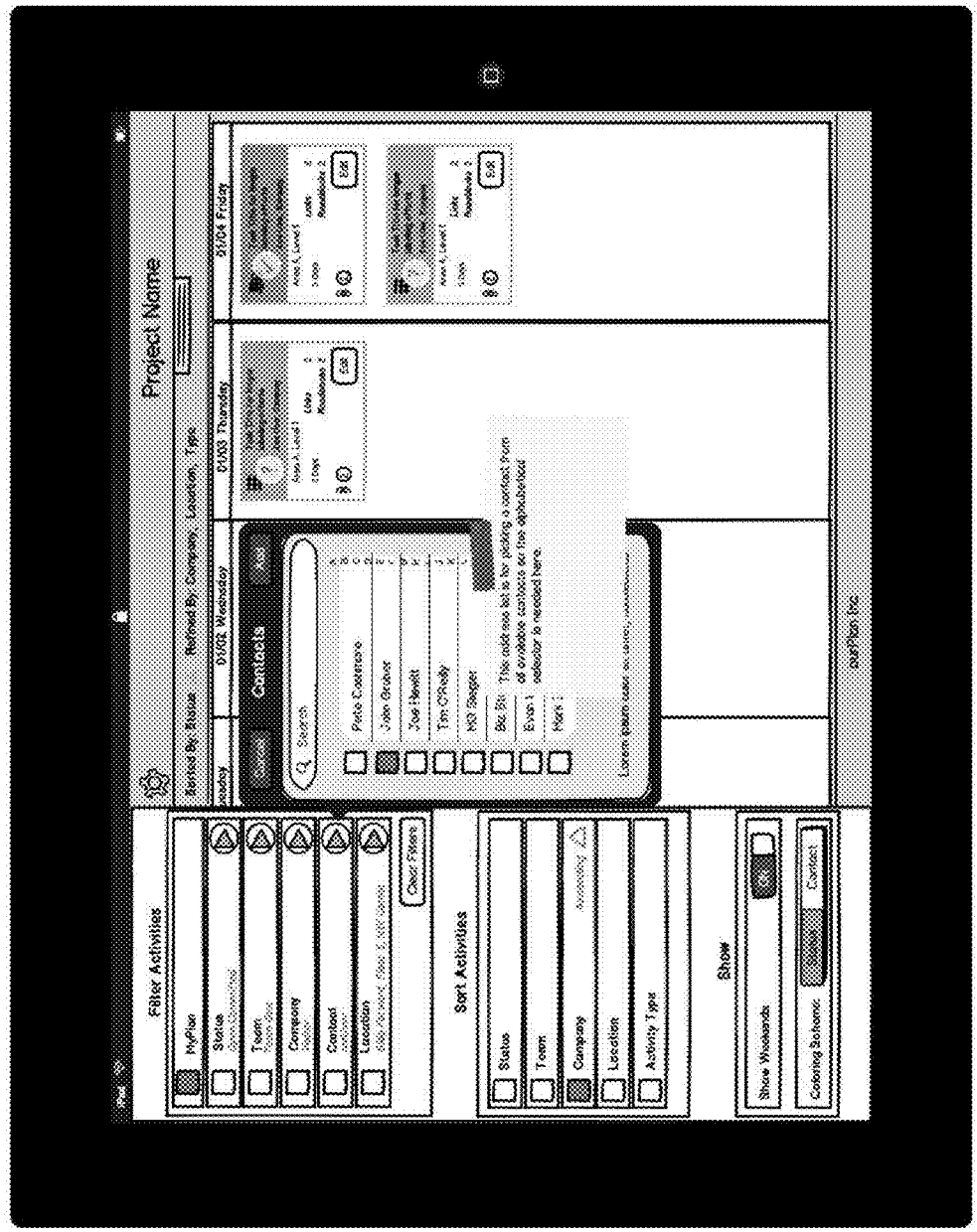

Broadly described, the presentation layer 130 may include graphical user interfaces and an integration gateway as illustrated in FIGS. 4A-B. The business logic layer 135 may include the business logic for controlling transactions across multiple resources and coordinating responses. The persistence or data access layer 140 may interface with the business logic layer and databases to send data to or retrieve data from a database management system 150. The integration layer 145 may serve as an interface between the business logic layer 135 and the external or third party systems 160 and CMIC 155.

Figure 2:
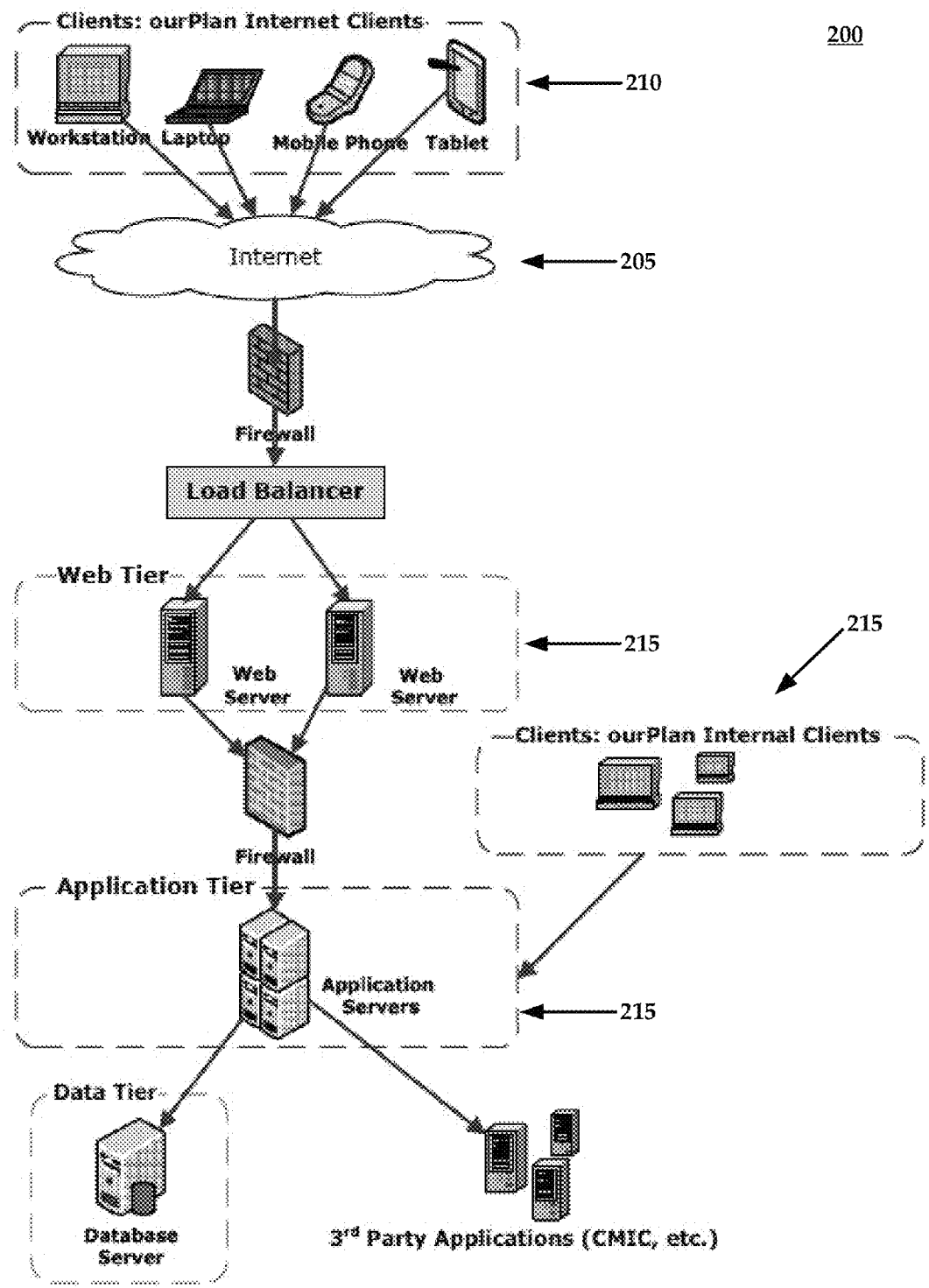
FIG. 2 shows an exemplary deployment model.

FIG. 2 shows an exemplary computing environment or system 200 which may deploy an embodiment of the web application. Such a system 200 may include connections over a network 205, such as the Internet, to clients 210 using various devices such as computers, laptops, mobile phones, tablets or other similar devices. Other alternate configurations of the computing environment are also contemplated. The web application 220 (application tier) is deployed through the web tier 215, via a plurality of servers. An internal client tier 225 is also present and allows for direct access to the web application 220, rather than through the web tier 215.

Figure 3:
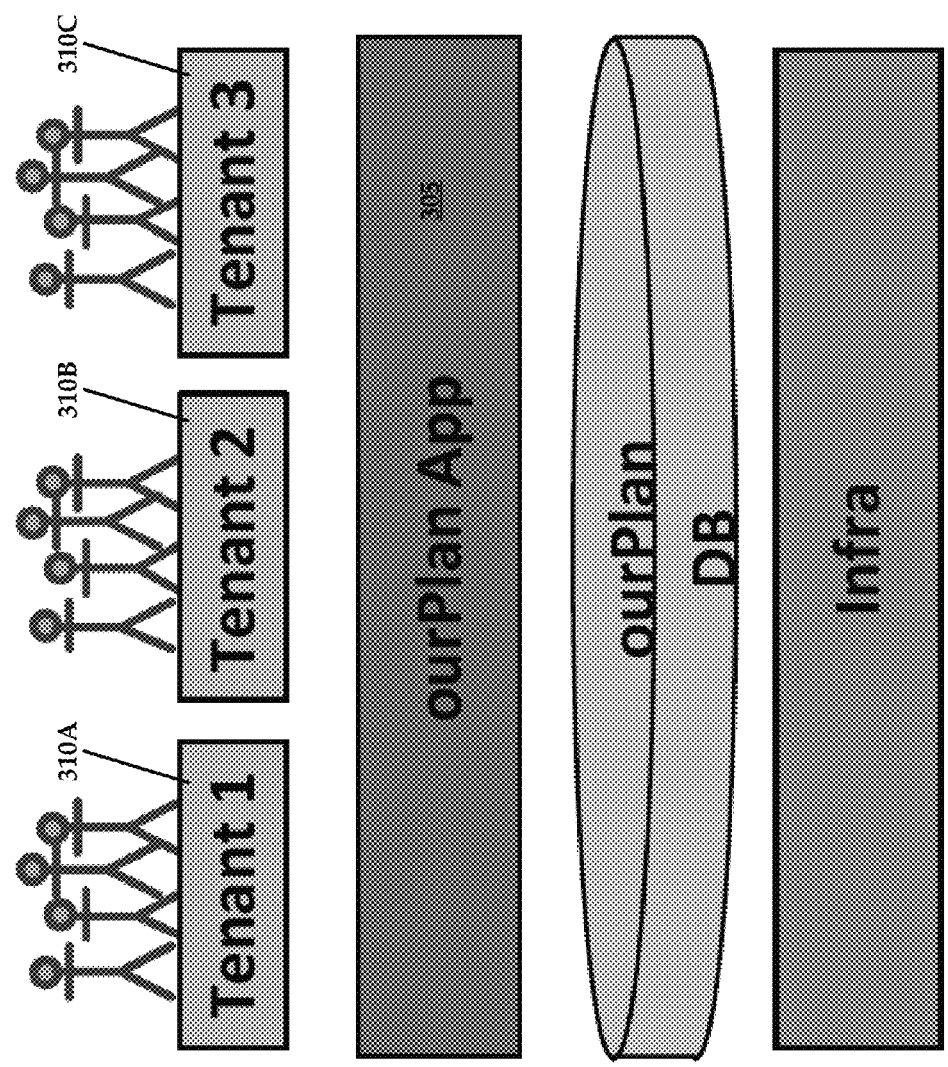
FIG. 3 shows an exemplary tenancy model.

FIG. 3 shows a block diagram of the multi-tenancy aspect of an embodiment of the present technology. In one embodiment a single deployment of a web application 305, including a cluster of web applications acting as one logical application, may service all tenants 310A-C.

FIGS. 4-14 illustrate exemplary graphical user interfaces for a companion mobile app which is synced with a web application 125A provided by the server 105 of FIG. 1. The companion application is used on mobile devices such as tablets, smartphones, etc. Users are presented with a login screen as shown in FIGS. 4A-B. After a user logs into the app, initial views of the project may reflect the views a user of the web application, as shown in FIGS. 5A-G. For example, the app may show a five day view, allow for switching between projects, allow app users to upload images or other attachments, take photos from within the app, and preview the attachments.

Figure 7A:
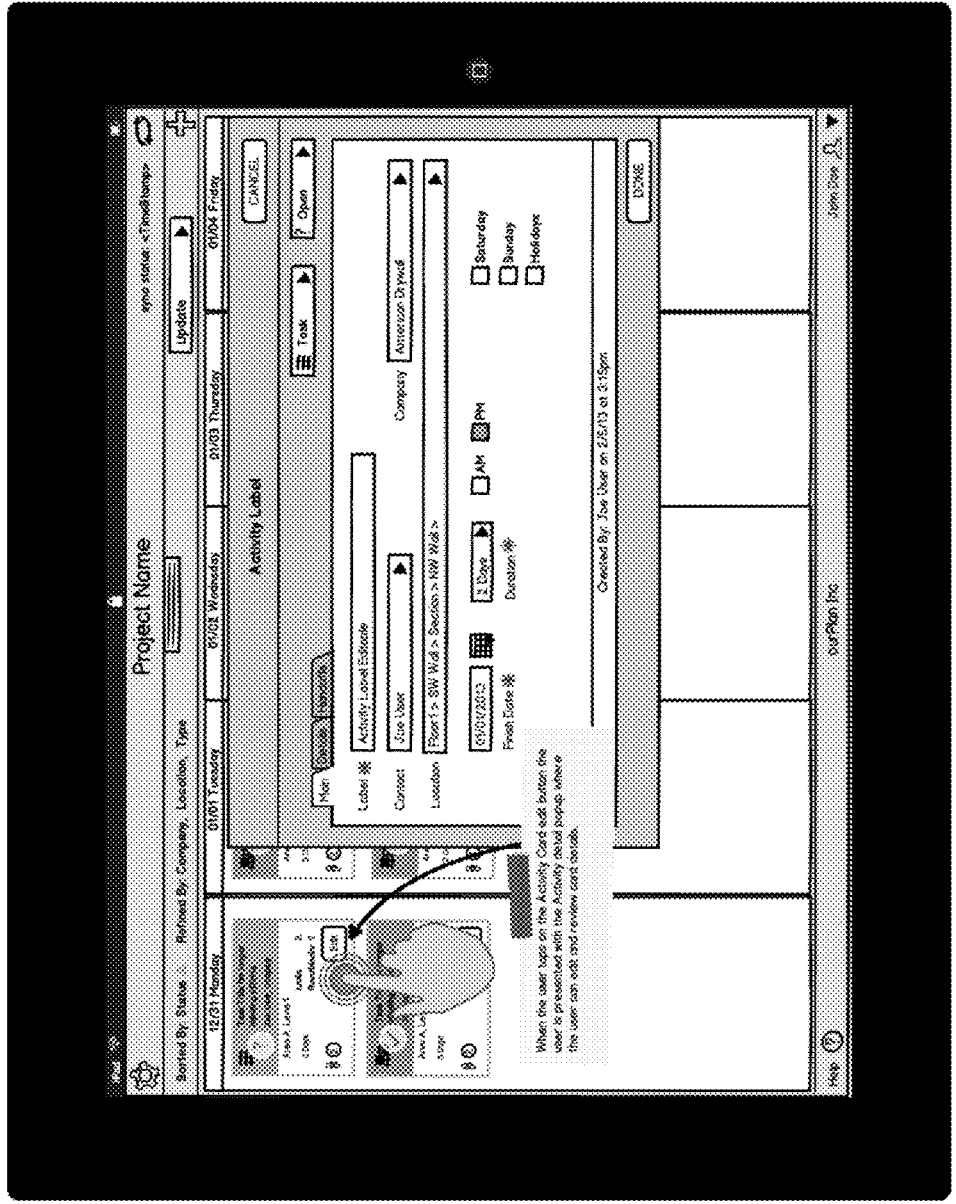
Figure 7B:
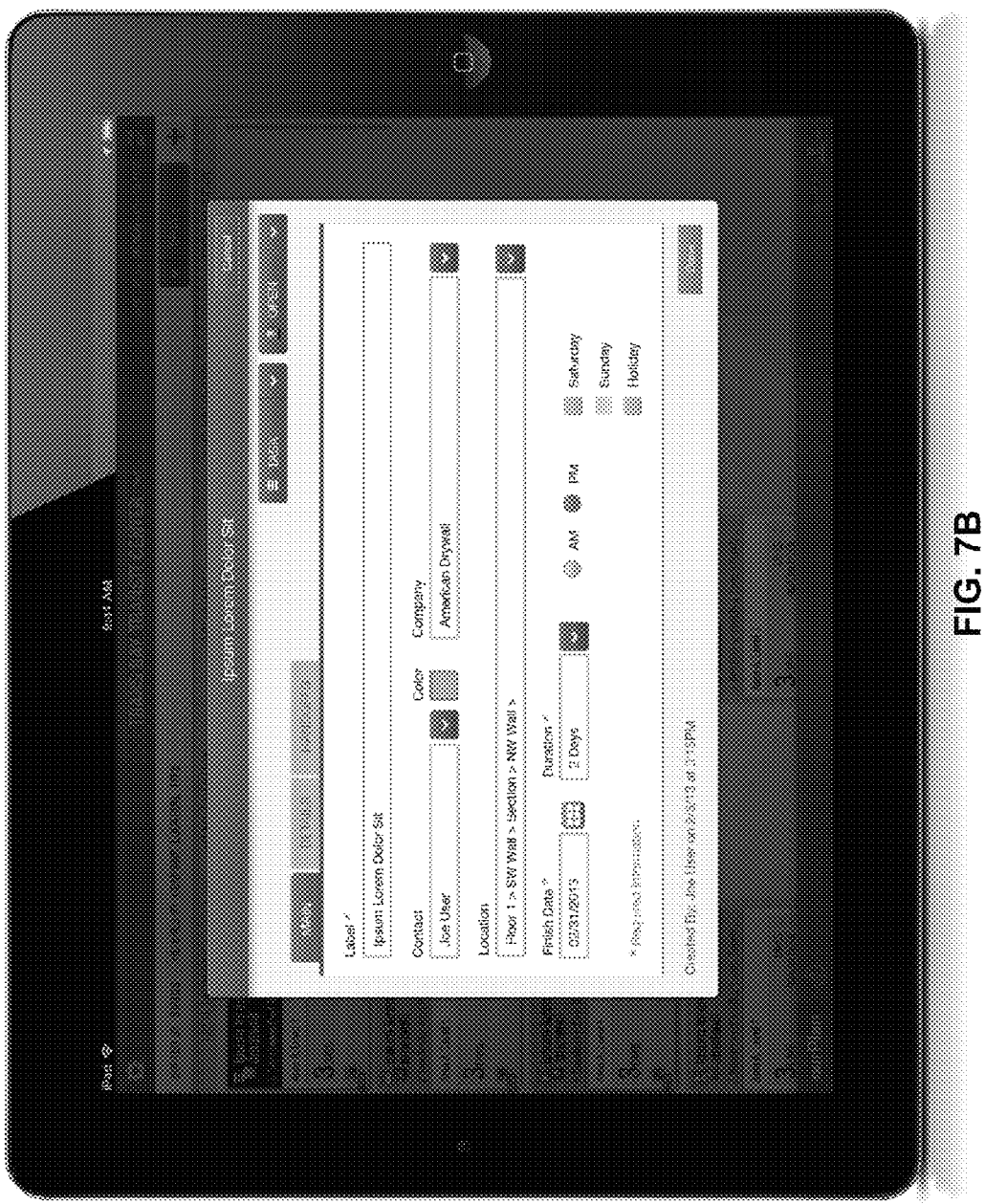
Figure 7D:
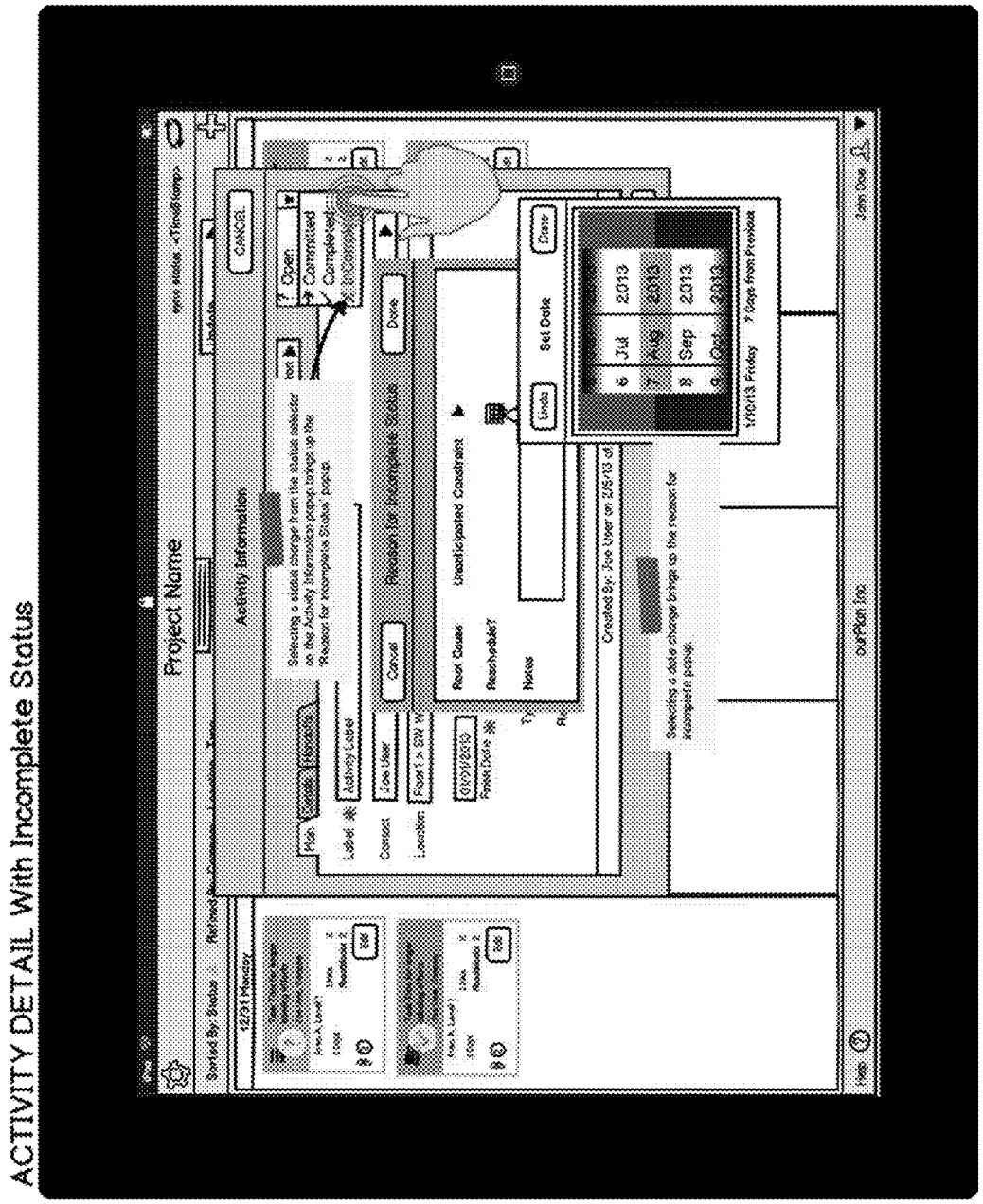
Figure 7E:
Figure 7F:
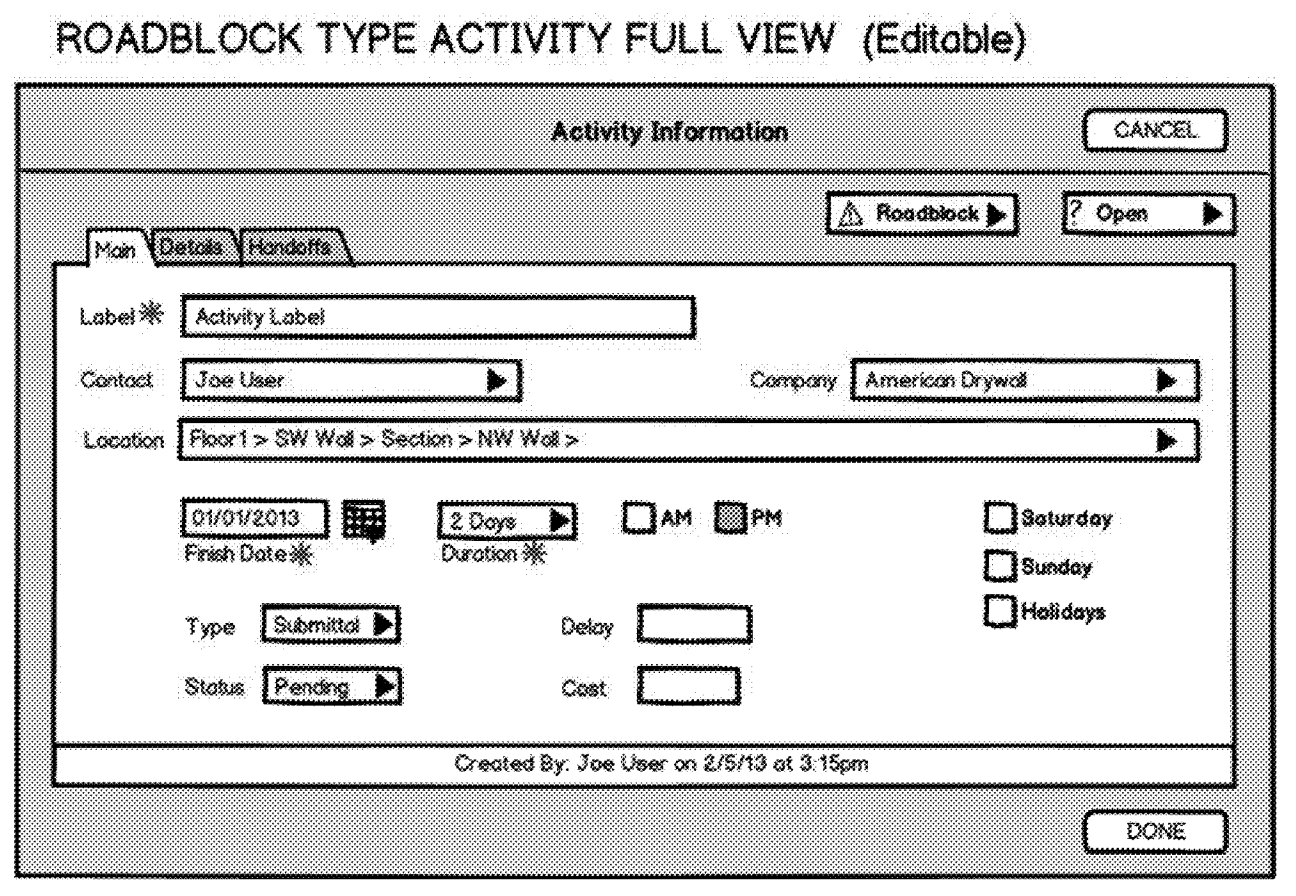
Figure 7G:
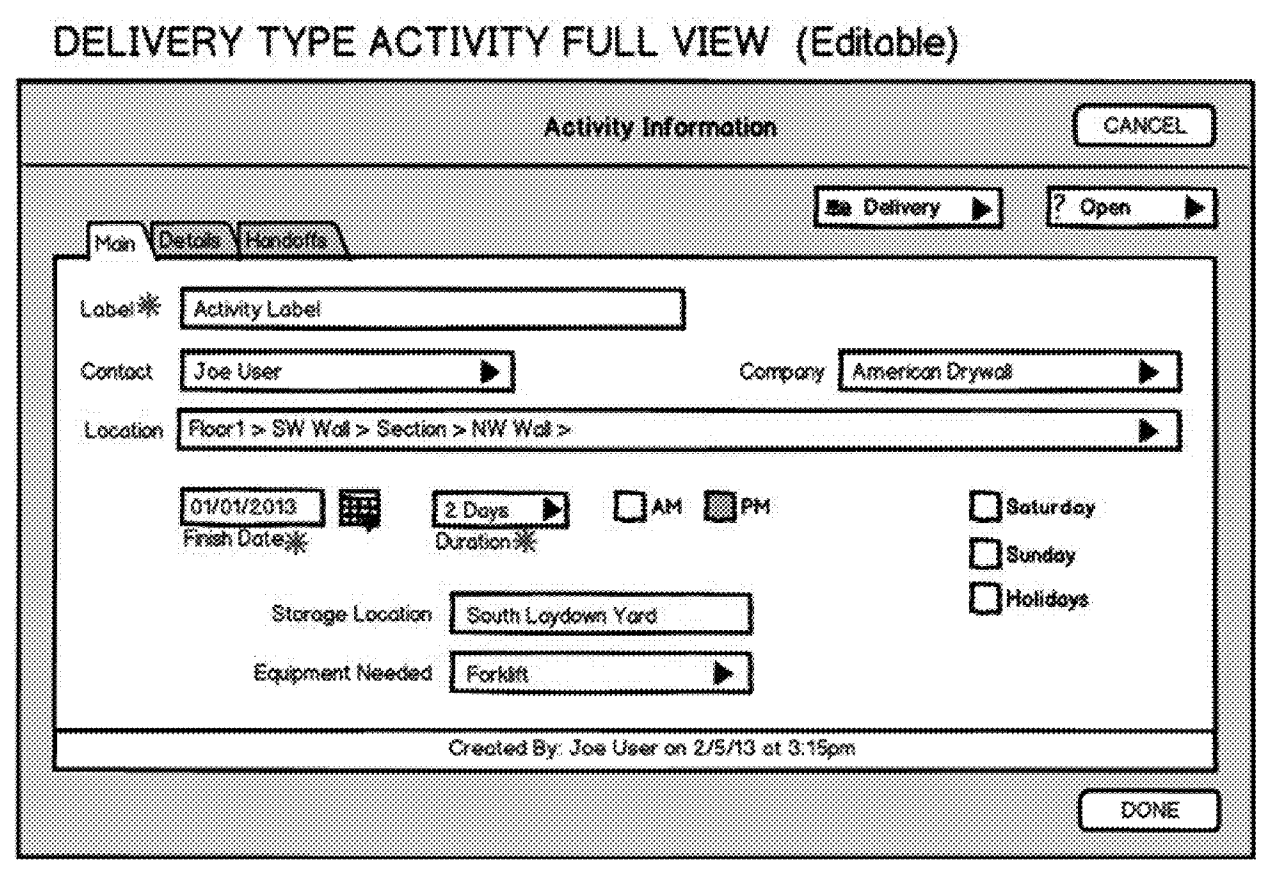
Figure 7H:
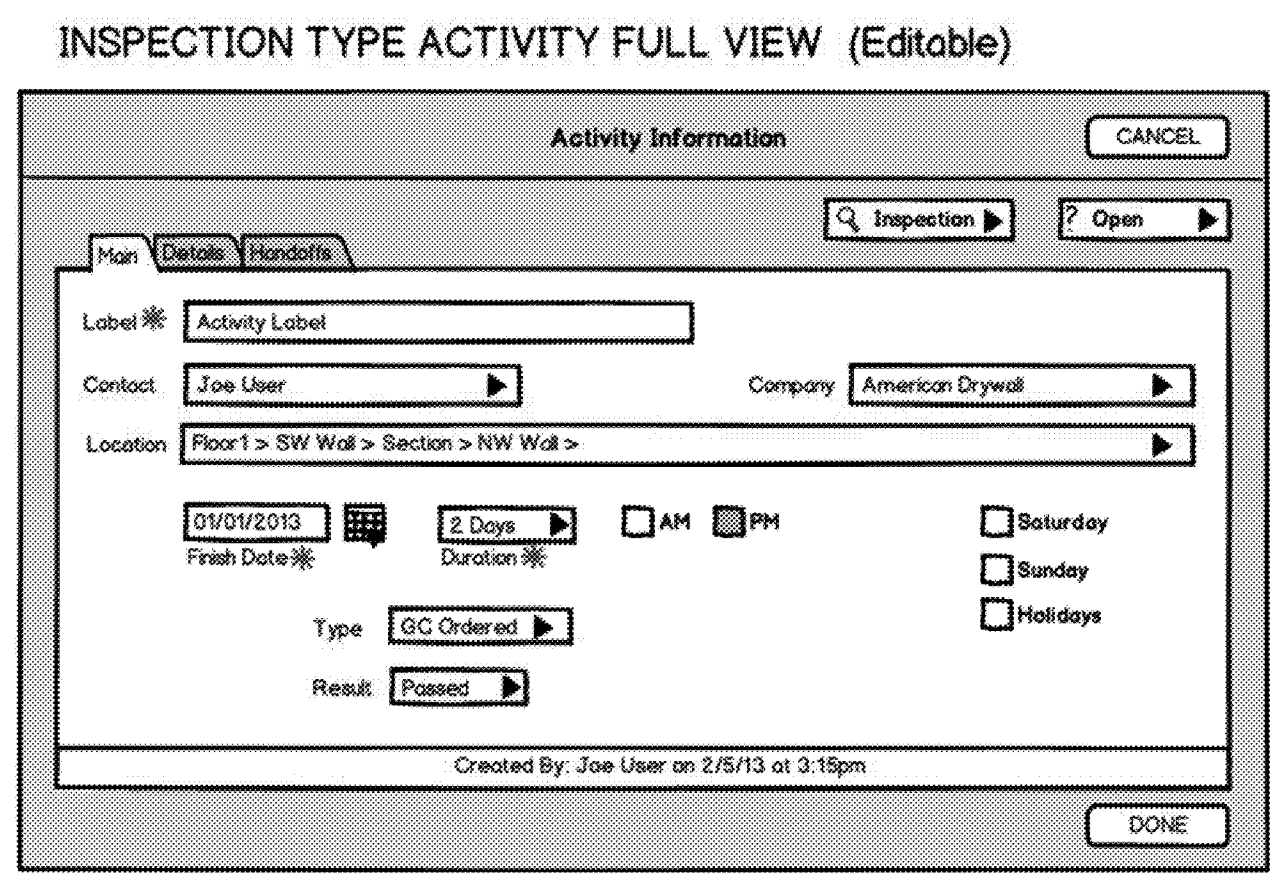
Figure 7I:
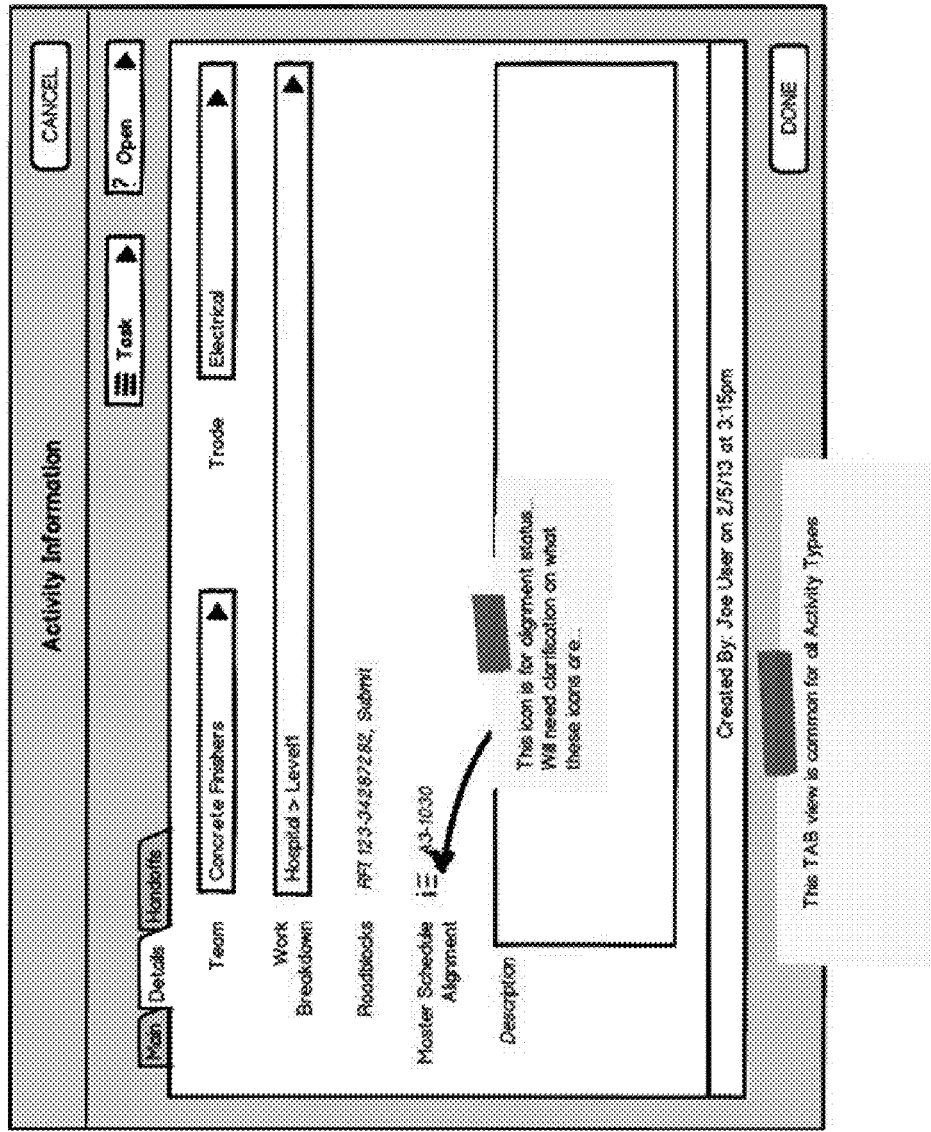
Figure 7J:
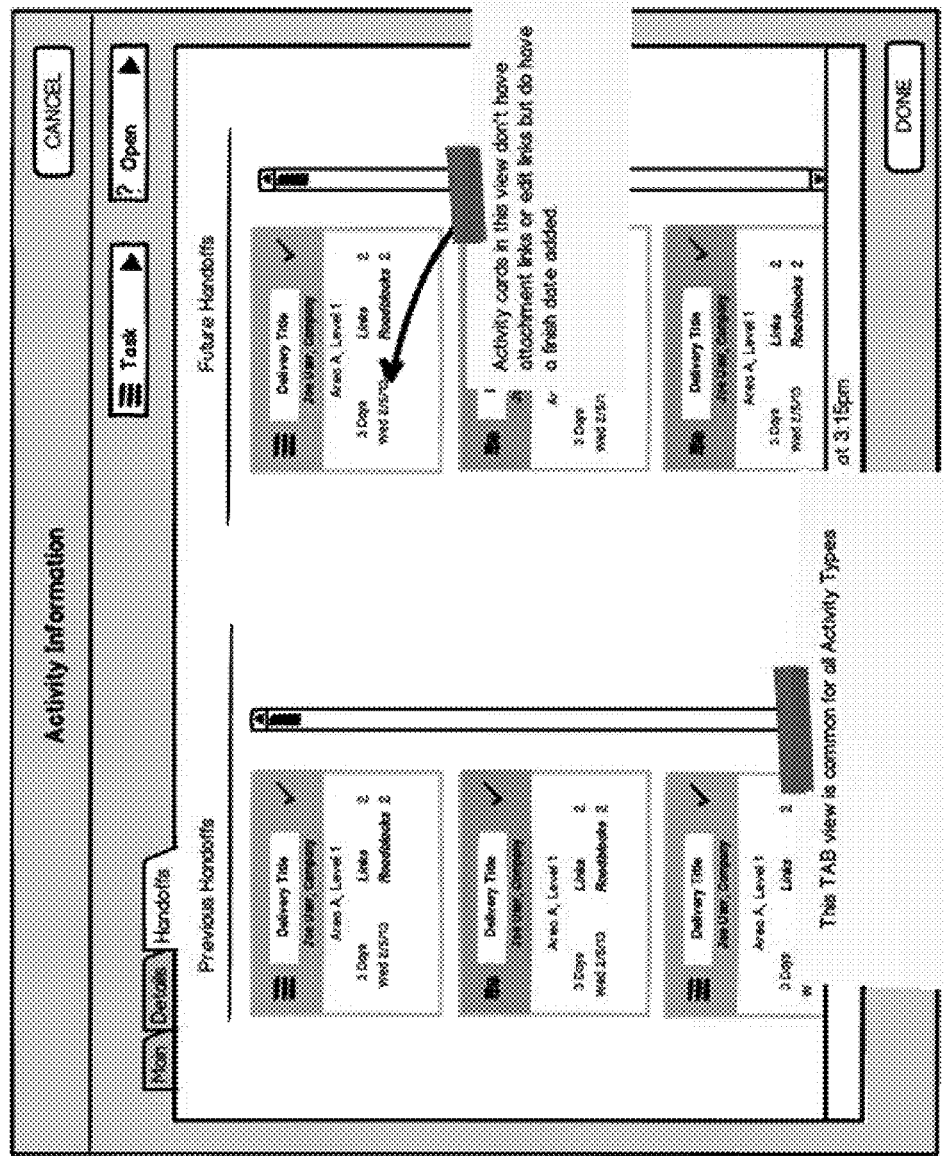
Figure 8A:
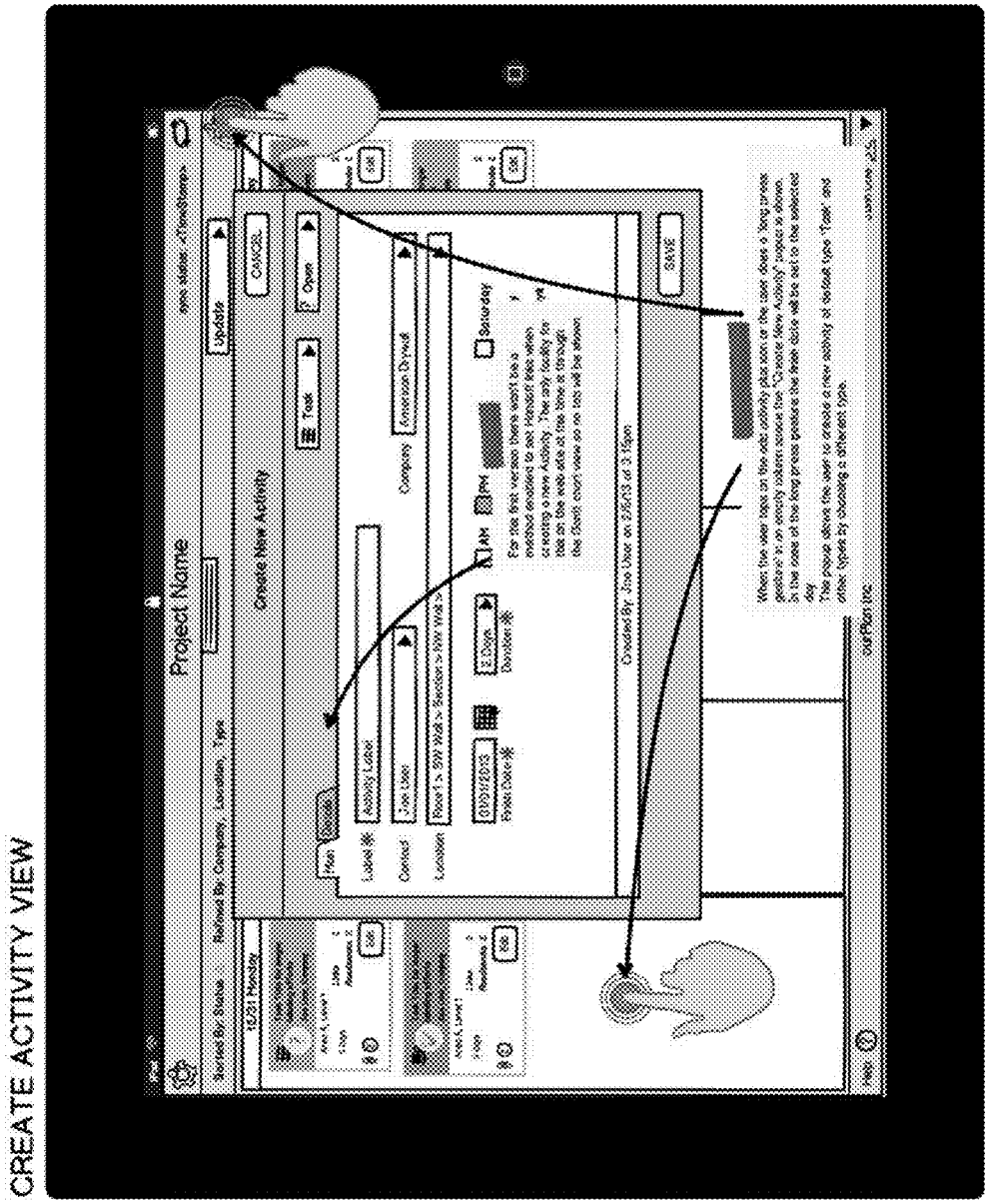
FIGS. 8A-B show an exemplary graphical user interface for creating a new activity in a mobile device application.
Figure 8B:
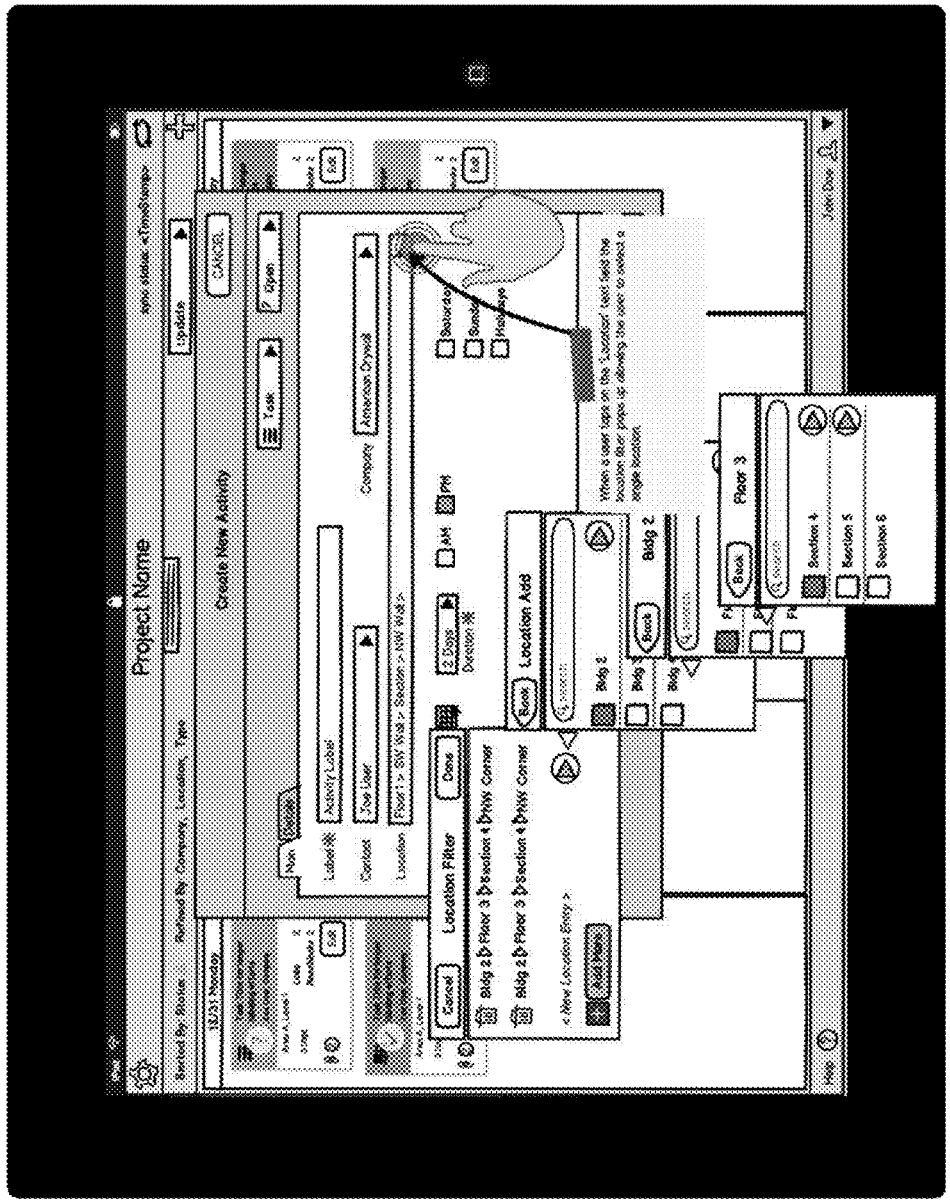

Users may also navigate within the app using touch or other actuation to interact with filters and sorting as shown in FIGS. 6A-E. Users may bring up the menu, select filters which may bring up subsequent menus, and indicate contacts. Users may also use the app to view or edit the details of activities as shown in FIGS. 7A-J. For example, users is able to select a specific activity to edit, see details in a view only configuration, indicate an activity's status, detail the type of activity (e.g., roadblock, delivery, inspection, etc.), include details for the activity, and view or select previous and future handoffs. Users may also create new activities as shown in FIGS. 8A-B.

Figure 9A:
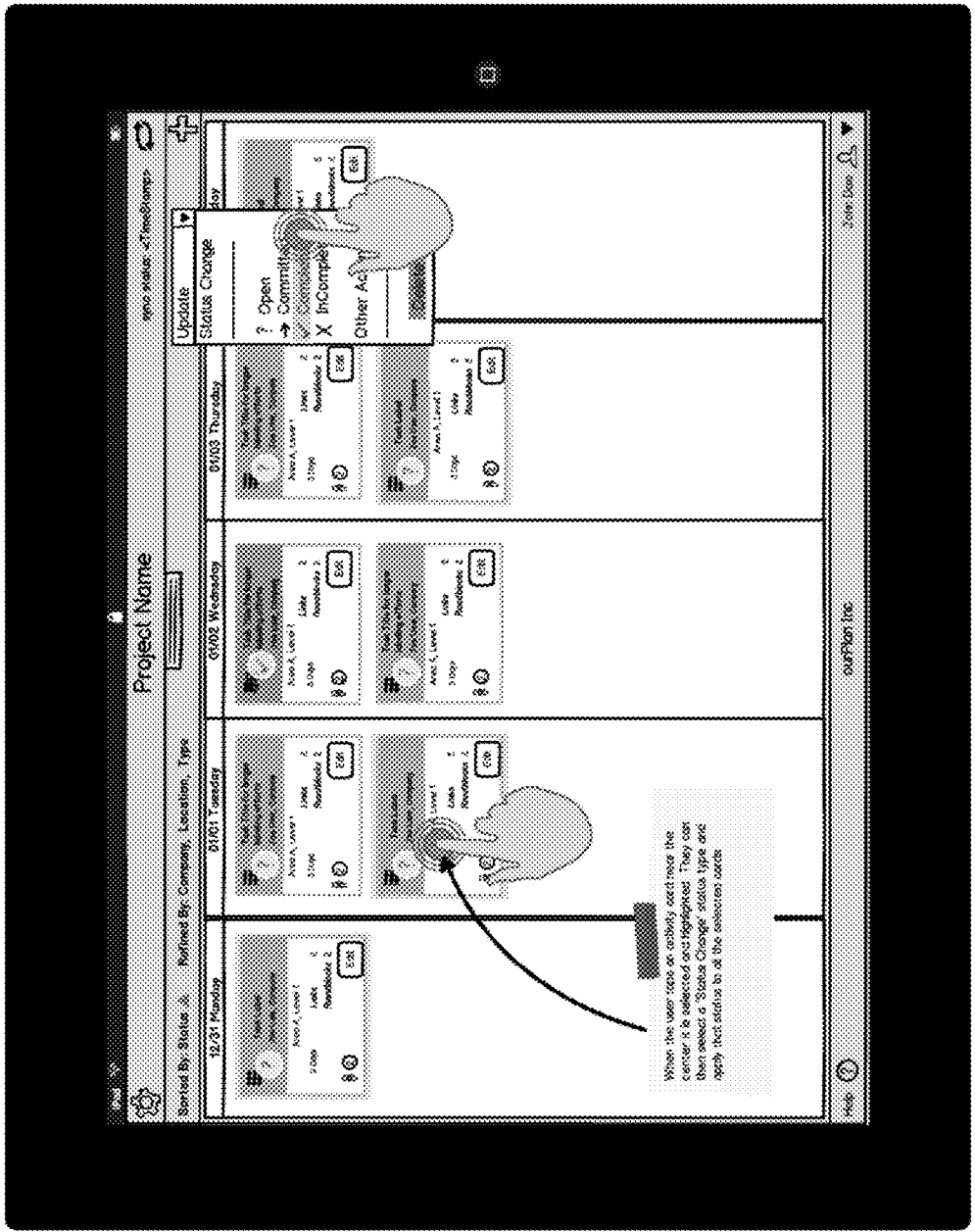
FIGS. 9A-C show an exemplary graphical user interface for multi activity selection in a mobile device application.
Figure 9B:
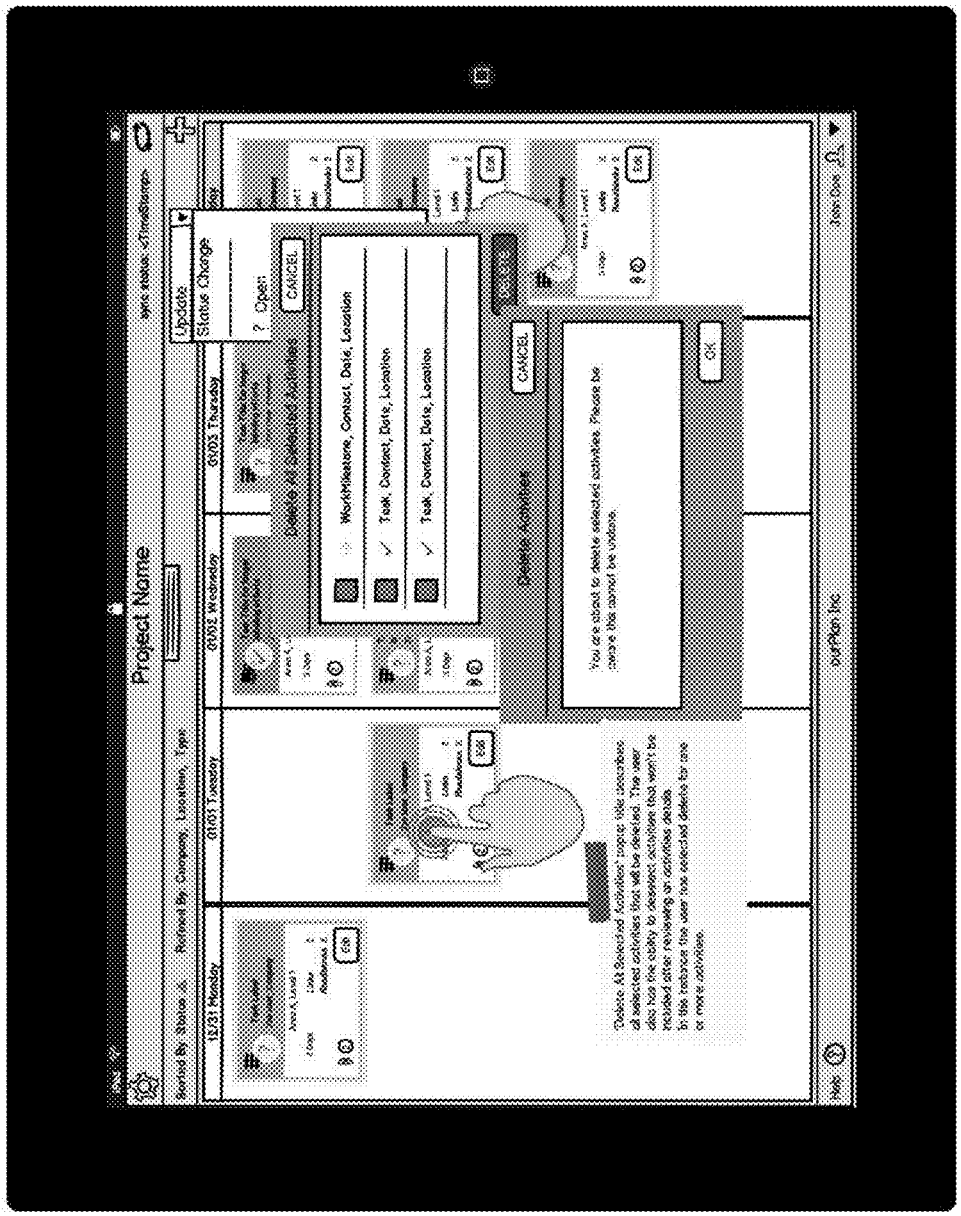
Figure 9C:
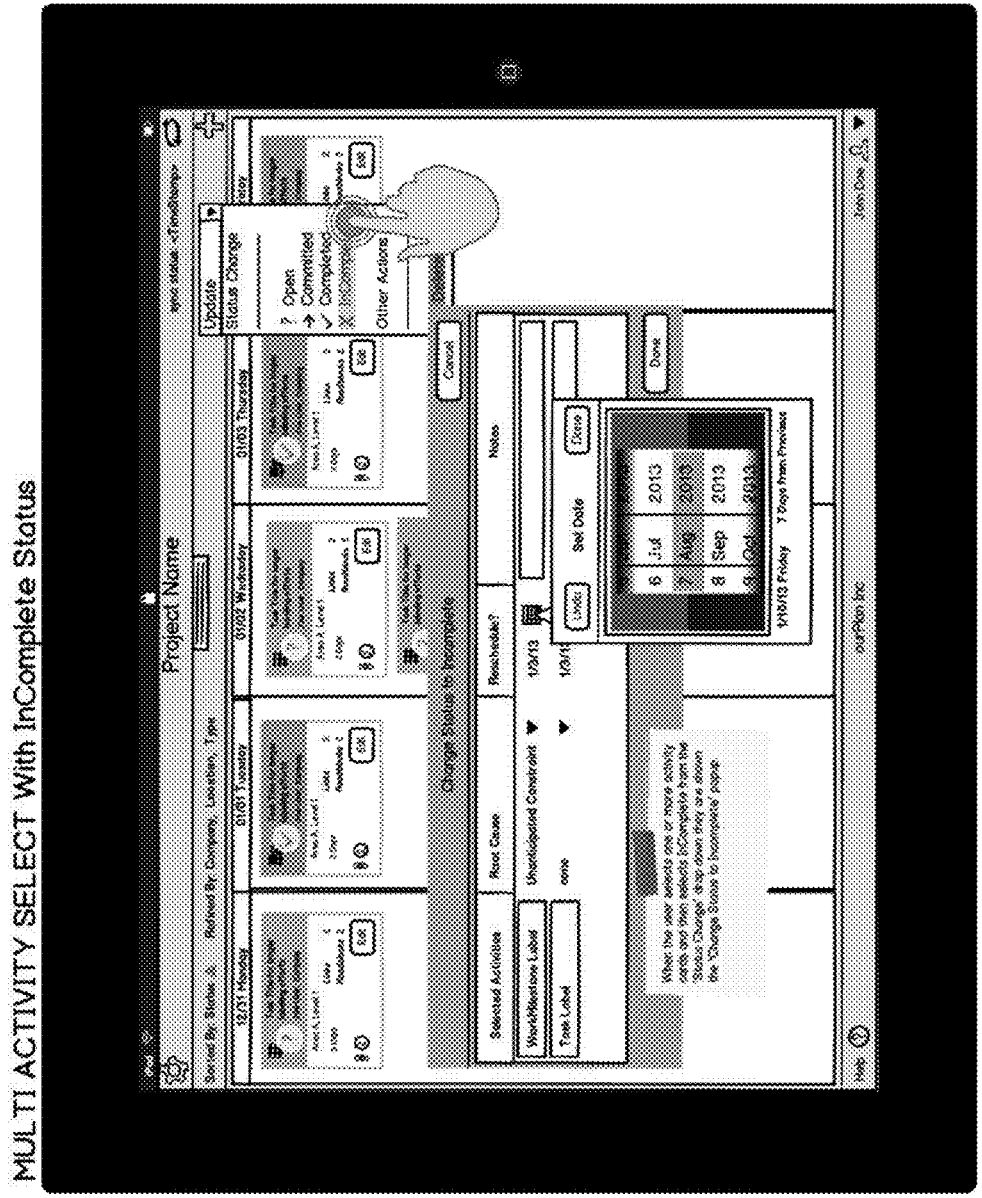
Figure 10A:
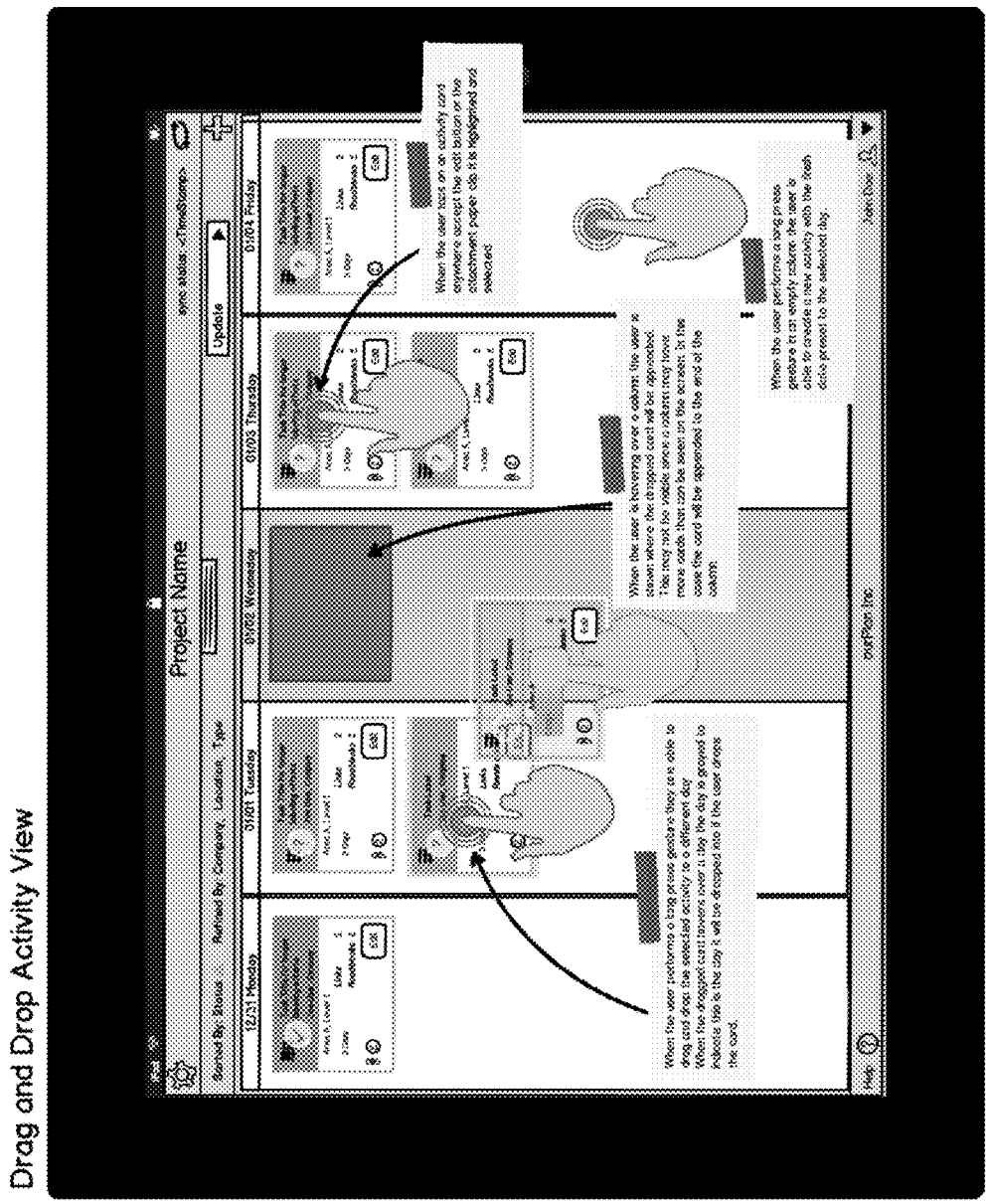
FIGS. 10A-C show an exemplary graphical user interface for manipulating activities via drag-and-drop in a mobile device application.
Figure 10B:
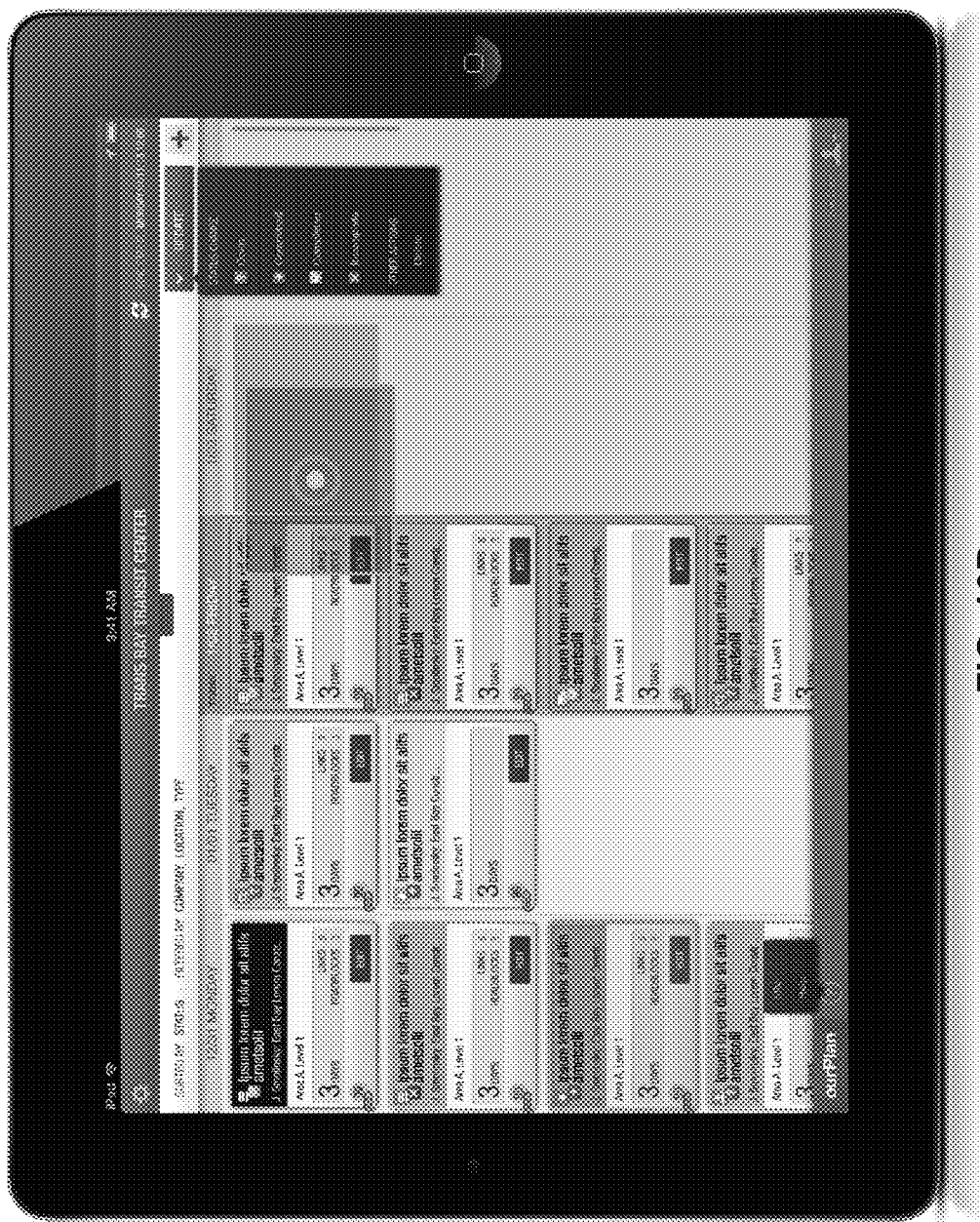
Figure 10C:
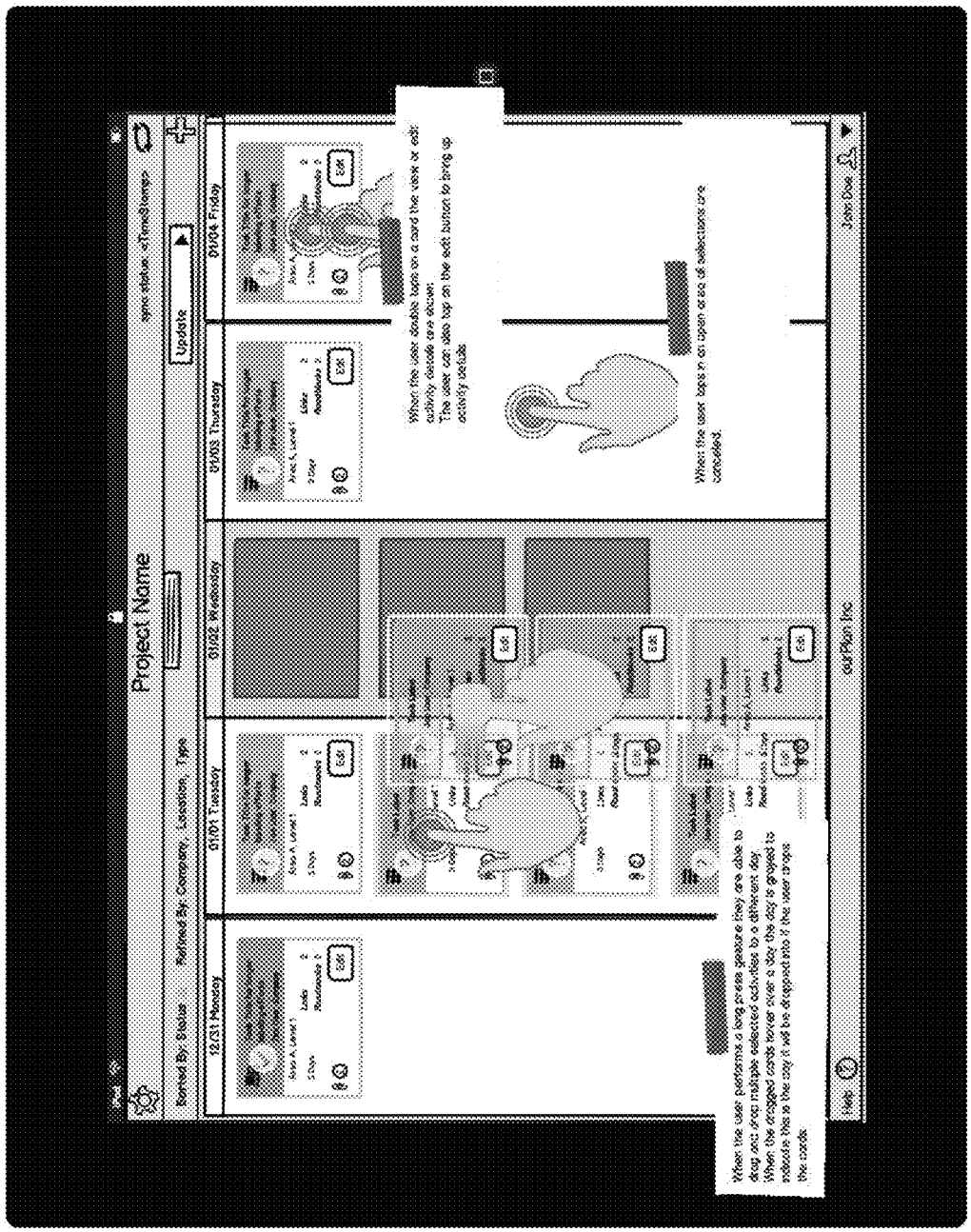
Figure 11:
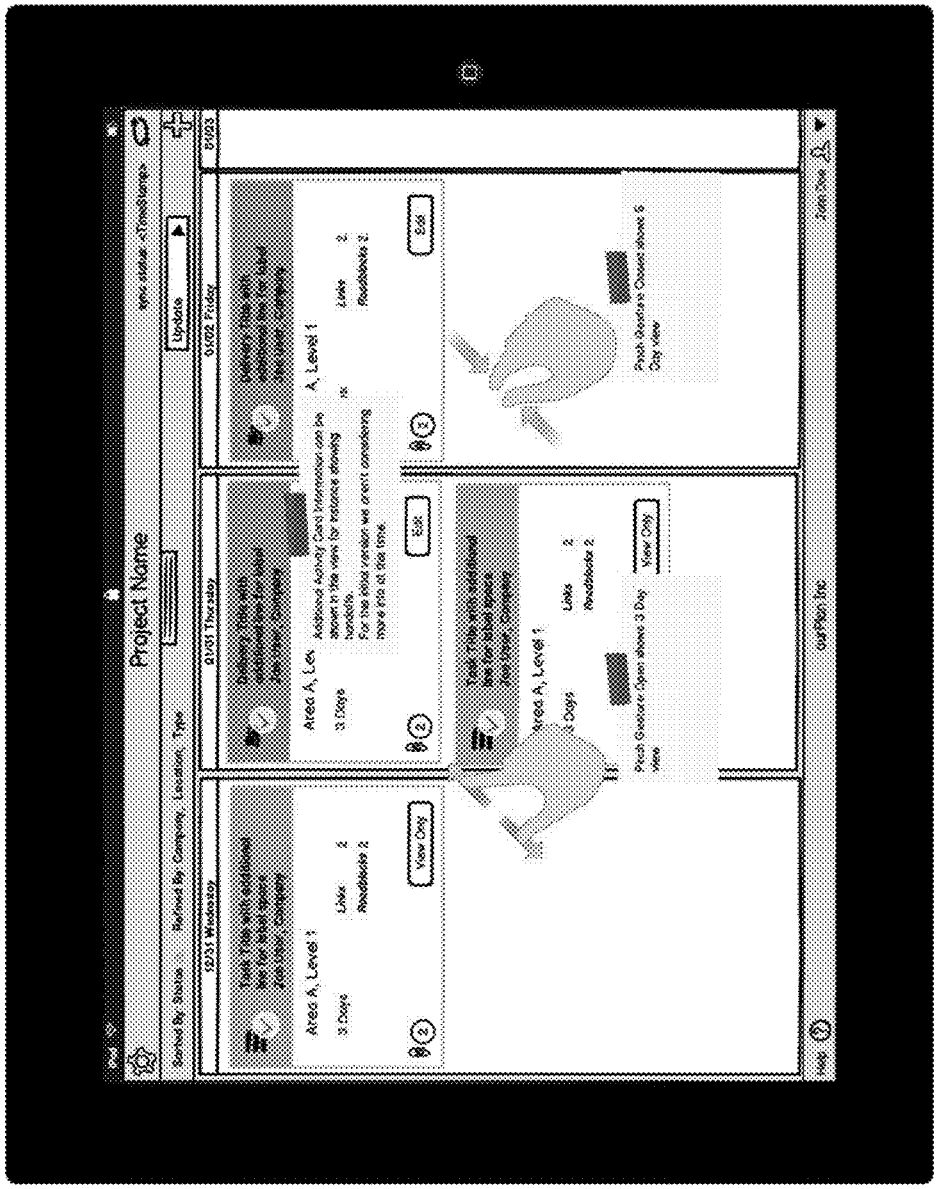
FIG. 11 shows an exemplary graphical user interface exhibiting manipulation of schedule viewing in a mobile device application.
Figure 12:
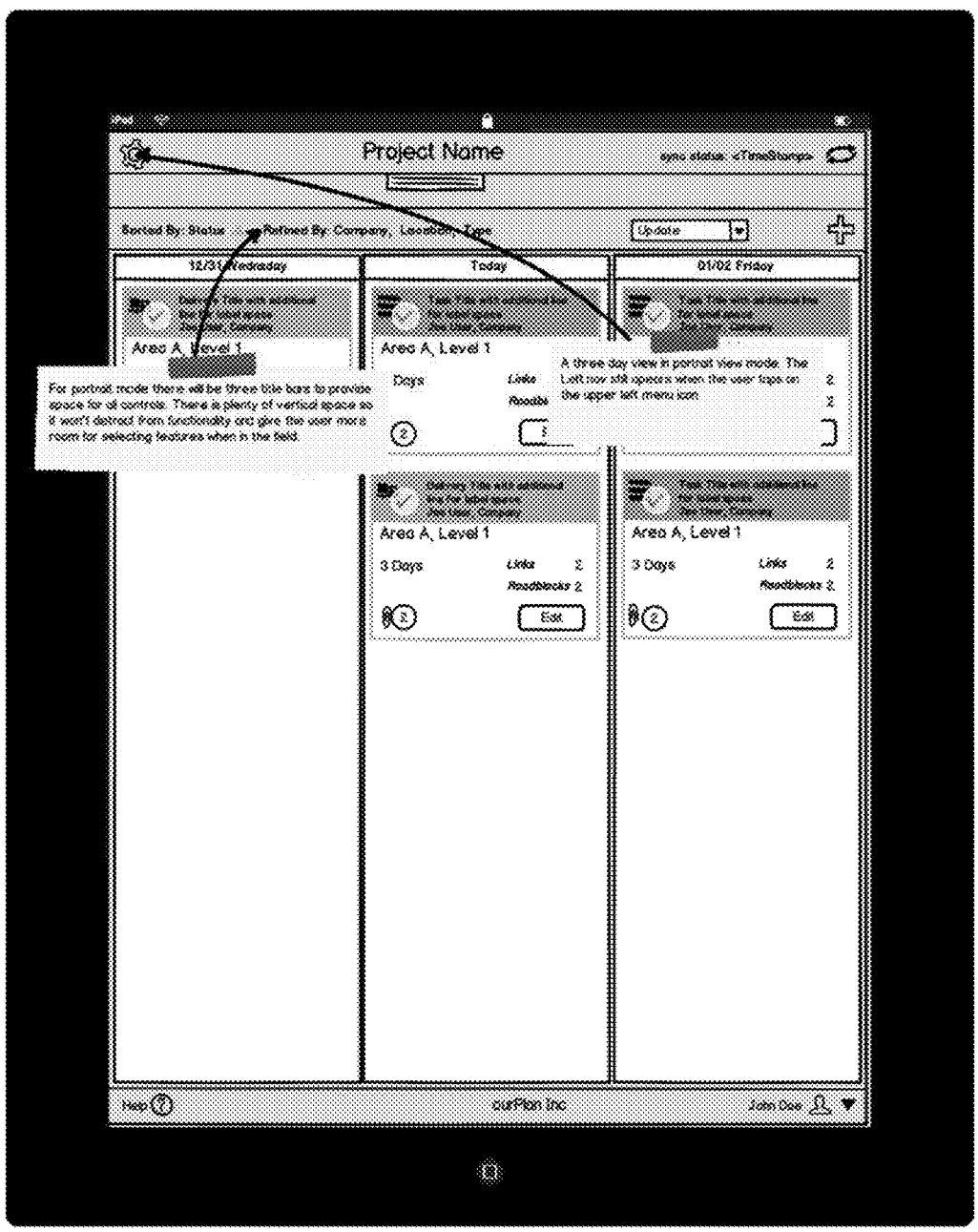
FIG. 12 shows an exemplary graphical user interface exhibiting manipulation of schedule viewing in a mobile device application.

Optionally, app users may interact with multiple activities as shown in FIGS. 9A-C. For example, a user may update the status of multiple activities at once or delete multiple activities. An embodiment of the app may also allow for ease of reorganizing activities in a project as shown in FIGS. 10A-C. For example, a user may drag and drop a single selected activity into different days. Users may also adjust the view of the app, as shown in FIGS. 11 and 12. For example, users may zoom in or out of views using gestures such as pinching, swiping, panning, and/or other actuations or combinations of actuations. Optionally, the app may change orientation and views according to how a user holds the mobile device.

Figure 13:
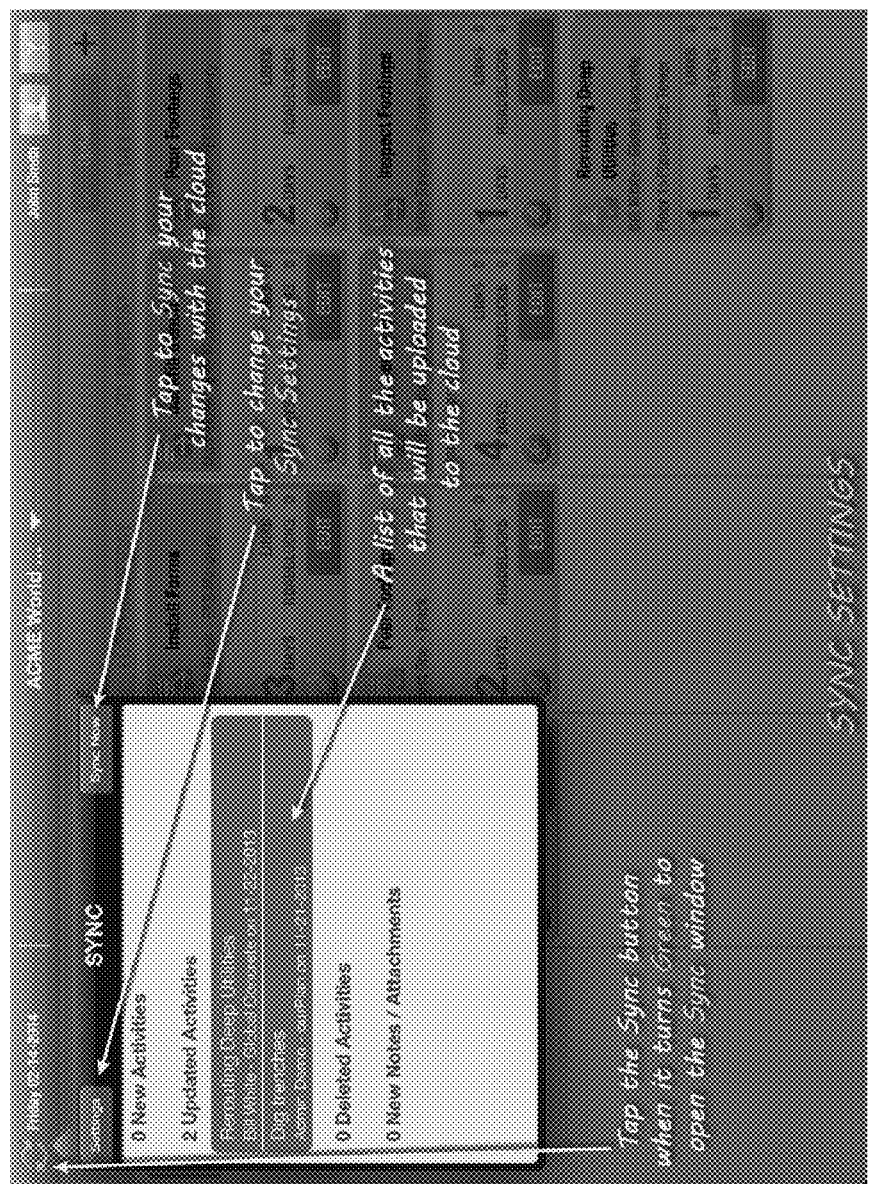
FIG. 13 shows an exemplary graphical user interface exhibiting synchronization with a server in a mobile device application.

The mobile device app may also be configured to sync with the web application 125A (see FIG. 1) to keep the project activities updated. Users may select which aspects of the activities to upload or download as shown in FIG. 13.

Referring briefly to FIG. 1, another embodiment of the present technology is a collaborative construction planning application, such as the application 125A that is configured with a pull planning module or layer 165. Such a layer or module may provide for organization of the most efficient sequence of activities in a plan by working backwards from a milestone or other target completion date. The activities or tasks are defined and organized so each completion releases work for the next activity in an efficacious manner.

The application 125A may first define an appropriate milestone or other target date for a particular project. For example, a milestone may include any recognizable and empirically verifiable portion of a construction project. By way of example, a milestone may include ground breaking. The tasks required to achieve this milestone often include soft project tasks permitting, licensure, sub-contractor agreements, architecture planning, site acquisition, and so forth. The particular composition and order of operations for these activities may vary depending on whether the construction project is a commercial or residential project. The application 125A may infer the necessary tasks from historical records associated with other completed plans in the database.

The application 125A may take into account ancillary factors that can affect the completion or achievement of a milestone such as governmental involvement, weather, and so forth. For example, if a construction project is being performed in San Francisco, the application 125A may apply a delay factor to a typical ground breaking milestone. The application 125A may build in this delay factor of, for example, six months, to ensure that typical delays resulting from permitting can be accounted for. The application 125A may be configured to recalculate the plan if planned delays do not occur, or if delays exceed planned factors.

The application 125A creates an order of dependency of execution of activities knowing the milestone and intervening steps that are required to achieve successful completion of the milestone by constituent team members.

In one embodiment, the pull planning layer 165 may organize projects as a network of commitments, such as a hierarchy of project tasks, where one or more child tasks require completion of a prior parent task in order to allow for completion (or execution) of the one or more child tasks. Each team member may ask for what they need from their "suppliers" or the member of the preceding task, in an operation which is referred to as "I-Get." Then the team member may commit to provide what their "customer" or subsequent task requires, also known as "I-Give." In another embodiment, a facilitator may control the process with input from the respective team members.

It will be understood that an activity may be both a child and a parent activity within a plan. That is, if a subject activity depends upon another activity, the subject activity is considered a child activity. Likewise, if any other activity depends upon the subject activity, the subject activity is a parent activity. Therefore, a subject activity may be both a parent and child activity simultaneously.

In one embodiment the pull planning layer 165 may collaboratively build a plan with team members from various trades interactively working towards meeting a milestone. The pull planning layer 165 may include built in rules in order to match with the I-Give/I-Get and Customer/Supplier concept described above.

By way of example, the pull planning layer 165 may consider each activity as a set of task information for the selected activity (representing the 'I-Give' aspect), along with all the predecessor activities upon which the subject activity depends (representing the 'I-Get' aspect).

The pull planning layer 165 attributes ownership of each activity to a Supplier or user to who task a subject assigned. Each Supplier has knowledge of its Customer based on the linked successor relationship, which identifies the team member that needs the task to meet their own commitments. The pull planning layer 165 may track and display these relationships to each Supplier. Optionally, more than one successor for an activity is possible. For example, HVAC Supplier and Insulation Supplier may depend upon Roofing Supplier to complete a Roofing Activity before HVAC Activities, such as duct installation, and Insulation Activities, such as insulation installation can occur.

The pull planning layer 165 is configured, in some implementations, to limit the effects of a change order to only the Owner/Supplier of an associated activity. The pull planning layer 165 may update the activity associated with the change order to create a log of changed activities for the Owner/Supplier. In some embodiments, the Owner/Supplier may not delete the prior activity. In other instances, the pull planning layer 165 can propagate the effects of a change order to other linked activities, such as child activities that depend upon the subject activity.

In some embodiments, the pull planning layer 165 may limit the deletion of a parent activity to a customer/child if customer does not need that activity to commit to their own task.

Thus, in some instances, the pull planning layer 165 is configured to determine commitments that are necessary for each entity within a plan. The pull planning layer 165 may also determine commitments which are negotiable, meaning that a particular commitment is not required but potentially preferred. These negotiable tasks can be bypassed or relocated within the plan if completion of these tasks would deleteriously change the achievement of the milestone.

According to some embodiments, any activity not yet assigned to a team member by the pull planning layer 165 can be updated by anyone on the project, but can only be deleted by the customer with which it is associated. That is, the customer or entity with ultimate control or responsibility of an activity can dictate the deletion of that task.

In some embodiments, the pull planning layer 165 provides a role for a facilitator, having special privilege levels. For example, a facilitator can have full control over any activity to create/update/delete as well as delete/modify links between activities. FIG. 15E shows a facilitator view of each participant's activities and the ability to drag those activities to the shared pull plan area. FIG. 15F depicts an individual participant's view, in which they can drag their activities to the shared pull plan area and link them to existing activities there.

Figure 14A:
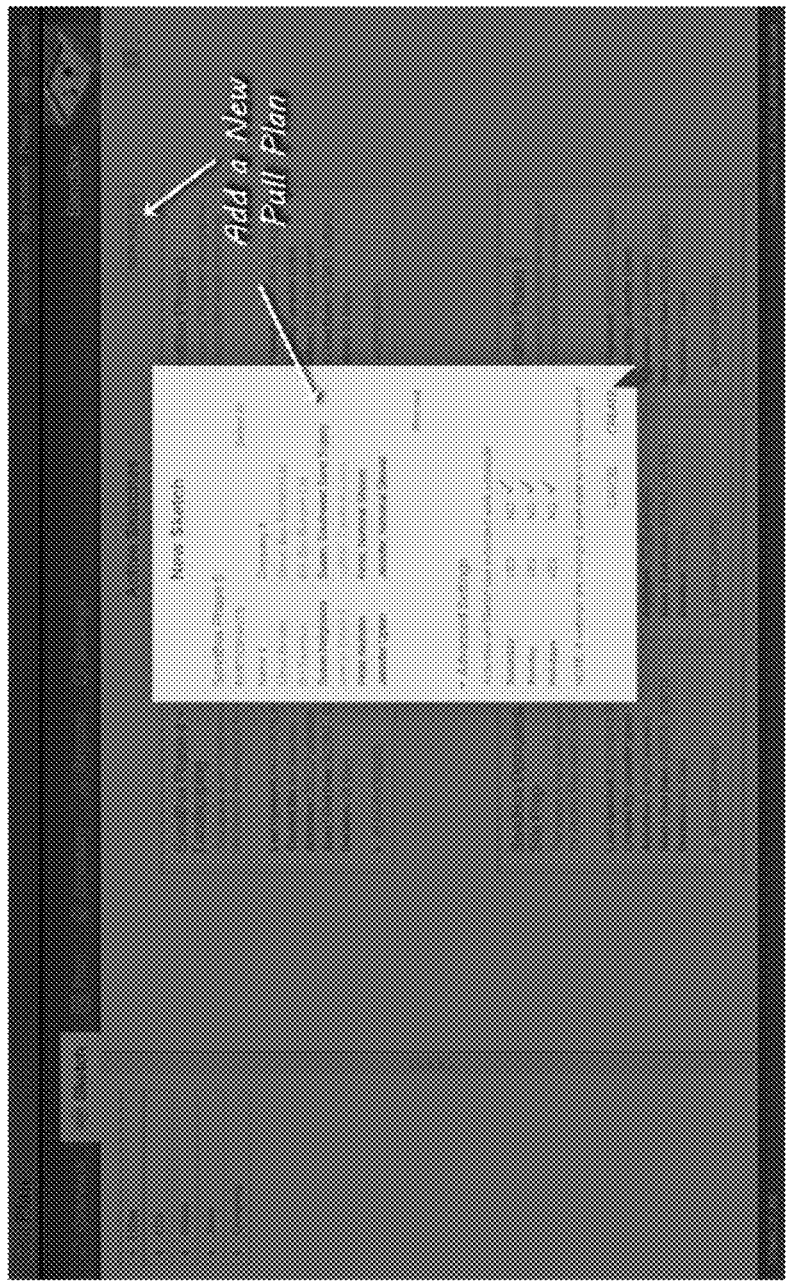
FIGS. 14A-F show an exemplary creation of activities in a pull planning module.
Figure 14B:
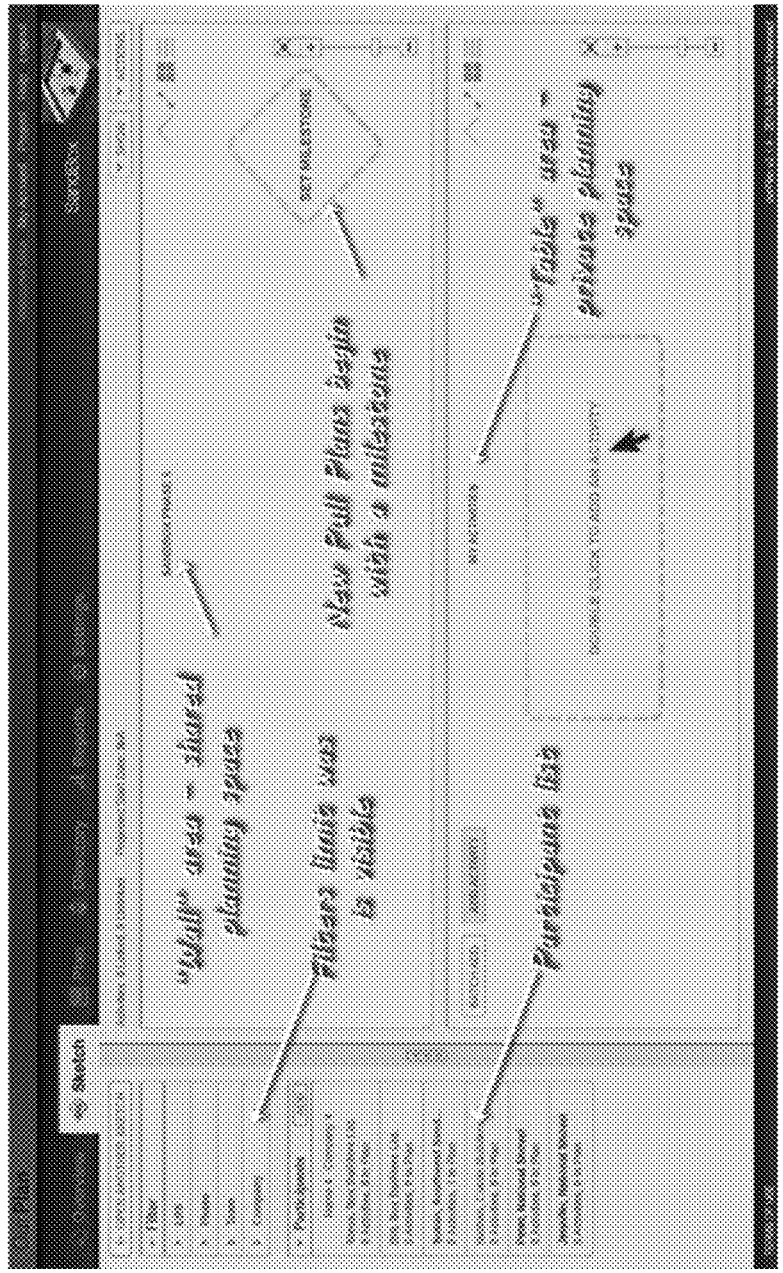
Figure 14C:
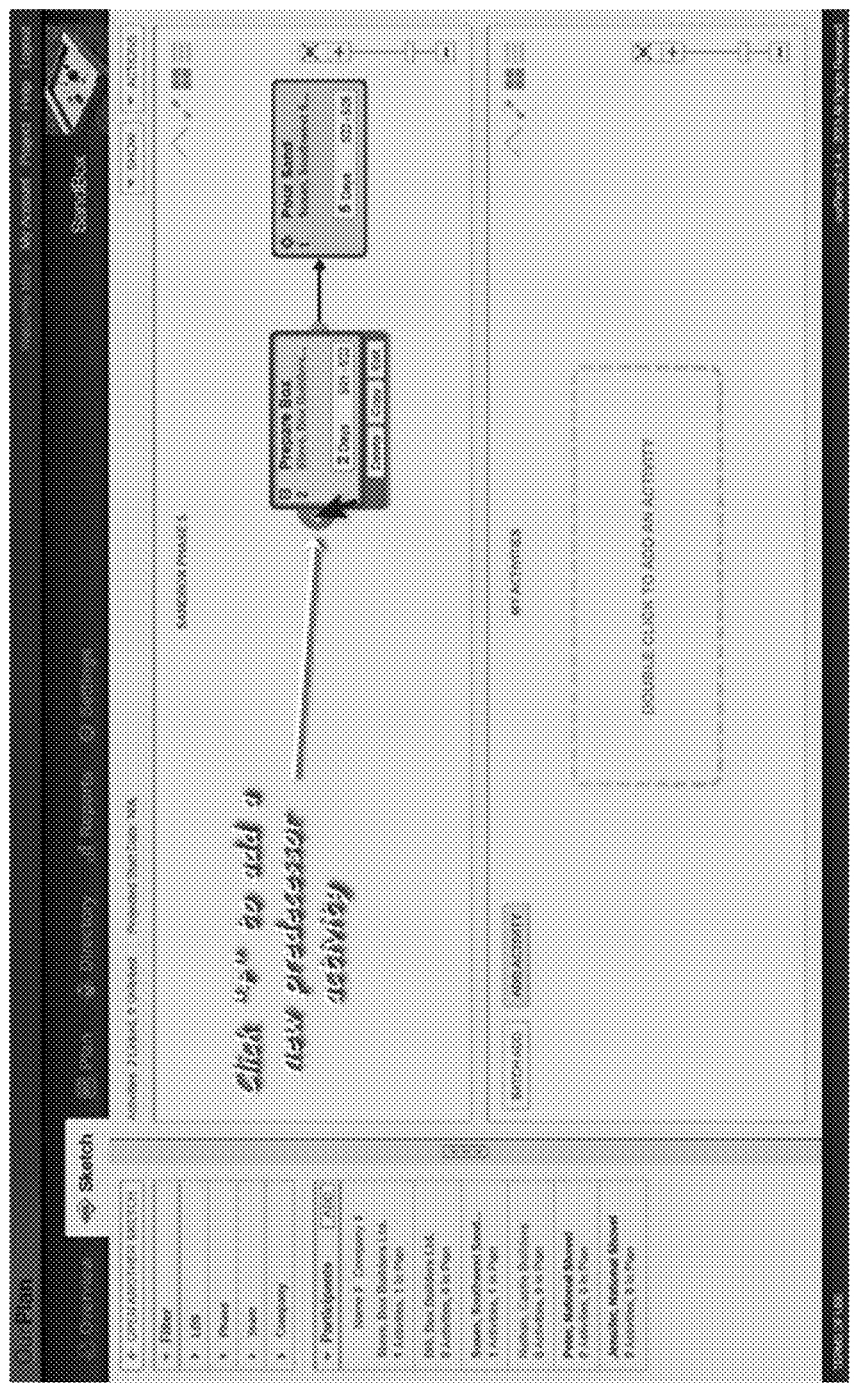
Figure 14D:
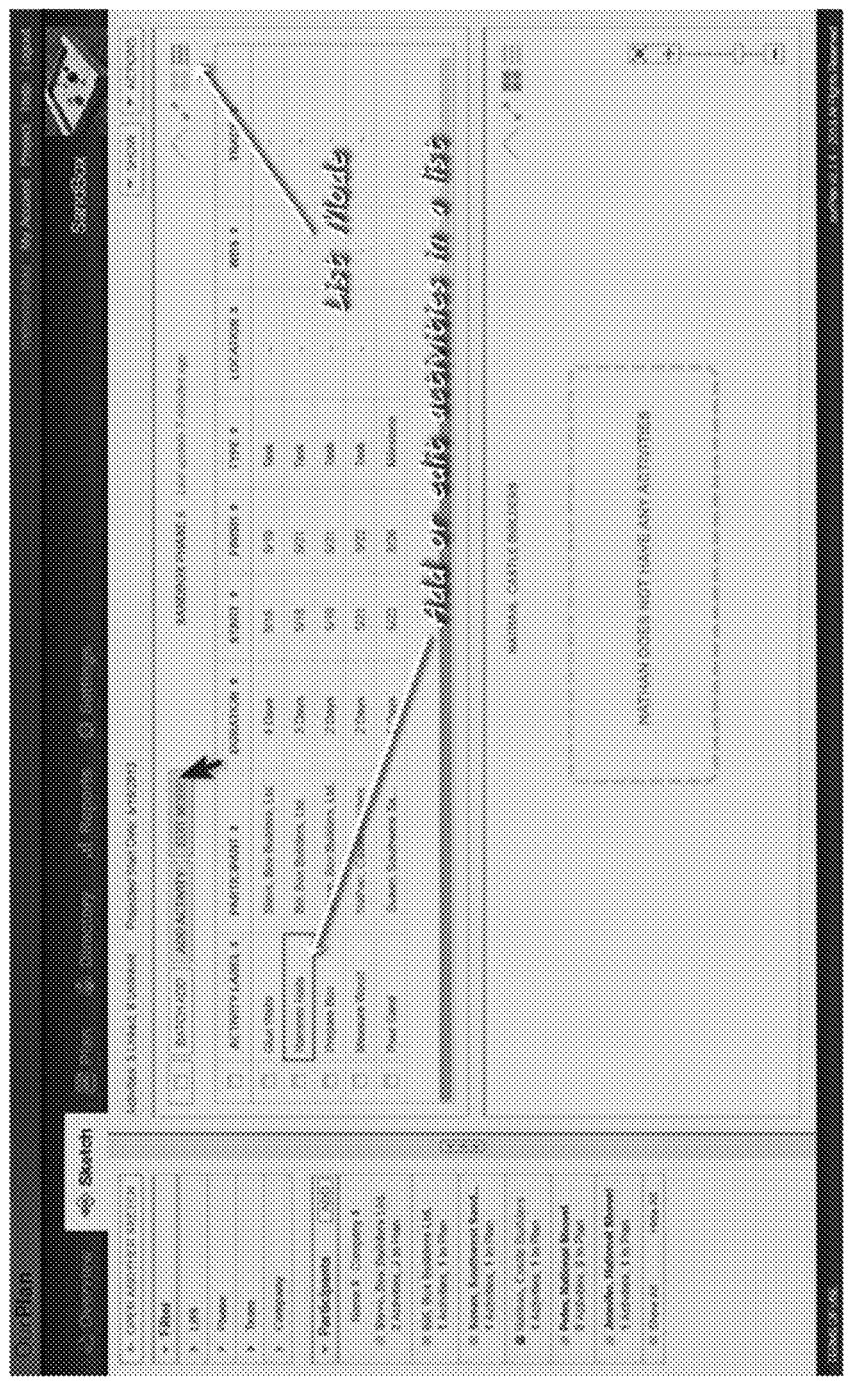
Figure 14E:
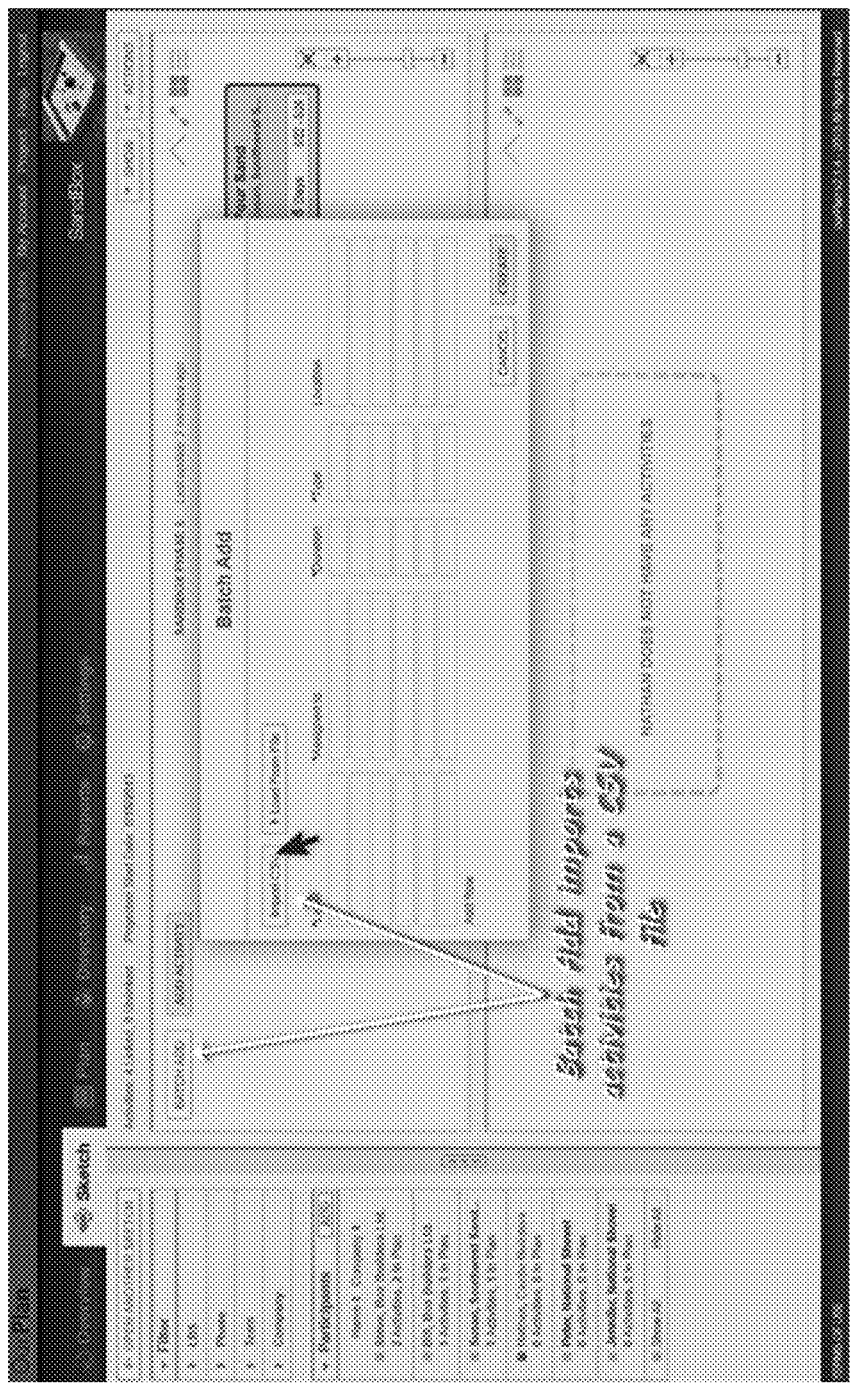
Figure 14F:
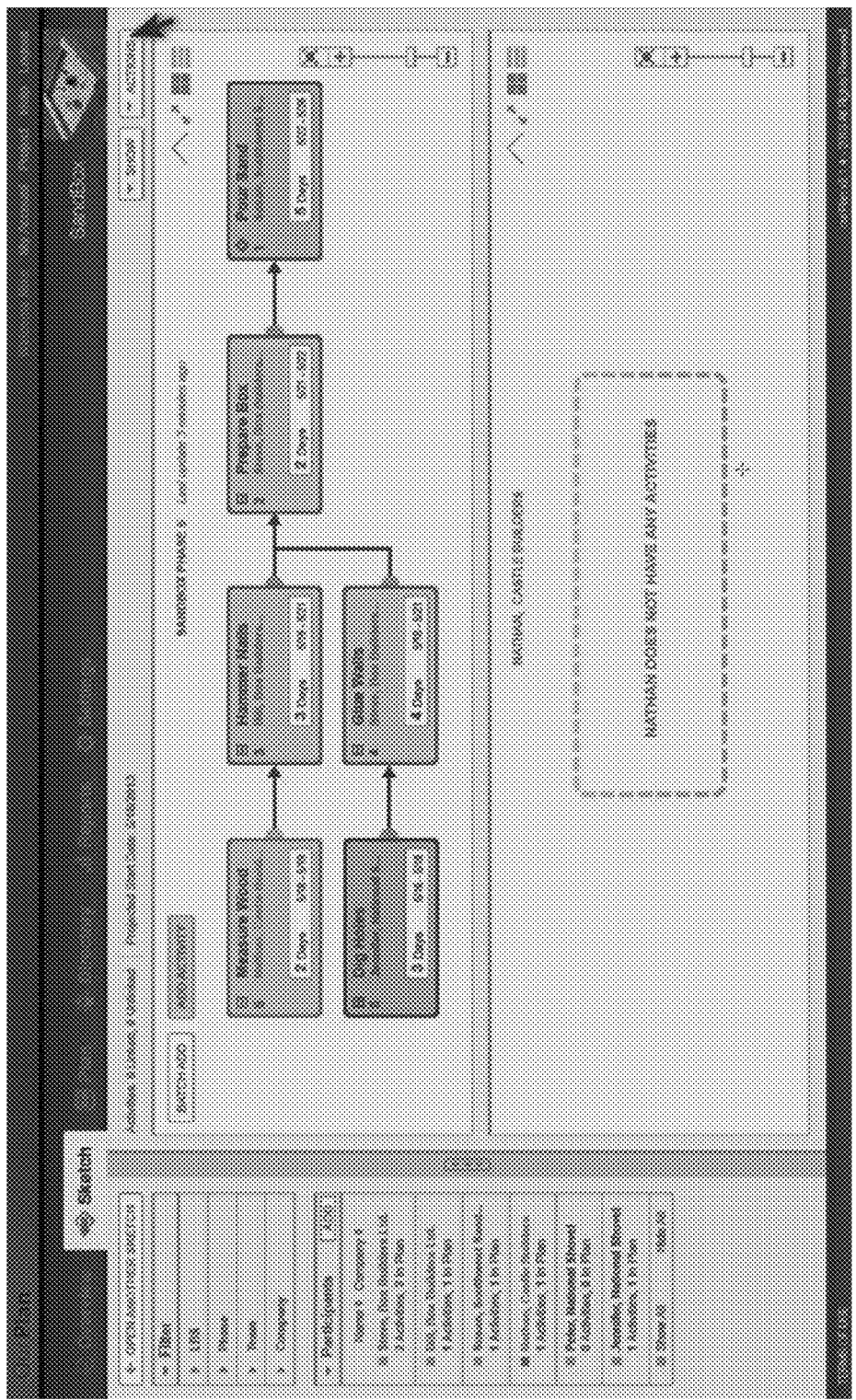

FIGS. 14A-F illustrates a pull-planning process executed by the pull planning layer 165 of the server 105 of FIG. 1. FIG. 14A shows the creation of a new pull plan project by giving it a name, selecting participants and configuring the advanced settings. As shown in FIG. 14B, in a new project, a facilitator starts by specifying an end goal or milestone. FIG. 14C depicts the addition of preceding activities assigned to various team members. FIG. 14D shows editing or adding a new activity from a list mode. FIG. 14E depicts the addition of a batch of activities by importing from a comma separated file format. FIG. 14F shows a completed exemplary project with an interlinked network of activities showing Supplier/Customer relationships.

In an embodiment of the present technology, each activity may have one or more required fields. Such a field could be the name of the activity. Optionally other fields are available to capture commitments from other members or utilized for date compression. Exemplary fields may include assigning an activity to a user, the company of the user, the duration of the activity, the team responsible for the activity, trading the activity, the status of the activity (open or committed), planned start and end date based on the plan finish date, planned start and end date based on plan start date, and date delta between planned start and end dates. Optionally some of the fields are read-only or automatically calculated, such as the planned start and end date based on either the plan start or plan finish dates and the date delta.

Figure 15A:
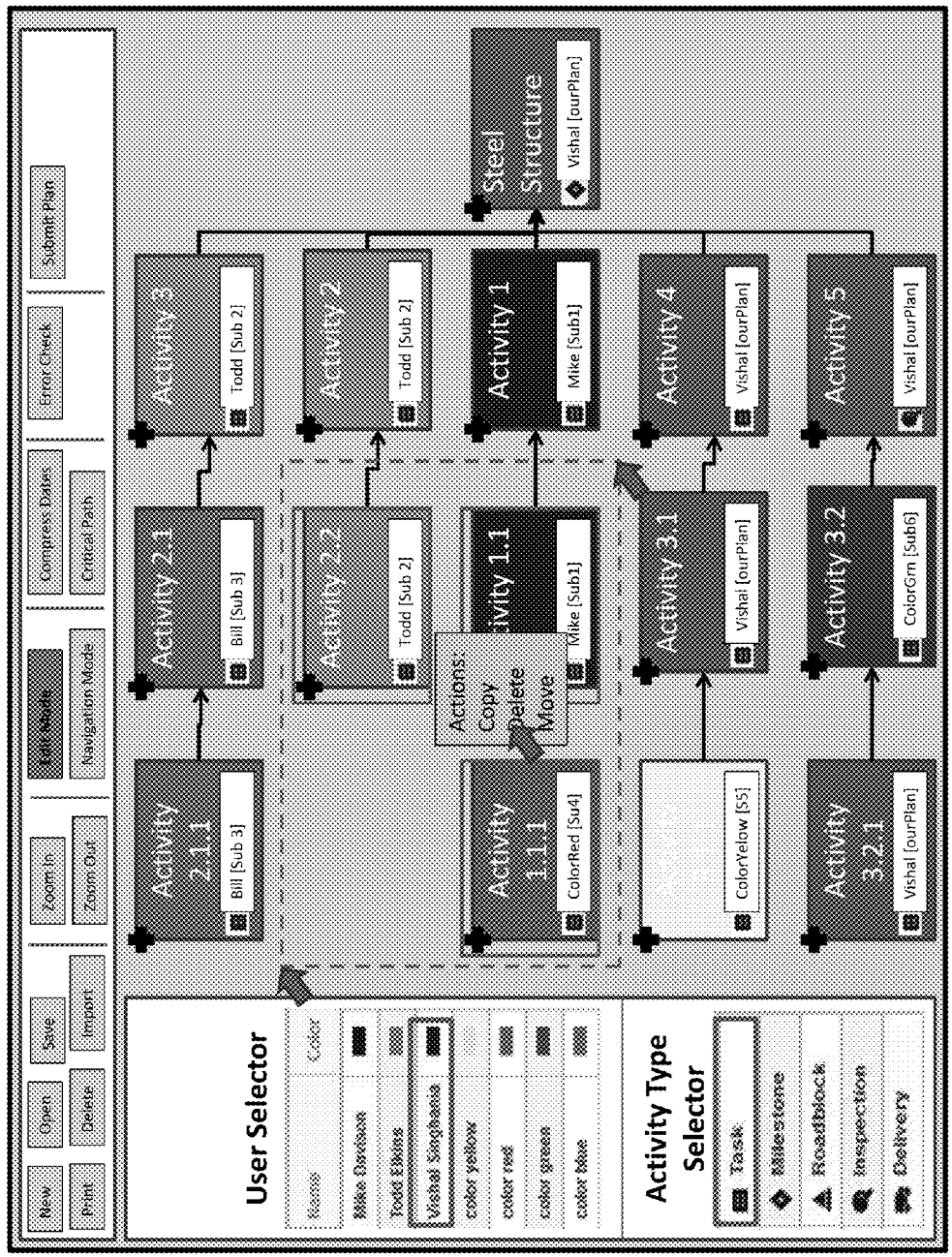
FIGS. 15A-H show an exemplary modification for tasks in a pull planning module.
Figure 15B:
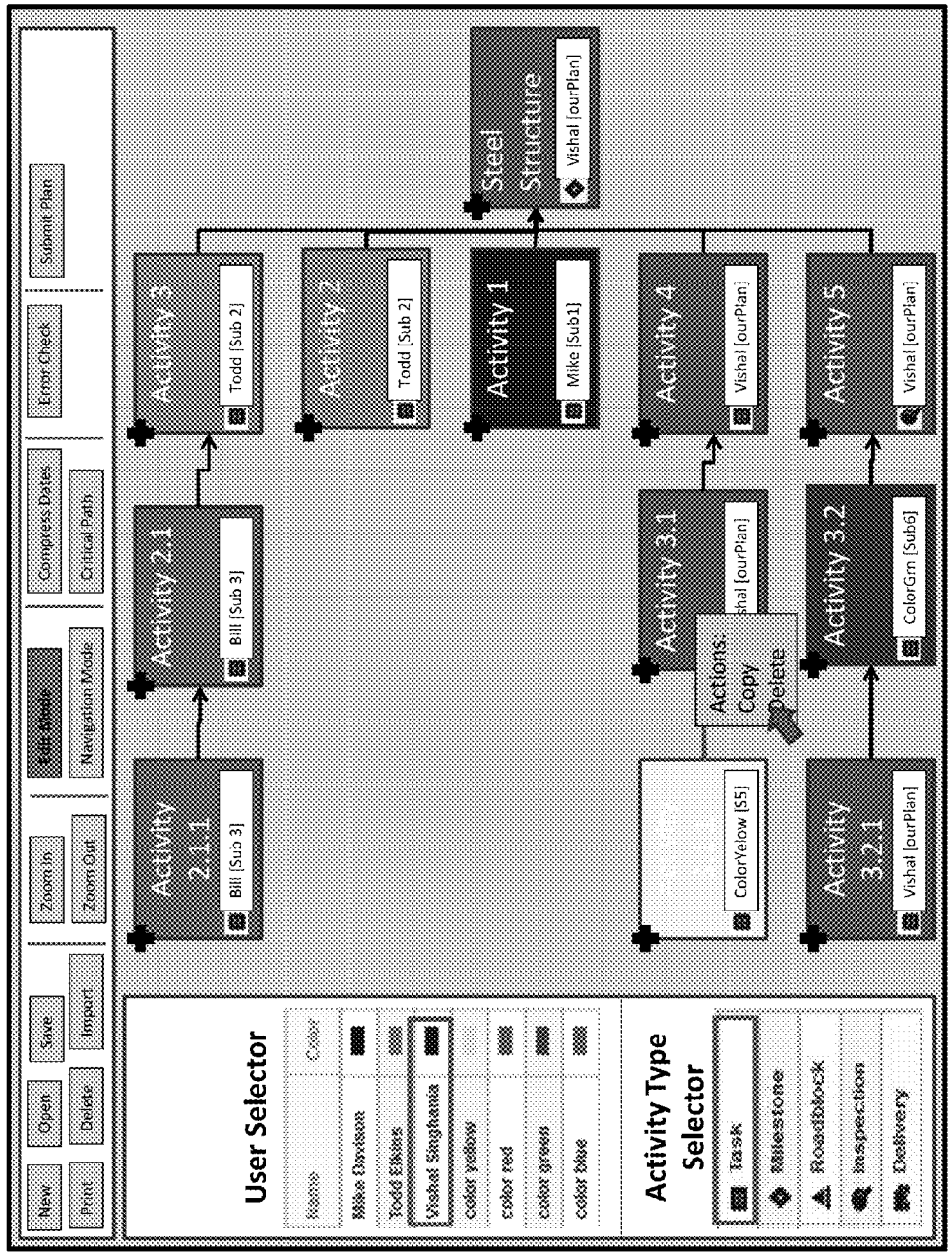
Figure 15C:
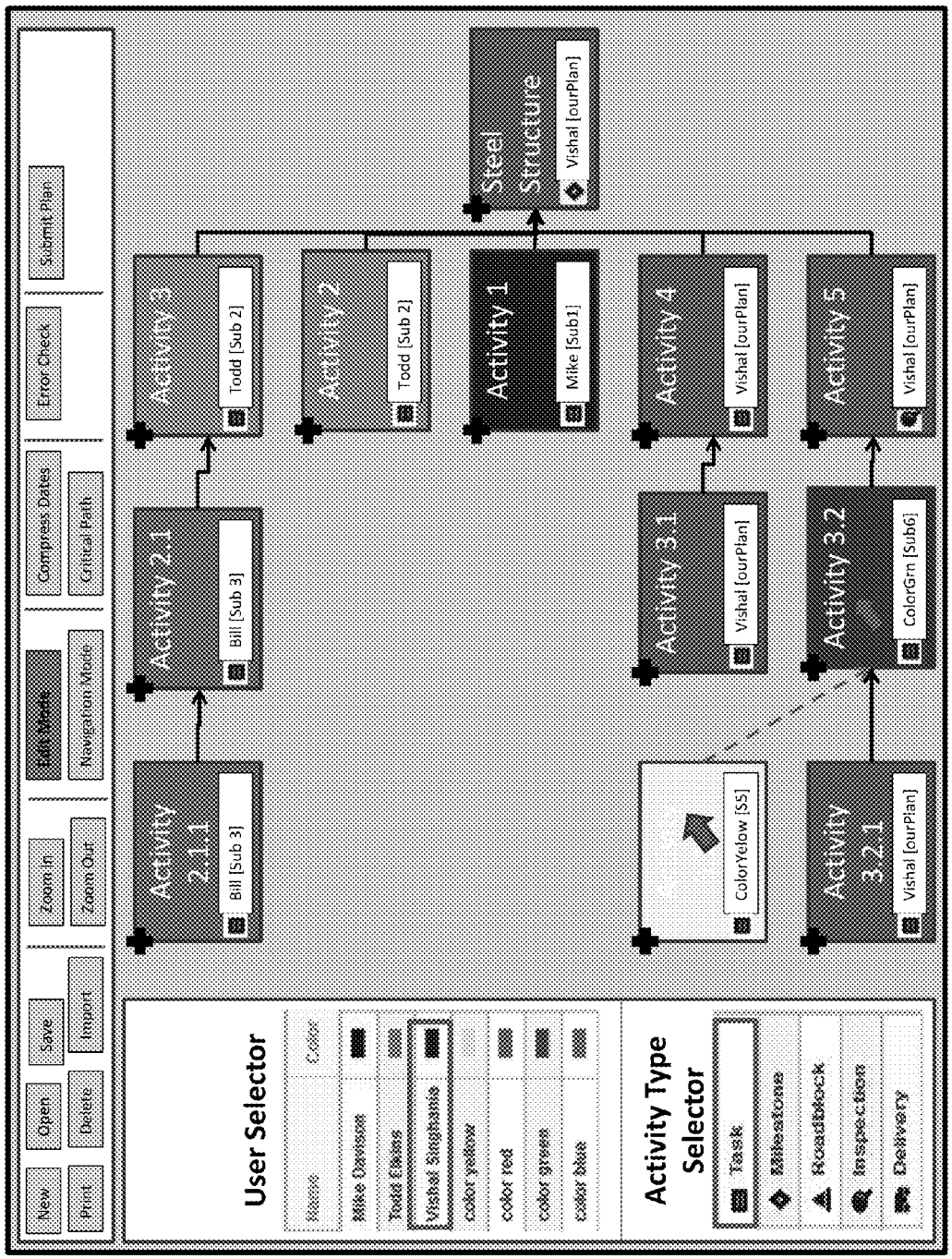
Figure 15D:
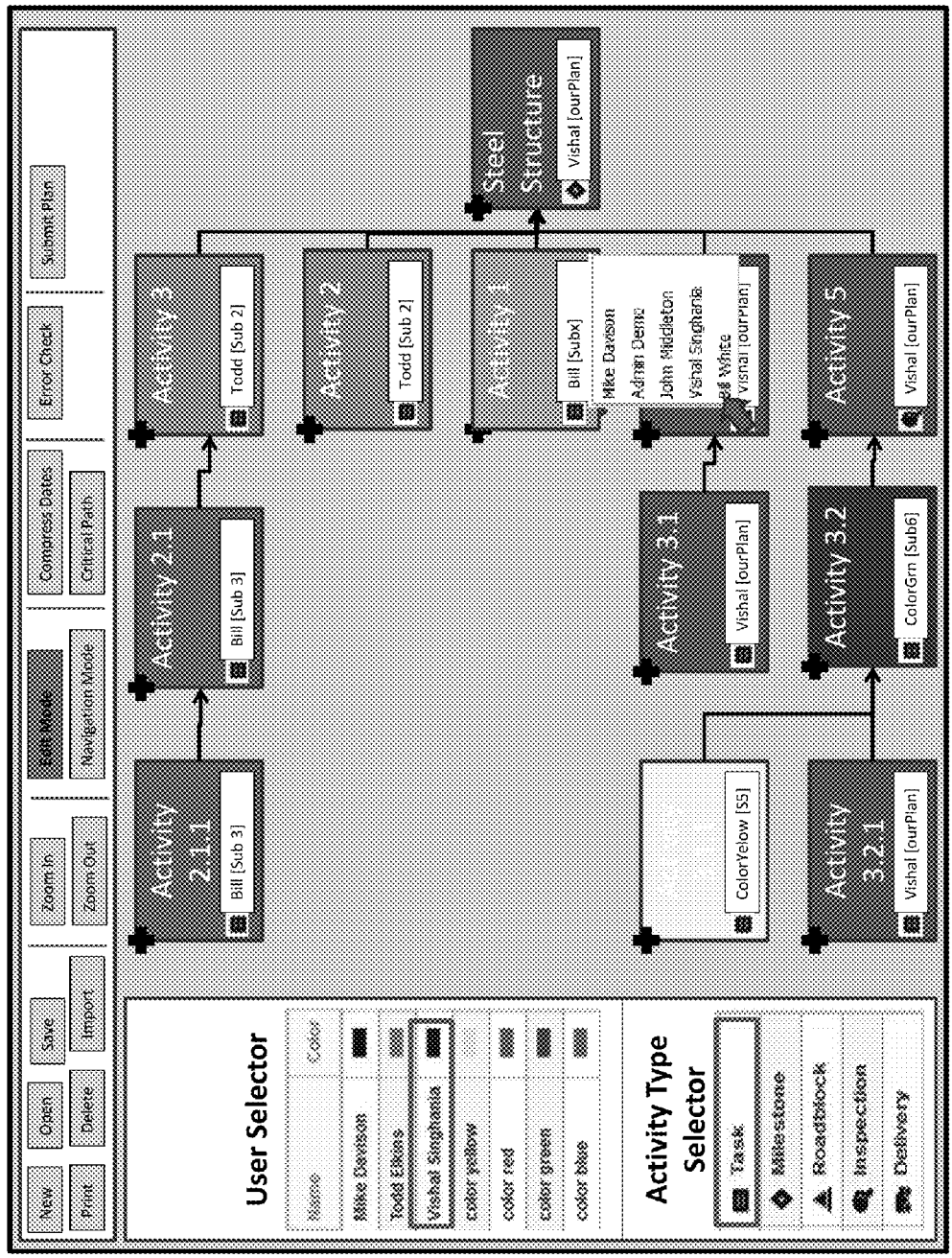
Figure 15E:
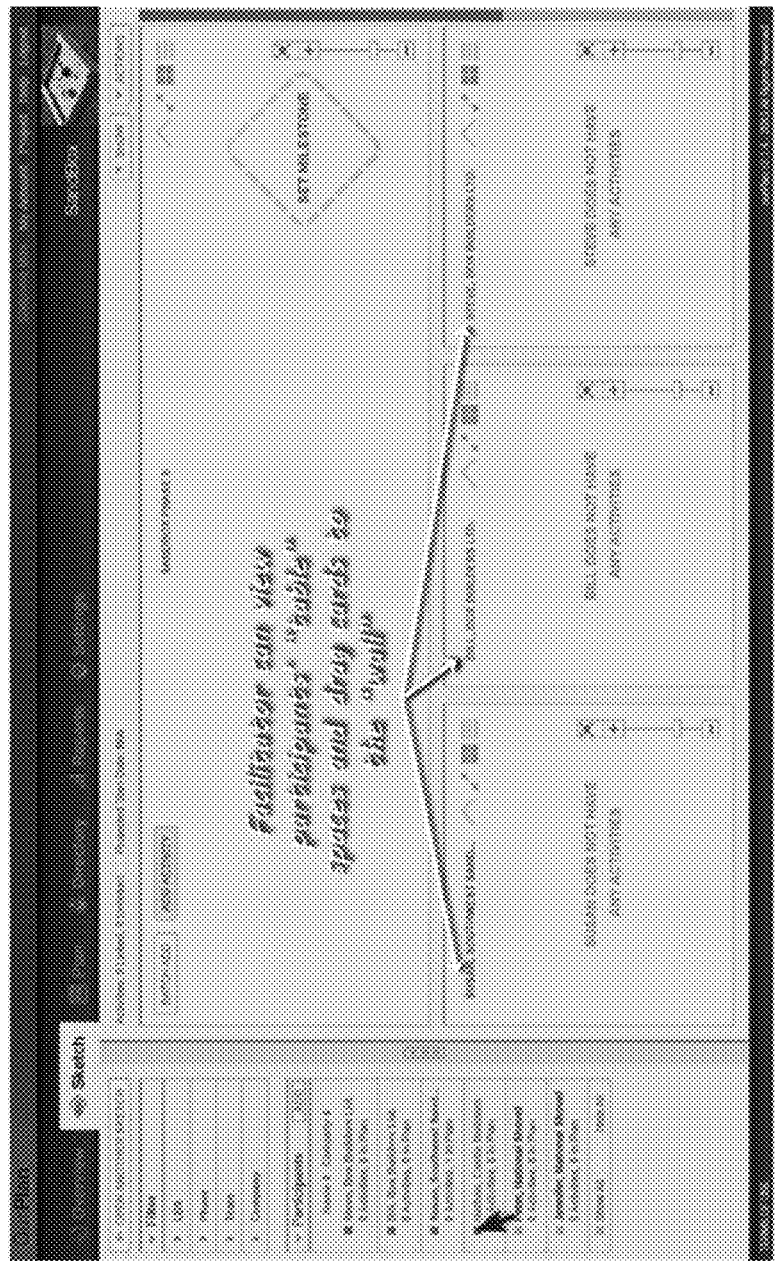
Figure 15F:
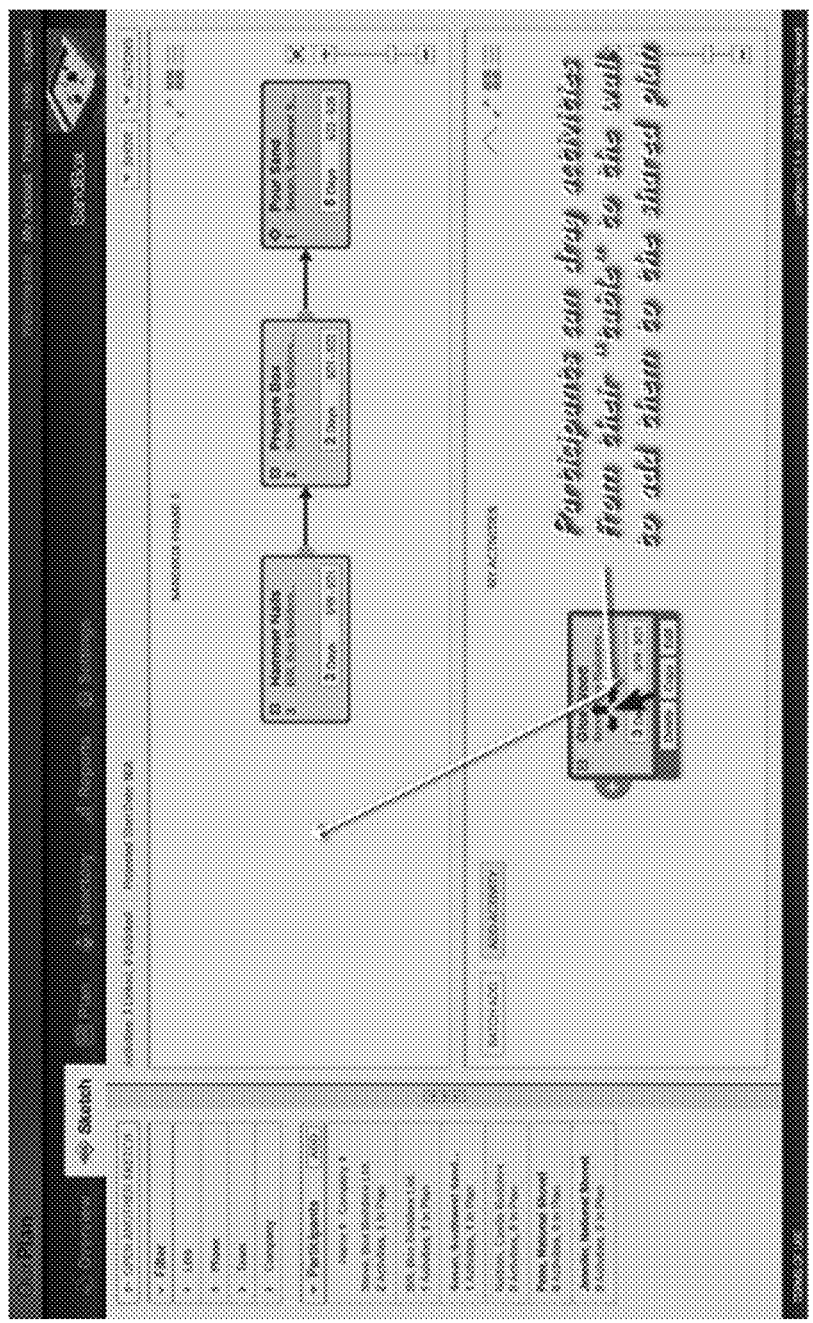

FIGS. 15A-H illustrate exemplary product modifications a team member may perform in a pull planning system. FIG. 15A shows the selection and deletion of multiple activities. FIGS. 15B-D show how links between activities are modified. FIGS. 15D-H are alternative GUIs that can be used to provide product modifications.

In one embodiment a pull planning layer 165 may include various options and selectors. Such options may include the ability to create new plans, open existing plans, save updates, print plans (including converting to PDF and printing using a PDF reader), deleting plans, or importing activities from other plans. Additionally, options are included allowing a viewer to zoom in or out on activities in a project.

Also, various modes (such as editing or navigation) can be toggled within the pull planning layer 165. An edit mode of the pull planning layer 165 may enable moving, copying, deleting, or editing activities. Activities are selected through clicking on the activity box or drawing a region to select all activities within. A navigation mode of the pull planning layer 165 is used to adjust the view for a project plan that may not fit within the viewing area. Such an adjustment may include scrolling, panning, or other method to manipulate the canvas right, left, up, or down to view activities.

The pull planning layer 165 may also include options to compress dates (based on the planned finish date or the planned start date), visualize the critical path, error checking (e.g., to highlight any circular reference errors), and to submit the final plan. In one embodiment, the compress dates or compression option provided by the pull planning layer 165 may allow a user to compress the whole plan to analyze the dates and delta. Compression logic may calculate two sets of planned start and end dates for each activity. A first set of dates is calculated through calculating dates backward from Milestone finish date. A second set of dates is calculated through calculating dates forward based on either the current date or a user supplied Planned Start date. The compression executed by the pull planning layer 165 may encompass the entire plan and not impose any date constraints based on any intermediate milestones in the plan.

The date delta generated by the pull planning layer 165 between Planned Start and End Dates is calculated to show indicate +/−delta value. Negative delta indicates activity is already overdue and positive delta is indicative of possibility of delaying the activity start without affecting the overall expected plan finish dates. The negative delta activities are visually indicated with a red box or similar visual effect. Zero or positive delta activities is indicated with a green box or other similar visual aid.

Figure 15G:
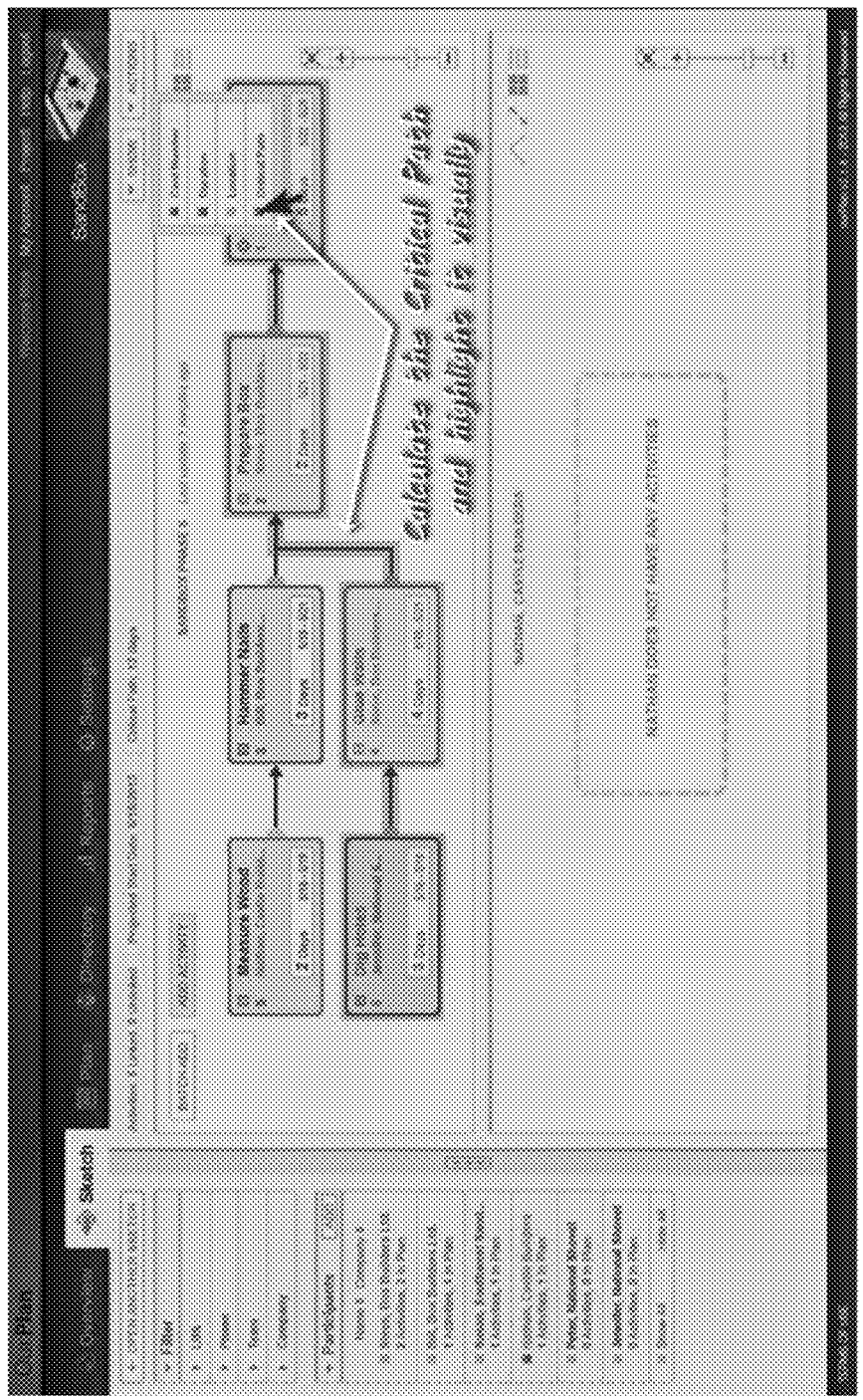

The visualization of a critical path by the pull planning layer 165 is performed by highlighting the critical path activities with some visual indication showing or emphasizing the path or all of the necessary activities in a project. Users can utilize this visual indication to adjust the activities duration and sequencing and then re-run the compression logic to highlight the change in delta and critical path due to duration/ sequencing changes. FIG. 15G depicts the critical path visualization, highlighting the links on the critical path in a unique color.

Figure 15H:
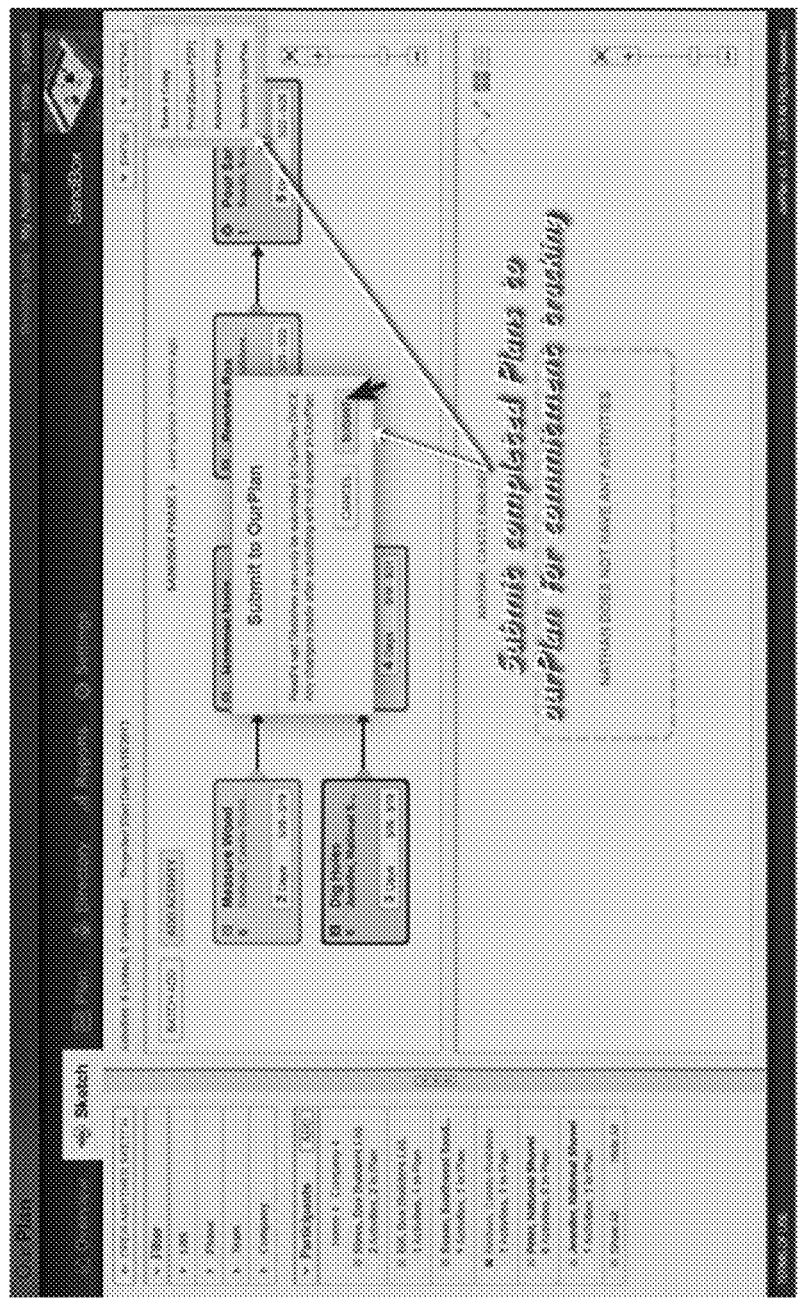
Figure 16:
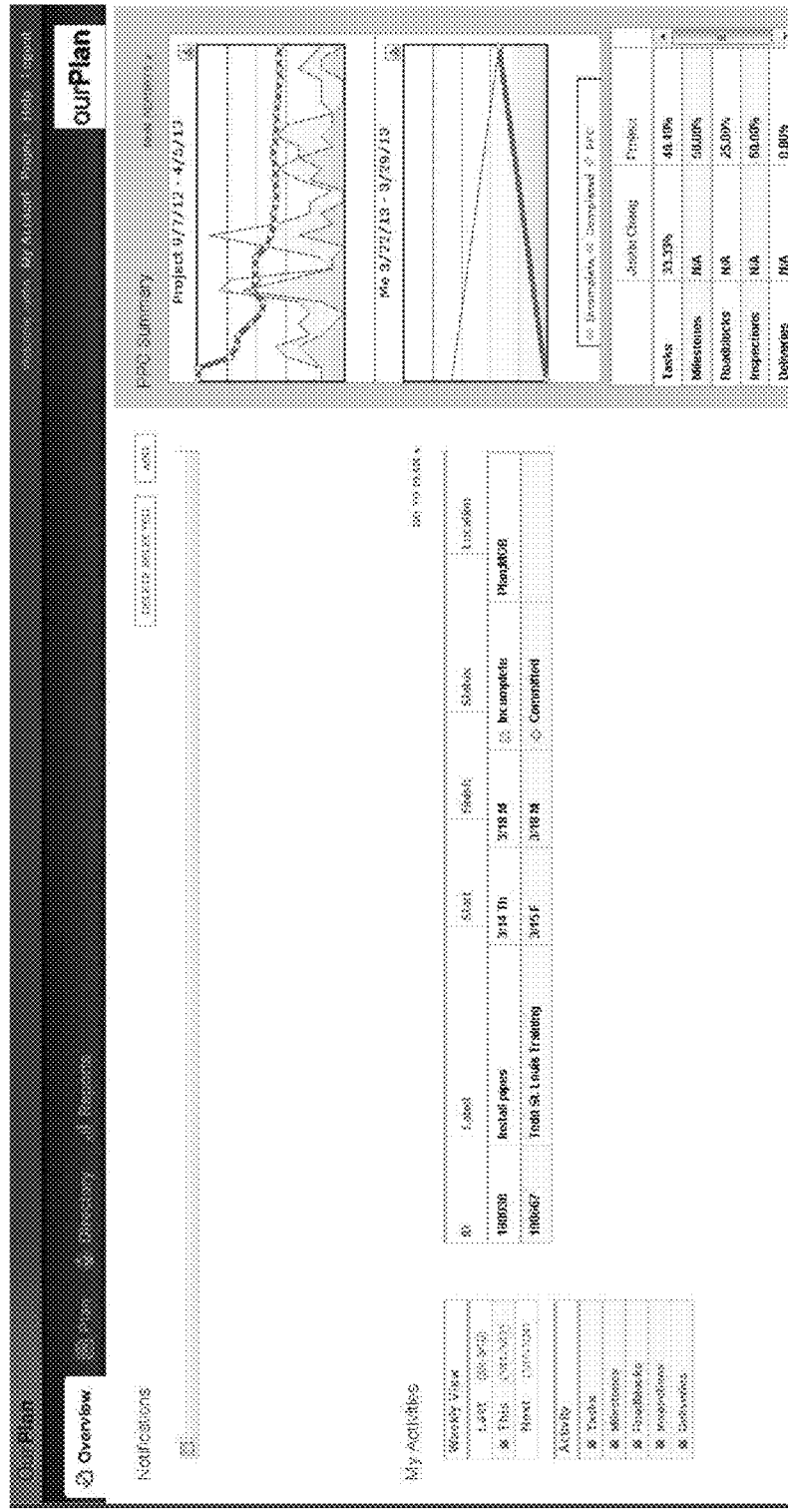
FIG. 16 shows an exemplary graphical user interface of an overview.
Figure 17B:
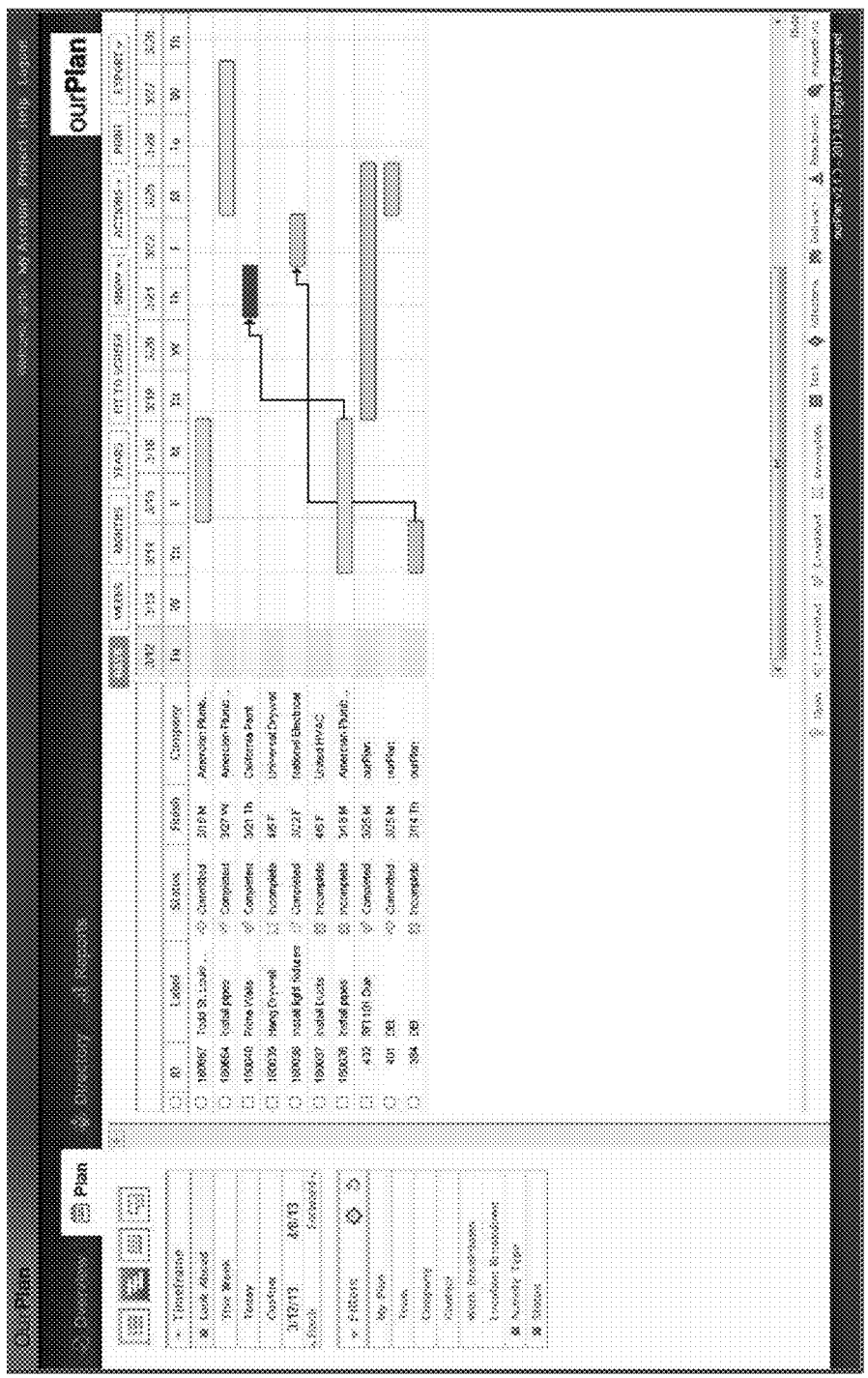
Figure 17C:
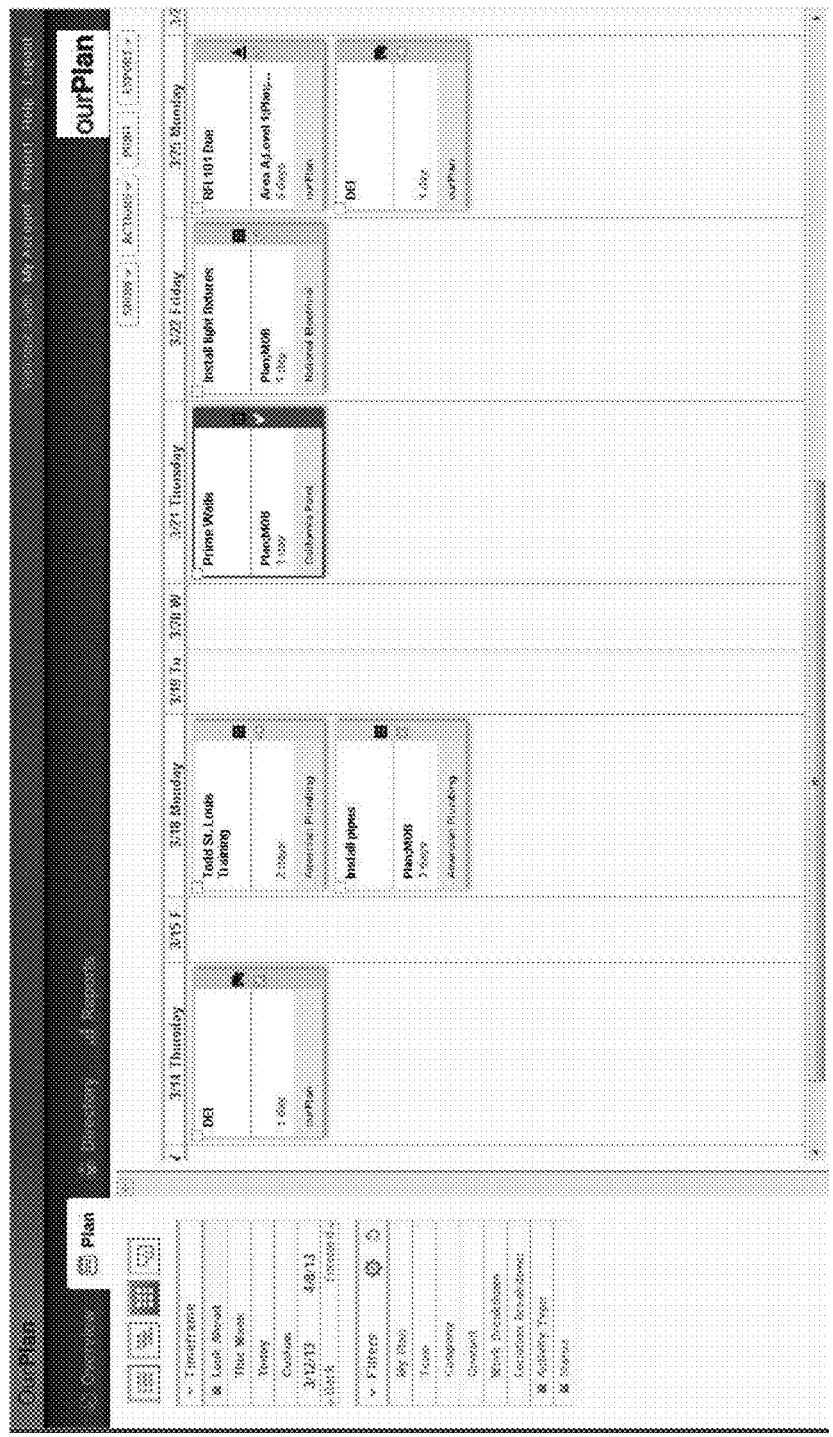
Figure 17D:
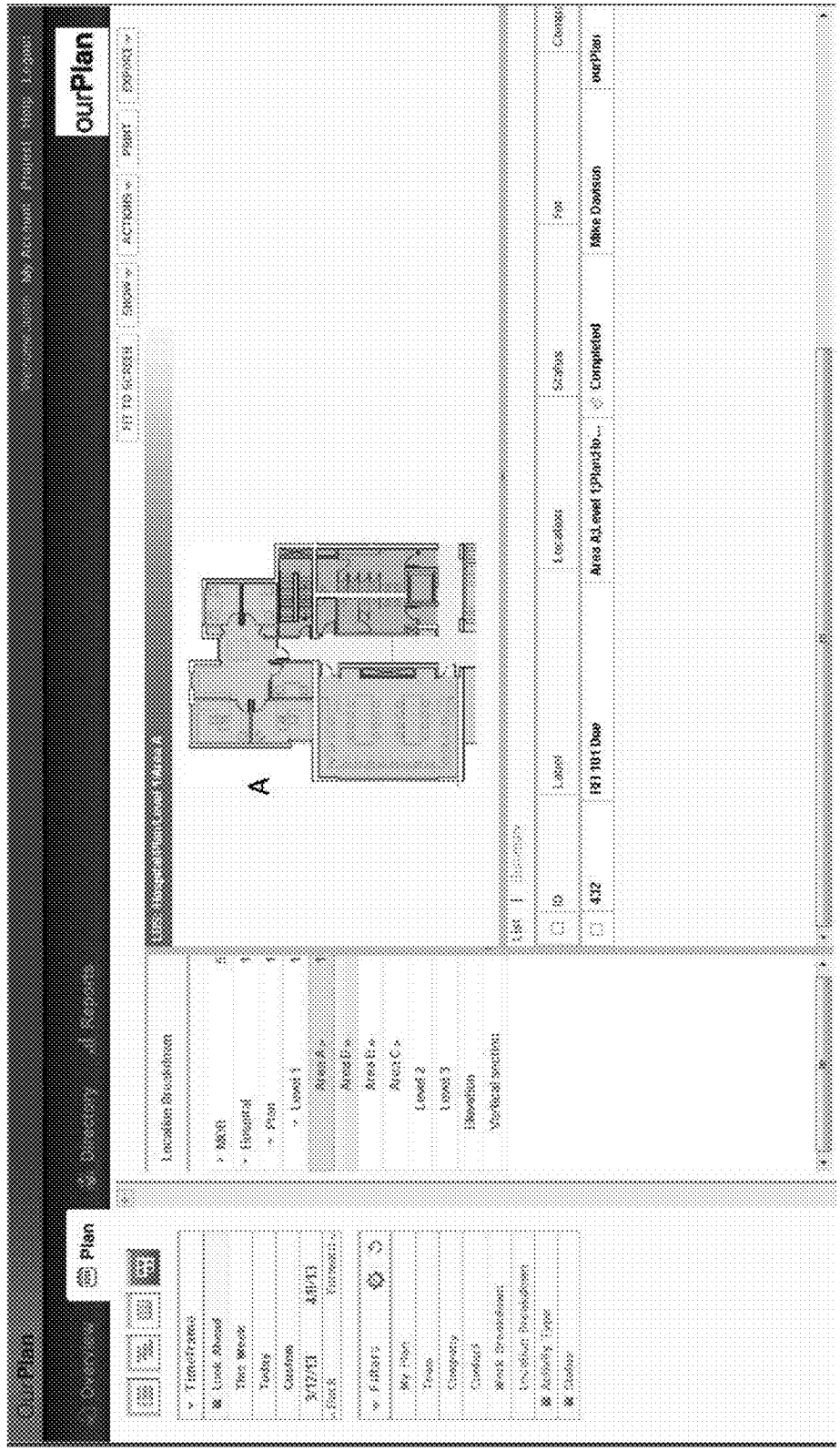
Figure 18A:
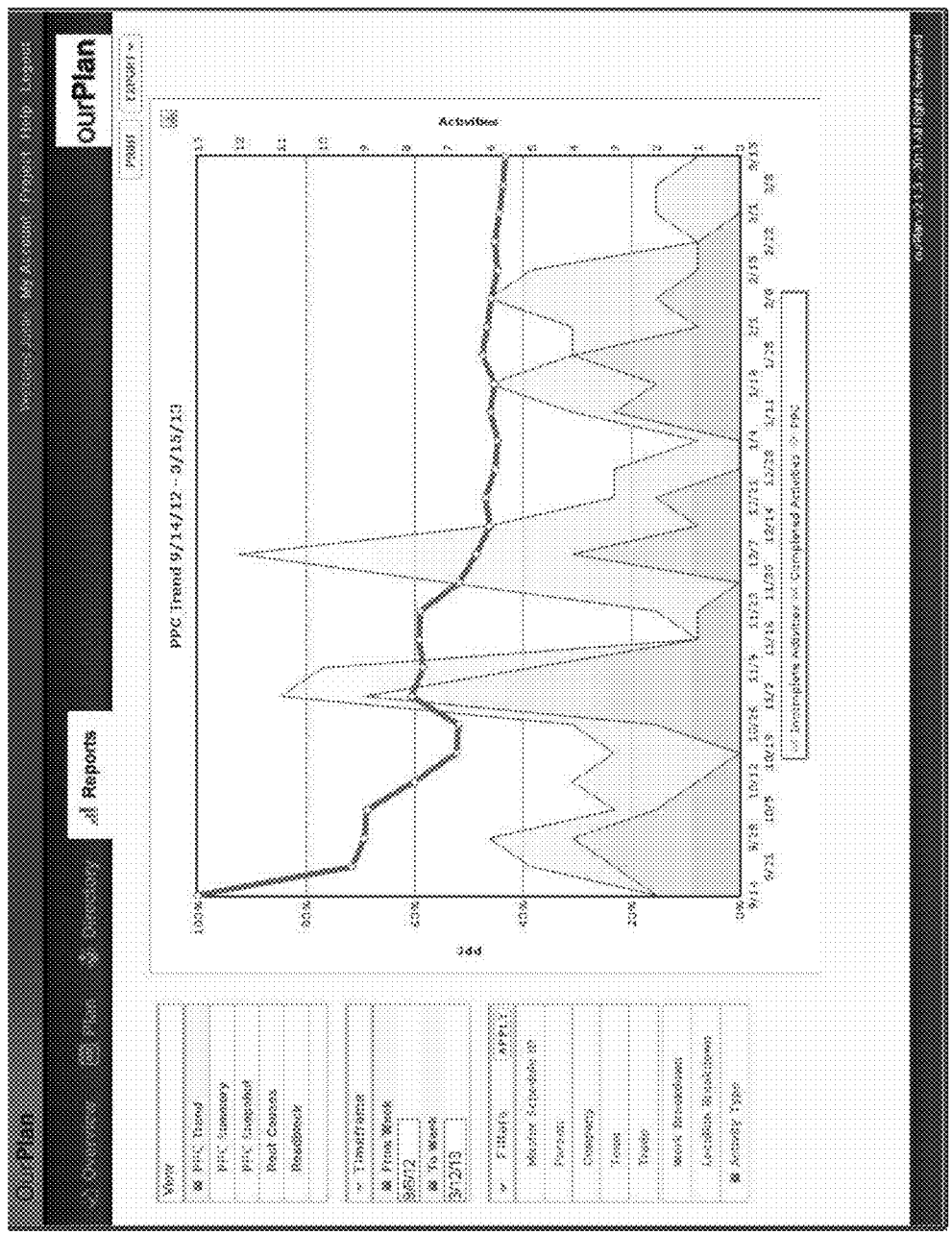
FIGS. 18A-F show an exemplary graphical user interface of reports.
Figure 18B:
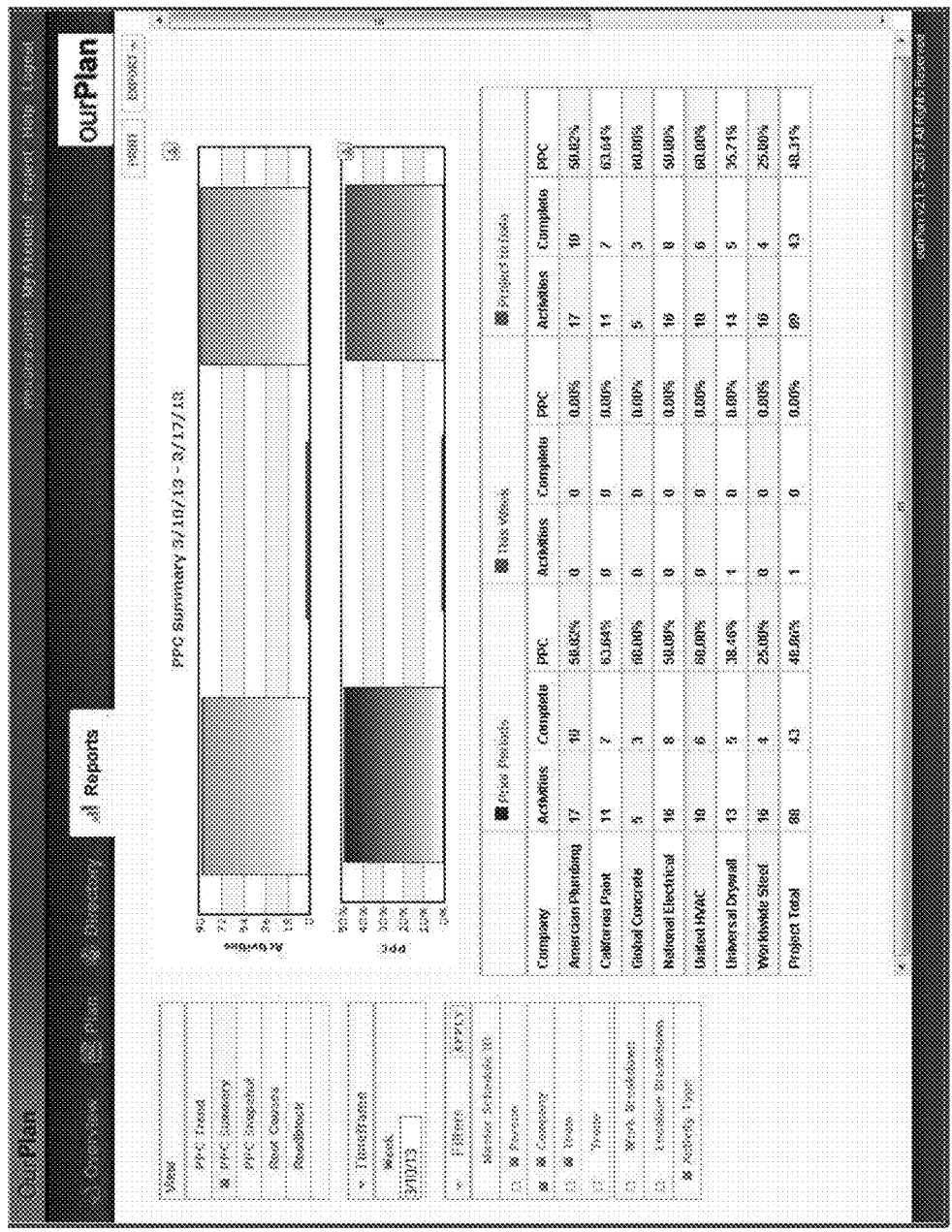
Figure 18C:
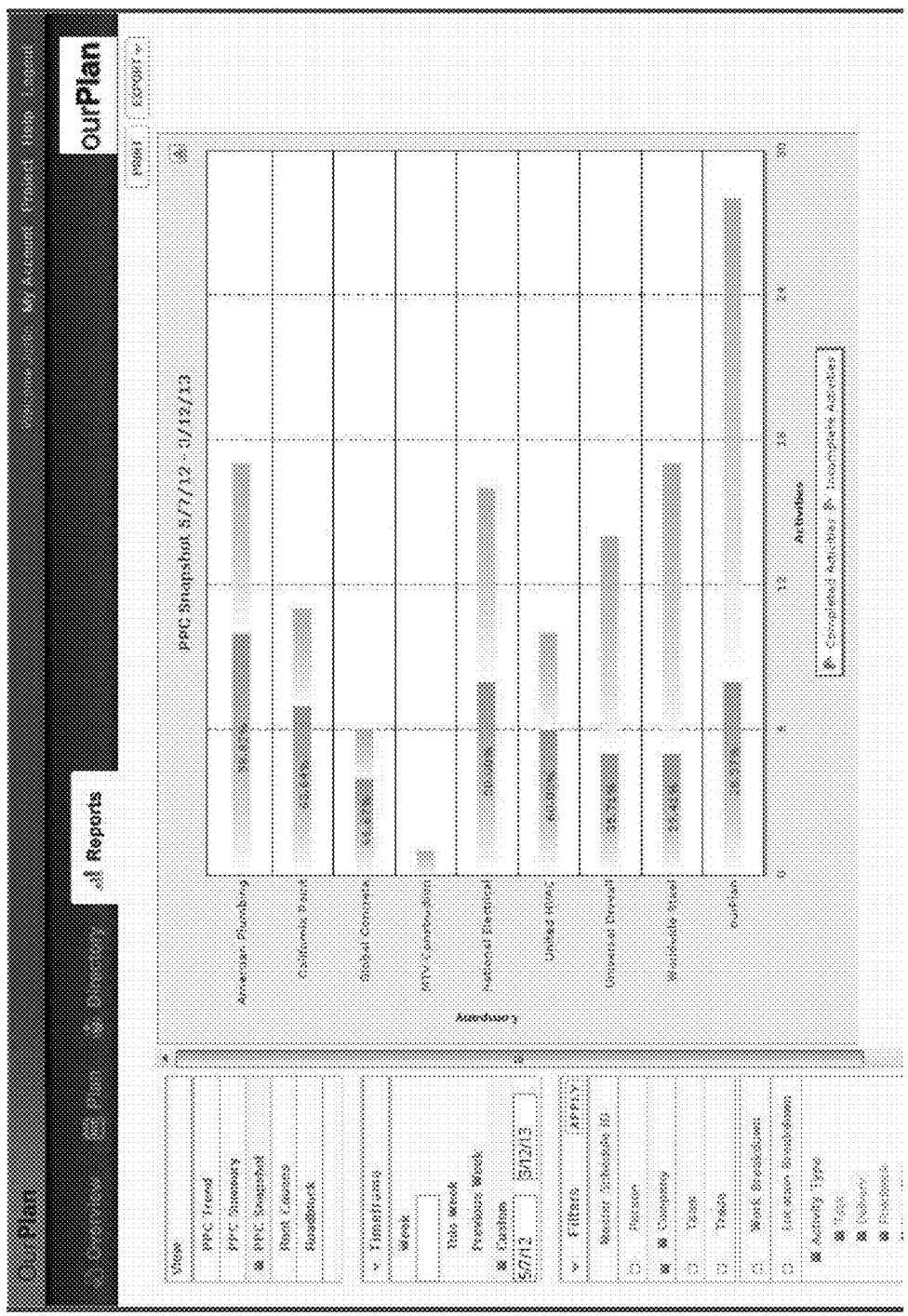
Figure 18D:
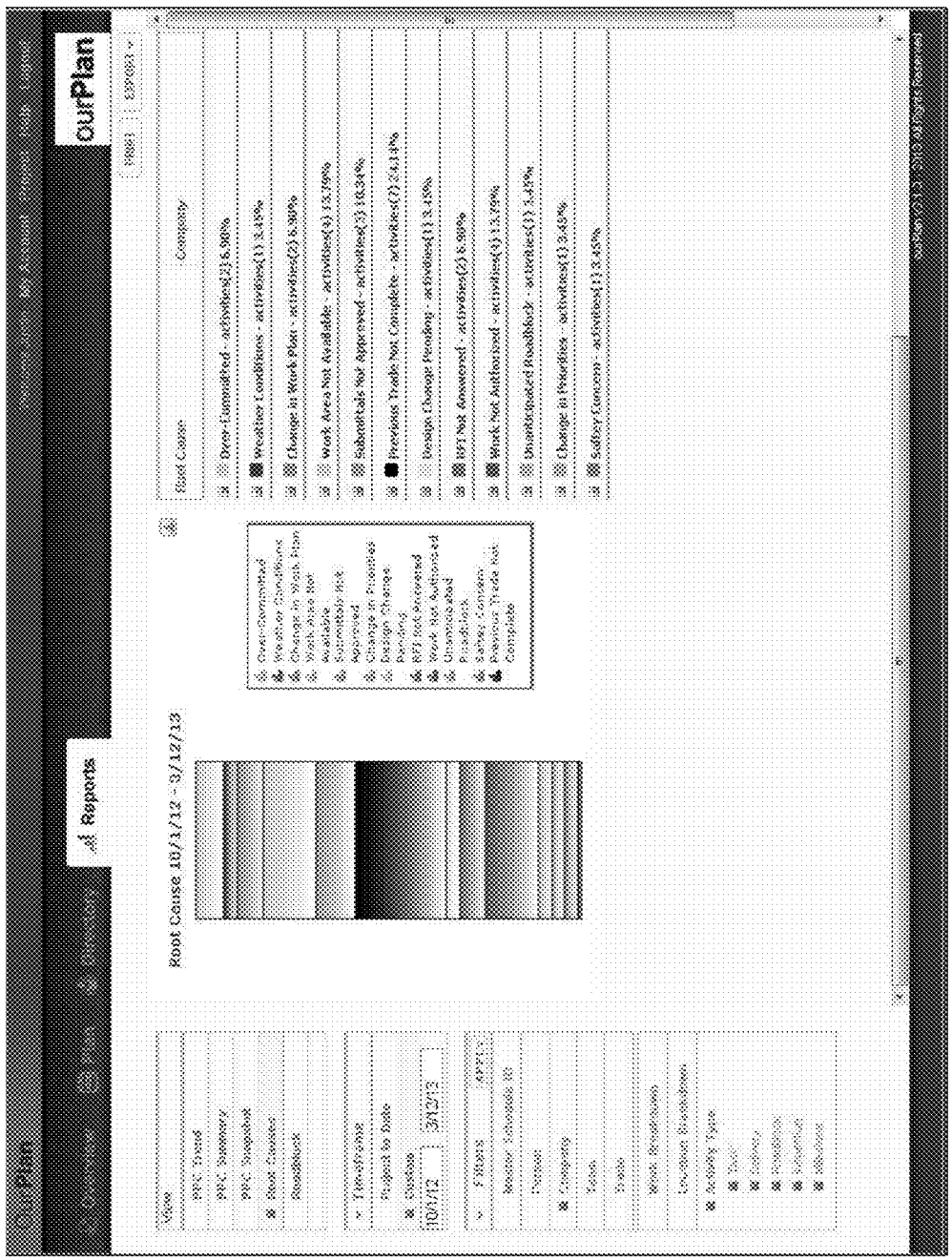
Figure 18E:
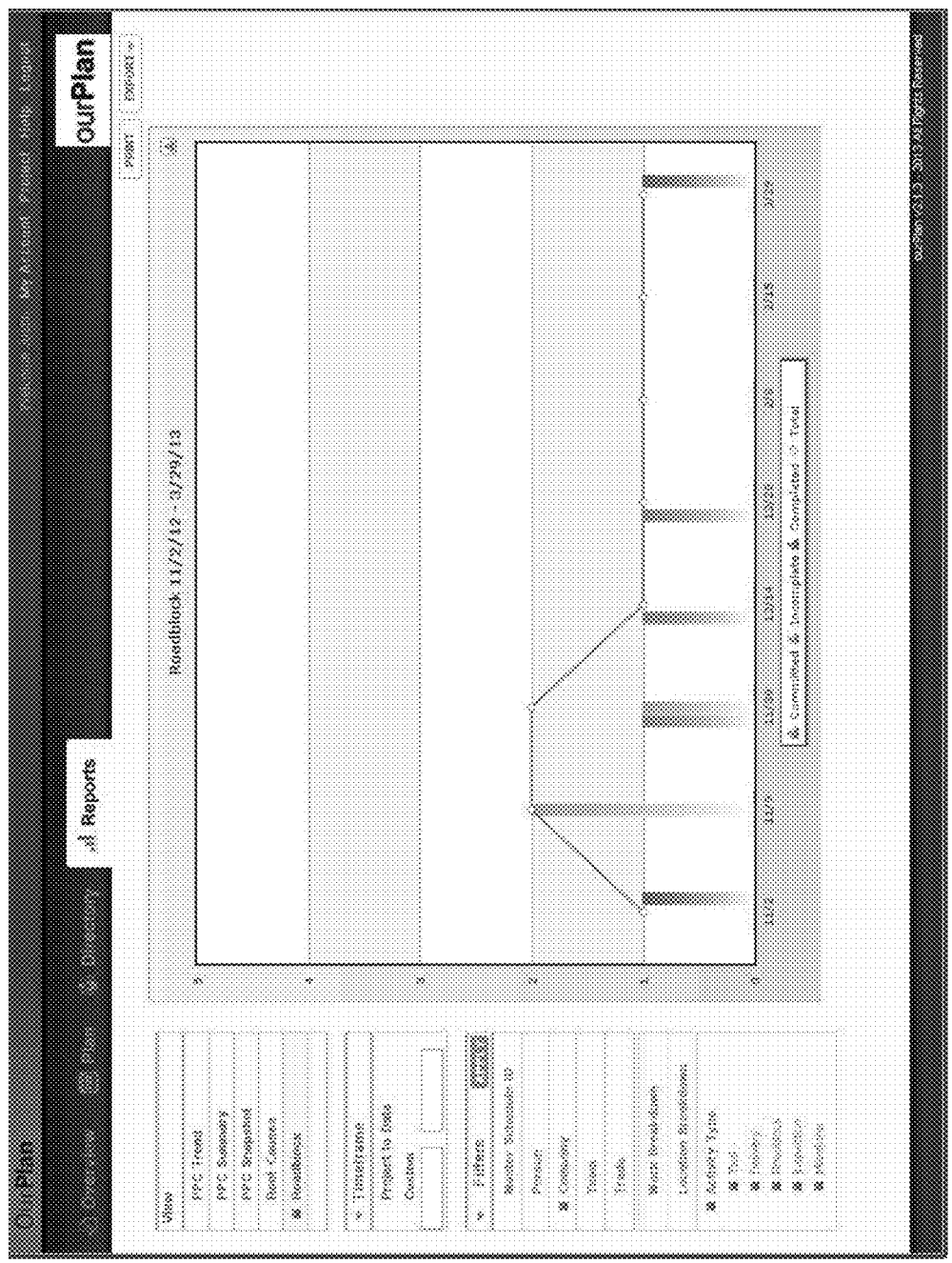
Figure 18F:
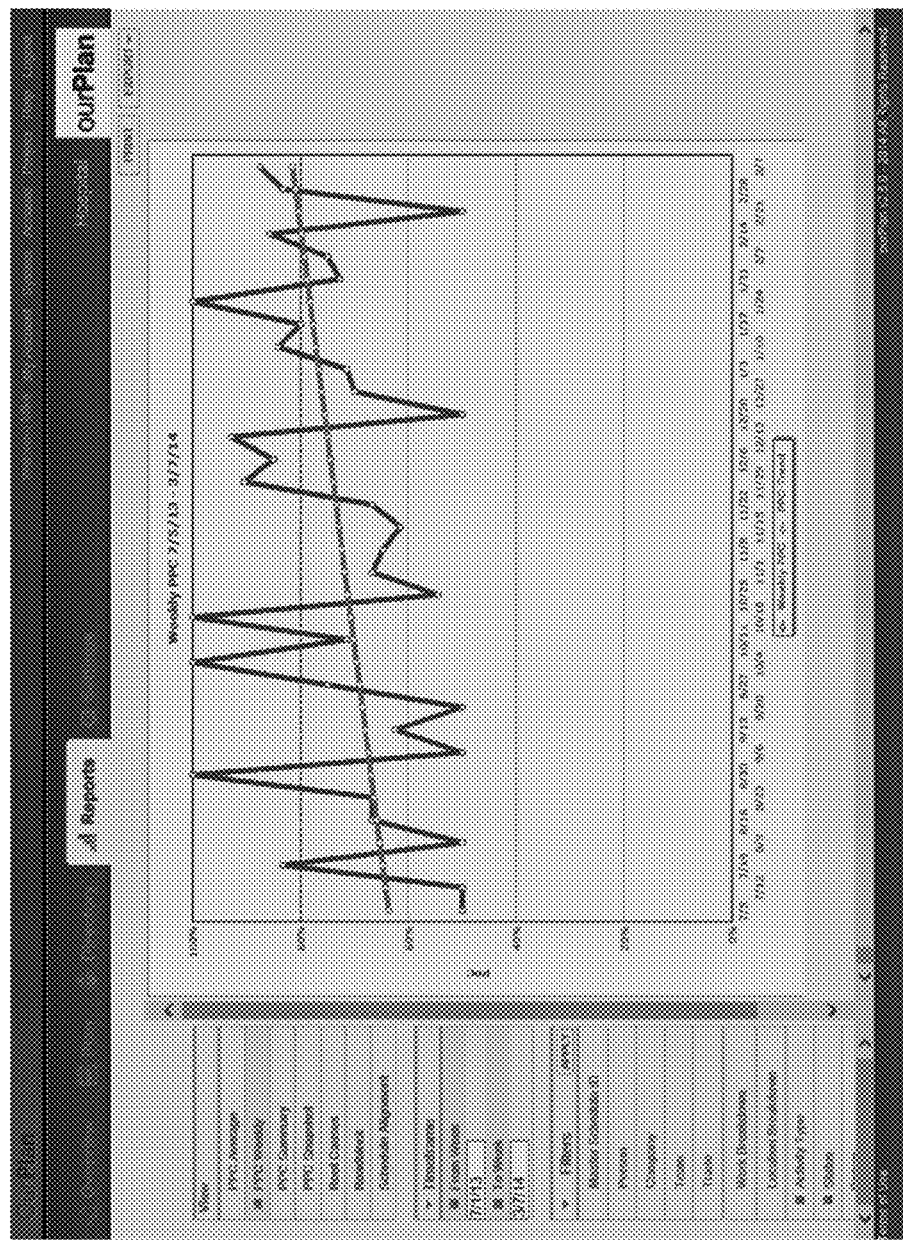

In one embodiment, the pull planning layer 165 provides an output to another program or application through the submit option. For example, the pull planning layer 165 submits the pull plan to the web application described above. Such a submission may include copying all of the activities on the pull-plan to the web application for execution. FIG. 15H shows a pull plan being submitted to the web application. Optionally, prior to submission, the pull planning layer 165 prevents submission of the plan if any non-milestone activity is not yet committed, visually highlight the uncommitted activities for review and assignment of actions, and limit the number of submissions to one per project.

In another embodiment of the present technology, an interactive floor plan view for collaborative construction planning is generated and displayed by the pull planning layer 165. One embodiment implements the interactive floor plan view through an interactive building map, allowing the creation, viewing, or updating of activities based on where the activities are occurring in the building space. The building map is two dimensional. Optionally streaming technology is used by the pull planning layer 165 to expand the interactive view to three dimensions, or allow switching between two dimensions and three dimensions according to user preference.

Figure 19:
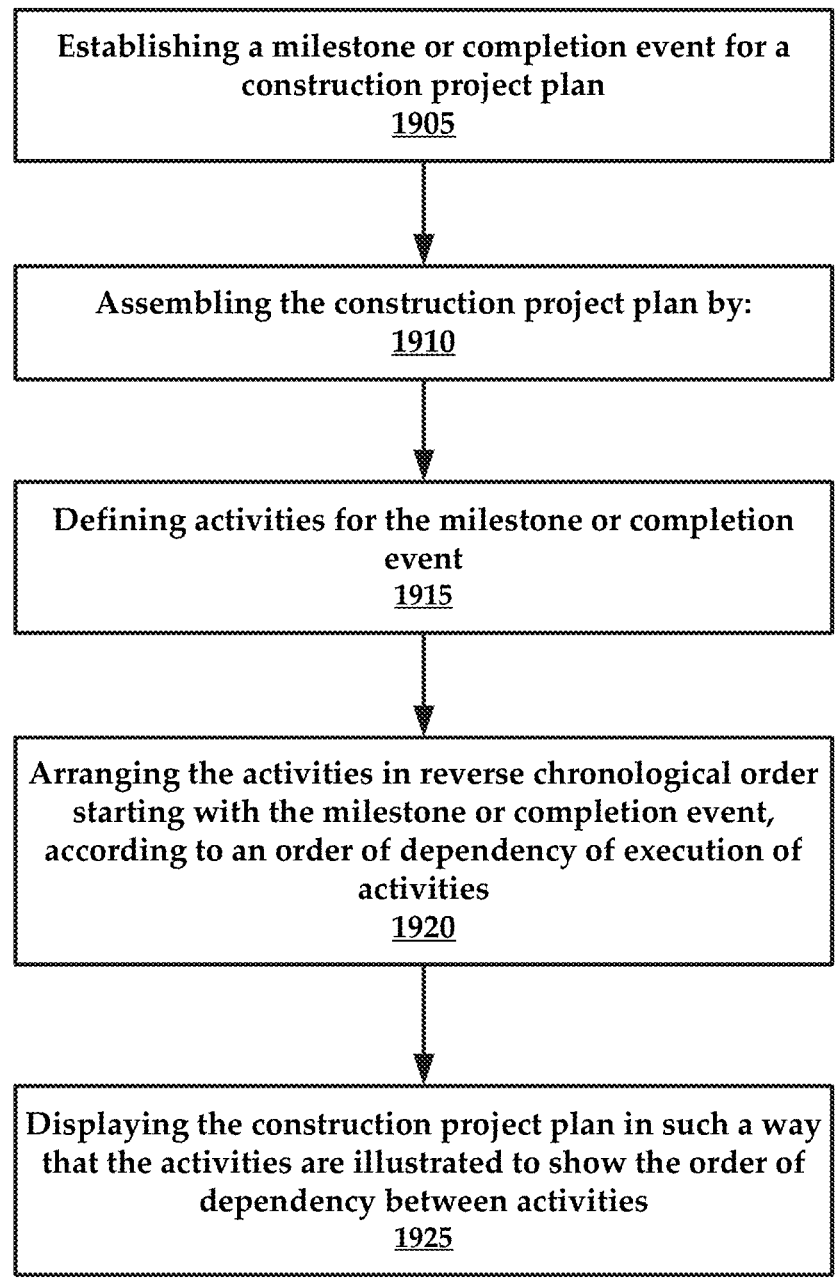
FIG. 19 is a flowchart of an exemplary method for providing a collaborative construction project plan.

FIG. 19 is a flowchart of an exemplary method for providing a collaborative construction project plan using a collaborative planning system. According to some embodiments, the method includes establishing 1905 a milestone or completion event for a construction project plan. This may include receiving a milestone from an end user, or selecting a milestone in view of a set of activities that are known. Thus, the present technology can infer a set of possible milestones by examining a set of activities, and comparing this set to previous construction project plans that are stored in a database.

Next, the method includes assembling 1910 the construction project plan by first defining 1915 activities for the milestone or completion event. FIG. 7B illustrates an exemplary GUI for entering information regarding an activity. It will be understood that each of the activities is associated with a team member which accomplishes a given activity or set of activities. The activity may have a time frame for completion and other information that defines the actions to be accomplished during execution of the activity.

Once the activities have been defined, the method includes arranging 1920 the activities in reverse chronological order starting with the milestone or completion event, according to an order of dependency of execution of activities. That is, each activity may depend on one or more parent activities. In turn, a subject activity may also have other child activities that depend upon the subject activity.

The system can arrange the activities a network of connections based upon the known dependencies and relationships between activities. Finally, the method includes displaying 1925 the construction project plan in such a way that the activities are illustrated to show the order of dependency between activities. An example of a visualization or display is illustrated in FIG. 14C.

Figure 20:
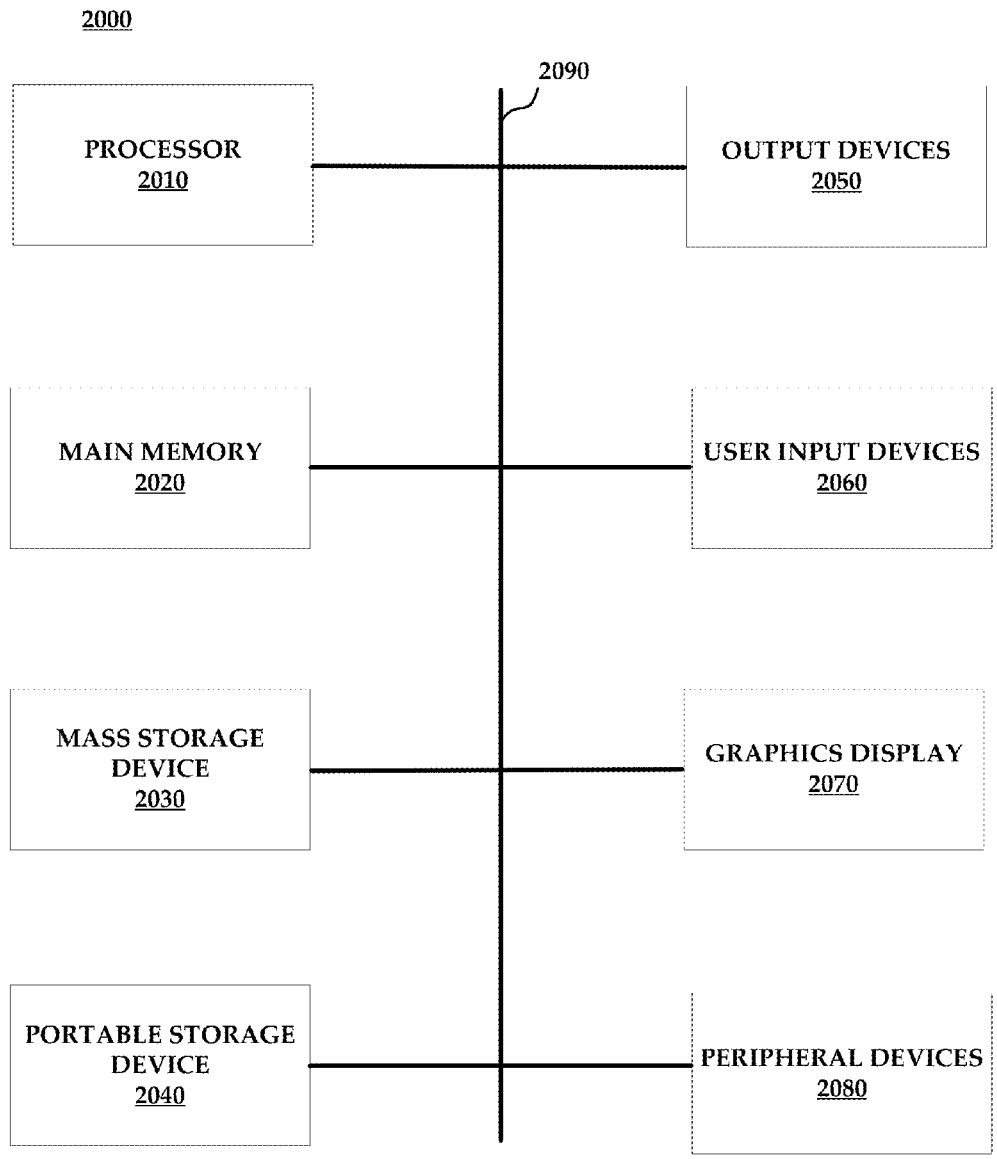
FIG. 20 shows an exemplary computing system.

FIG. 20 illustrates an exemplary computing system 2000, hereinafter system 2000, which is used to implement embodiments of the present technology. The system 2000 is implemented in the contexts of the likes of computing systems, networks, servers, or combinations thereof. The system 2000 may include one or more processors 2010 and main memory 2020. Main memory 2020 stores, in part, instructions and data for execution by processor 2010. Main memory 2020 may store the executable code when in operation. The system 2000 may further includes a mass storage device 2030, portable storage device(s) 2040, output devices 2050, user input devices 2060, a graphics display 2070, and peripheral device(s) 2080.

The components shown in FIG. 20 are depicted as being connected via a single bus 2090. The components are connected through one or more data transport means. Processor 2010 and main memory 2020 is connected via a local microprocessor bus, and the mass storage device 2030, peripheral device(s) 2080, portable storage device 2040, and graphics display 2070 is connected via one or more input/output (I/O) buses.

Mass storage device 2030, which is implemented with a magnetic disk drive or an optical disk drive, is a non-volatile storage device for storing data and instructions for use by processor 2010. Mass storage device 2030 may store the system software for implementing embodiments of the present technology for purposes of loading that software into main memory 2020.

Portable storage device 2040 operates in conjunction with a portable non-volatile storage medium, such as a floppy disk, compact disk, digital video disc, or USB storage device, to input and output data and code to and from the system. The system software for implementing embodiments of the present technology is stored on such a portable medium and input to the system 2000 via the portable storage device 2040.

User input devices 2060 provide a portion of a user interface. User input devices 2060 may include one or more microphones, an alphanumeric keypad, such as a keyboard, for inputting alpha-numeric and other information, or a pointing device, such as a mouse, a trackball, stylus, or cursor direction keys. User input devices 2060 may also include a touchscreen. Additionally, the system 2000 as shown in FIG. 20 includes output devices 2050. Suitable output devices include speakers, printers, network interfaces, and monitors.

Graphics display 2070 may include a liquid crystal display (LCD) or other suitable display device. Graphics display 2070 receives textual and graphical information, and processes the information for output to the display device.

Peripheral devices 2080 is included and may include any type of computer support device to add additional functionality to the computer system.

The components provided in the system 2000 are those typically found in computer systems that is suitable for use with embodiments of the present technology and are intended to represent a broad category of such computer components that are well known in the art. Thus, the system 2000 is a personal computer, hand held computing system, telephone, mobile computing system, workstation, server, minicomputer, mainframe computer, or any other computing system. The computer may also include different bus configurations, networked platforms, multi-processor platforms, etc. Various operating systems is used including UNIX, LINUX, WINDOWS, MAC OS, PALM OS, ANDROID, IOS (known as IPHONE OS before June 2010), QNX, and other suitable operating systems.

It is noteworthy that any hardware platform suitable for performing the processing described herein is suitable for use with the embodiments provided herein. Computer-readable storage media refer to any medium or media that participate in providing instructions to a central processing unit (CPU), a processor, a microcontroller, or the like. Such media may take forms including, but not limited to, non-volatile and volatile media such as optical or magnetic disks and dynamic memory, respectively. Common forms of computer-readable storage media include a floppy disk, a flexible disk, a hard disk, magnetic tape, any other magnetic storage medium, a CD-ROM disk, digital video disk (DVD), BLUE-RAY DISC (BD), any other optical storage medium, RAM, PROM, EPROM, EEPROM, FLASH memory, and/or any other memory chip, module, or cartridge.

Various forms of computer-readable media is involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Computer program code for carrying out operations for aspects of the present technology is written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer is connected to the user's computer through any type of network, including a local area network (LAN) or a wide area network (WAN), or the connection is made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the present technology in the form disclosed.

Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated.

Aspects of the present technology are described above with reference to flowchart illustrations and/or block diagrams of methods, apparatus (systems) and computer program products according to embodiments of the present technology. It will be understood that each block of the flowchart illustrations and/or block diagrams, and combinations of blocks in the flowchart illustrations and/or block diagrams, can be implemented by computer program instructions. These computer program instructions is provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present technology. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as is included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

What is claimed is:

1. A method for providing a collaborative construction project plan using a collaborative planning system, the method comprising:
   establishing a milestone or completion event for a construction project plan;
   assembling the construction project plan by:
      defining activities for the milestone or completion event, wherein each of the activities is associated with a team member which accomplishes a given activity; and
      arranging the activities in reverse chronological order starting with the milestone or completion event, according to an order of dependency of execution of activities;
   displaying the construction project plan in such a way that the activities are illustrated to show the order of dependency between activities;
   generating, on a graphics display, a visualization of a critical path for the construction project plan;
   identifying, on the graphics display, critical activities associated with the critical path by highlighting the critical path activities with a visual indication, in the visualization, that shows a path of necessary activities in the construction project plan;
   receiving first user input to the visualization indicating a modification to an activity;
   in response to the receiving the first input, calculating time data of the construction project plan;
   interactively and in response to the first input, updating the visualization to displaying the calculated time data of the construction project plan on the graphics display to show changes in the critical path such that further user input continues to interactively update the visualization;
   displaying, on the graphics display, an interactive two-dimensional floor plan view, the interactive two-dimensional floor plan view displaying an interactive building map that includes activities as located in a building space;
   receiving second user input indicating a user preference for three-dimensional view; and
   in response to receiving the second input, switching, on the graphics display, the interactive two-dimensional floor plan view into a three-dimensional floor plan view.

2. The method according to claim 1, further comprising providing team members with limited control over activities, the limited control comprising:
   removing preceding or updated activities, wherein an activity is defined by a team member plan; and
   making commitments to activities assigned to the team member; and
   submitting team member plan to a third party or other application.

3. The method according to claim 1, further comprising calculating for the construction project plan, a planned finish date or a planned start date, based upon activity dates and dependencies.

4. The method according to claim 3, further comprising compressing activity dates of the construction project plan based on the planned finish date or the planned start date.

5. The method according to claim 1, further comprising calculating two sets of planned start and end dates for each activity, a first set of planned start and end dates being calculated in reverse chronological order from an expected milestone finish date, a second set of planned start and end dates being calculated in forward chronological order based on either a current date or a user-supplied planned start date.

6. The method according to claim 5, further comprising calculating a delta data that represents a time discrepancy in a current construction project plan resulting from either:
   overdue activities; or
   a possibility of delaying an activity start without affecting an overall expected plan finish date.

7. The method according to claim 6, wherein overdue activities are illustrated using a first color that is applied to a representation of an entity within the display of the construction project plan.

8. The method according to claim 1, further comprising error checking the construction project plan and highlighting detected errors within the display.

9. The method according to claim 1, further comprising displaying uncommitted activities and assignment of activities to entities.

10. A construction project planning system, comprising:
   a processor; and
   a memory for storing logic, the logic being executed by the processor to perform operations comprising:
   establishing a milestone or completion event for a construction project plan;
   assembling the construction project plan by:
      defining activities for the milestone or completion event, wherein each of the activities is associated with an team member which accomplishes a given activity; and
      arranging the activities in reverse chronological order starting with the milestone or completion event, according to an order of dependency of execution of activities;
      creating a network of commitments from the arranged activities; and
   displaying the construction project plan in such a way that the activities are illustrated to show the order of dependency between activities;
   generating, on a graphics display, a visualization of a critical path for the construction project plan;
   identifying, on the graphics display, critical activities associated with the critical path by highlighting the critical path activities with a visual indication, in the visualization, that shows a path of necessary activities in the construction project plan;
   receiving first user input to the visualization indicating a modification to an activity;
   in response to the receiving the first input, calculating time data of the construction project plan;
   interactively and in response to the first input, updating the visualization to displaying the calculated time data of the construction project plan on the graphics display to show changes in the critical path such that further user input continues to interactively update the visualization;
   displaying, on the graphics display, an interactive two-dimensional floor plan view, the interactive two-dimensional floor plan view displaying an interactive building map that includes activities as located in a building space;

receiving second user input indicating a user preference for three-dimensional view; and in response to receiving the second input, switching, on the graphics display, the interactive two-dimensional floor plan view into a three-dimensional floor plan view.

11. The construction project planning system of claim 10, the operations further comprising providing team members with limited control over activities, the limited control comprising:

removing preceding or updated activities, wherein an activity is defined by a team member plan; and making commitments to activities assigned to the team member; and submitting team member plan to a third party or other application.

12. The construction project planning system of claim 10, the operations further comprising calculating for the construction project plan, a planned finish date or a planned start date, based upon activity dates and dependencies.

13. The construction project planning system of claim 12, the operations further comprising compressing activity dates of the construction project plan based on the planned finish date or the planned start date.

14. The construction project planning system of claim 10, the operations further comprising calculating two sets of planned start and end dates for each activity, a first set of planned start and end dates being calculated in reverse chronological order from an expected milestone finish date, a second set of planned start and end dates being calculated in forward chronological order based on either a current date or a user-supplied planned start date.

15. The construction project planning system of claim 14, the operations further comprising calculating a delta data that represents a time discrepancy in a current construction project plan resulting from either:

overdue activities; or a possibility of delaying an activity start without affecting an overall expected plan finish date.

16. The construction project planning system of claim 15, wherein overdue activities are illustrated using a first color that is applied to a representation of an entity within the display of the construction project plan.

17. The construction project planning system of claim 10, the operations further comprising error checking the construction project plan and highlighting detected errors within the display.

18. The construction project planning system of claim 10, the operations further comprising displaying uncommitted activities and assignment of activities to entities.

* * * * *